June 15, 1943.   G. R. EATON   2,321,588
AUTOMATIC TELEPHONE SYSTEM
Filed June 27, 1941   20 Sheets-Sheet 1
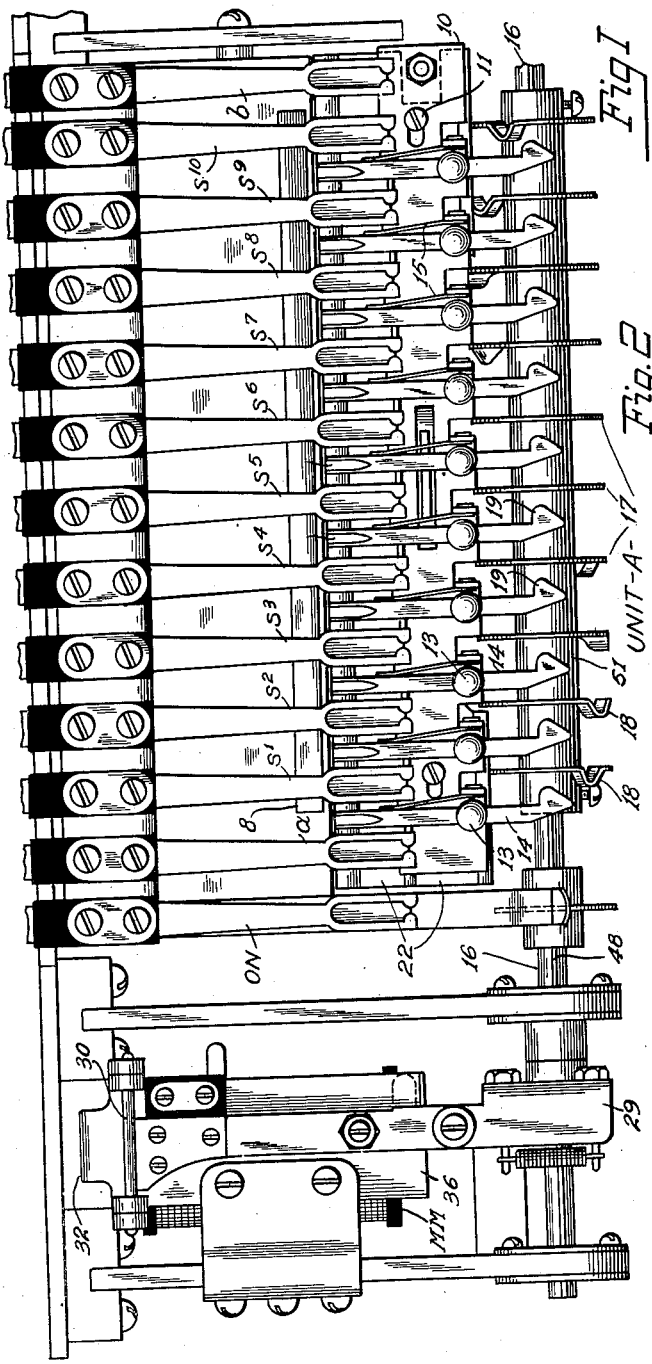
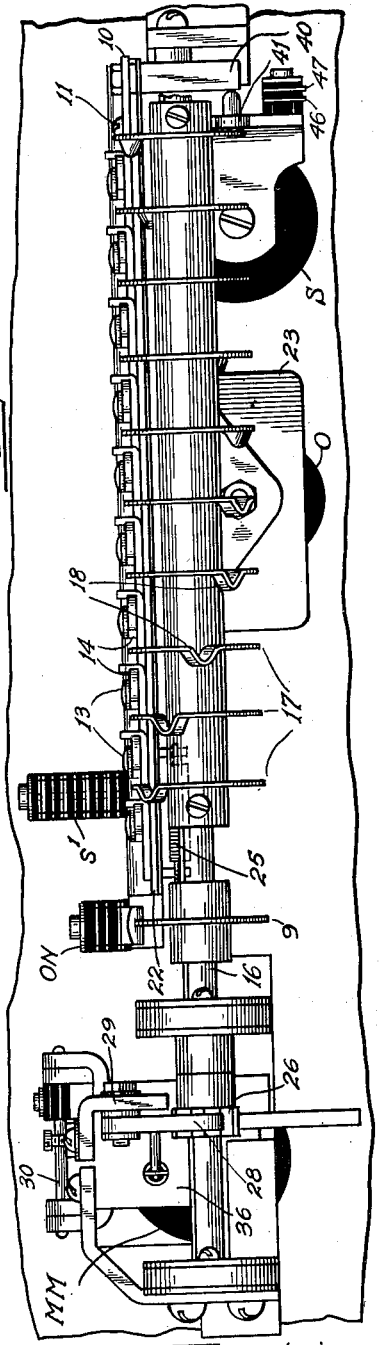
Inventor:
George R. Eaton.
By C. P. Soper
Atty.

June 15, 1943.  G. R. EATON  2,321,588
AUTOMATIC TELEPHONE SYSTEM
Filed June 27, 1941   20 Sheets-Sheet 2
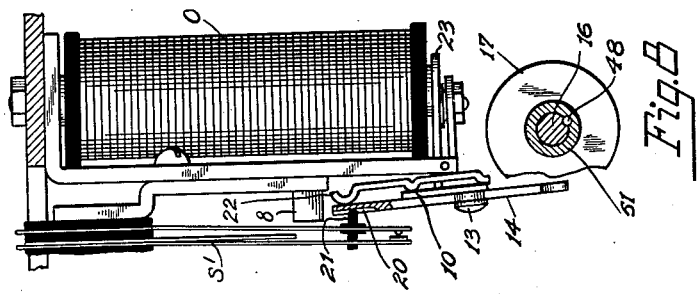
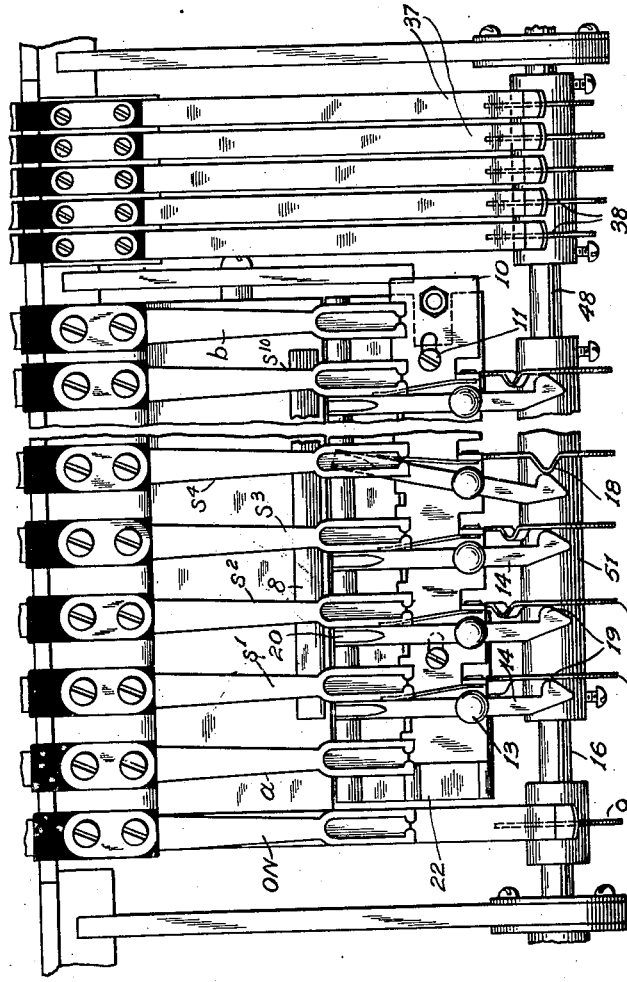
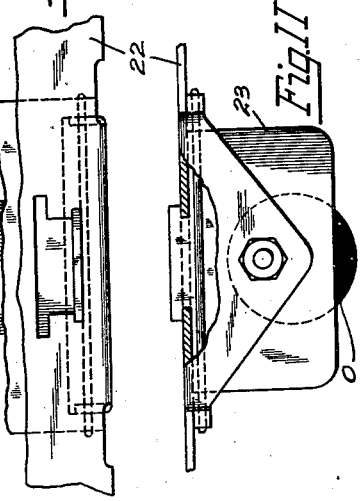
Inventor:
George R. Eaton
By C. P. Sofer
Atty.

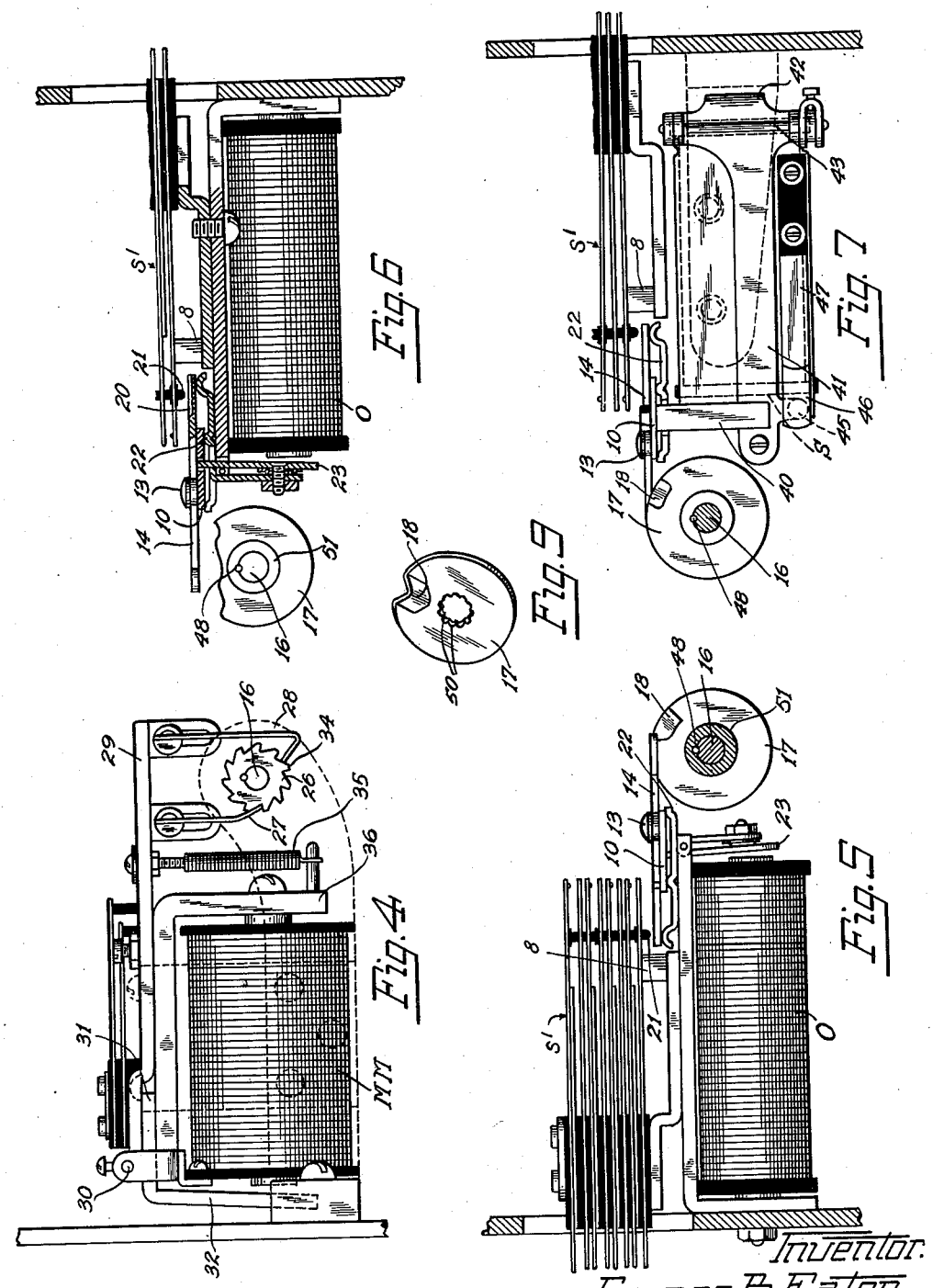

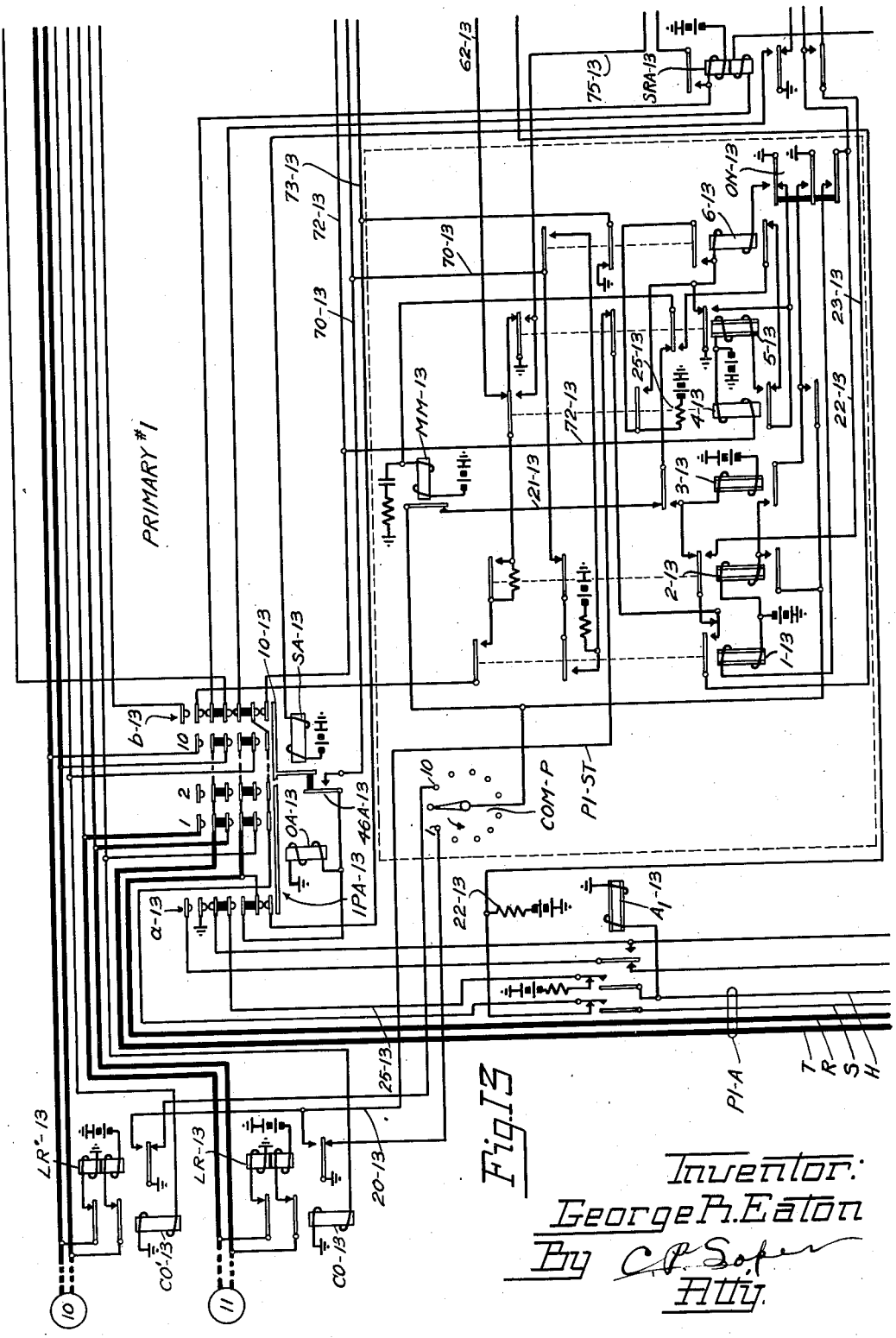

June 15, 1943.   G. R. EATON   2,321,588
AUTOMATIC TELEPHONE SYSTEM
Filed June 27, 1941   20 Sheets-Sheet 14

Fig. 23.

Inventor:
George R. Eaton.
By C. P. S......
Atty.

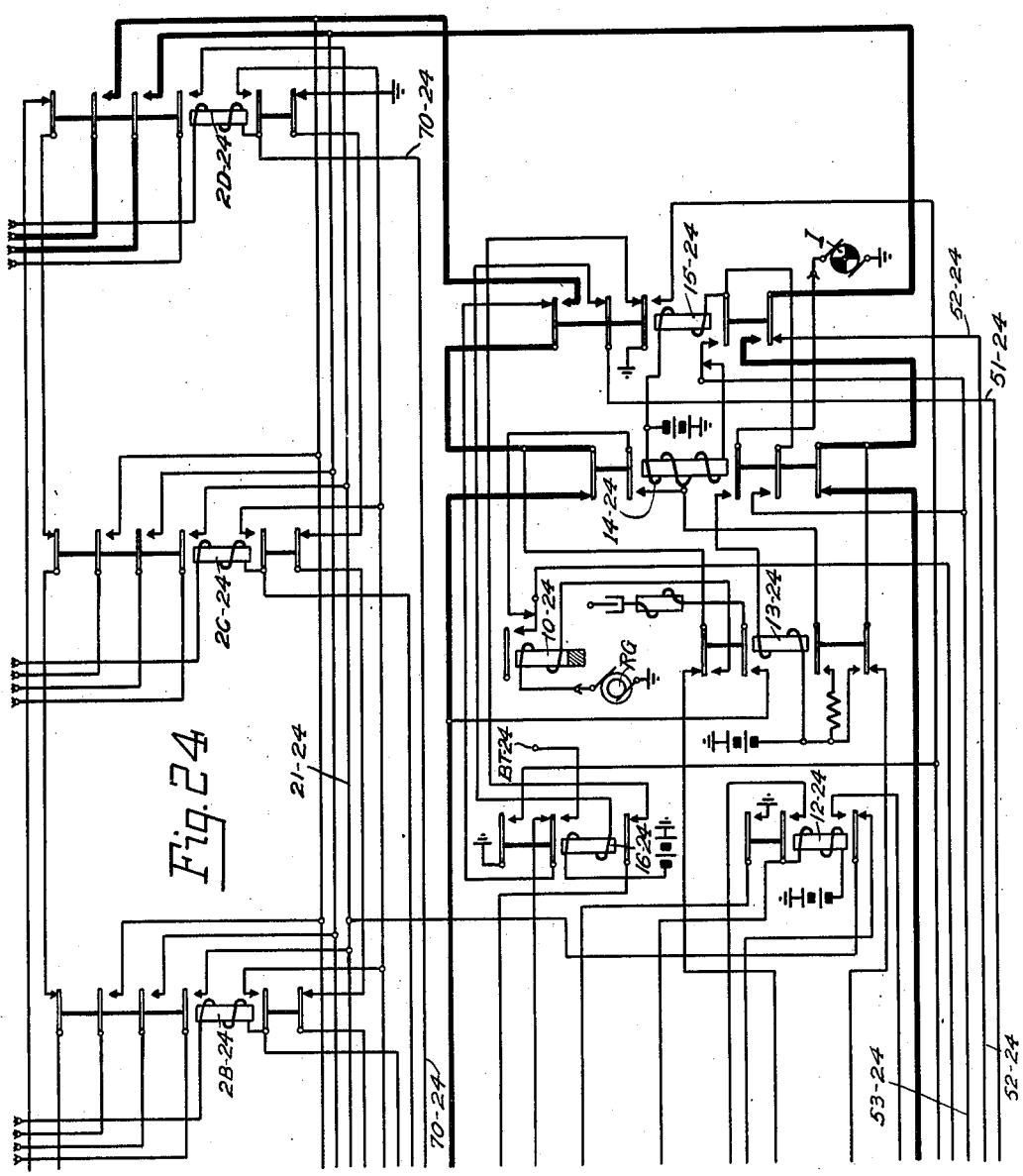

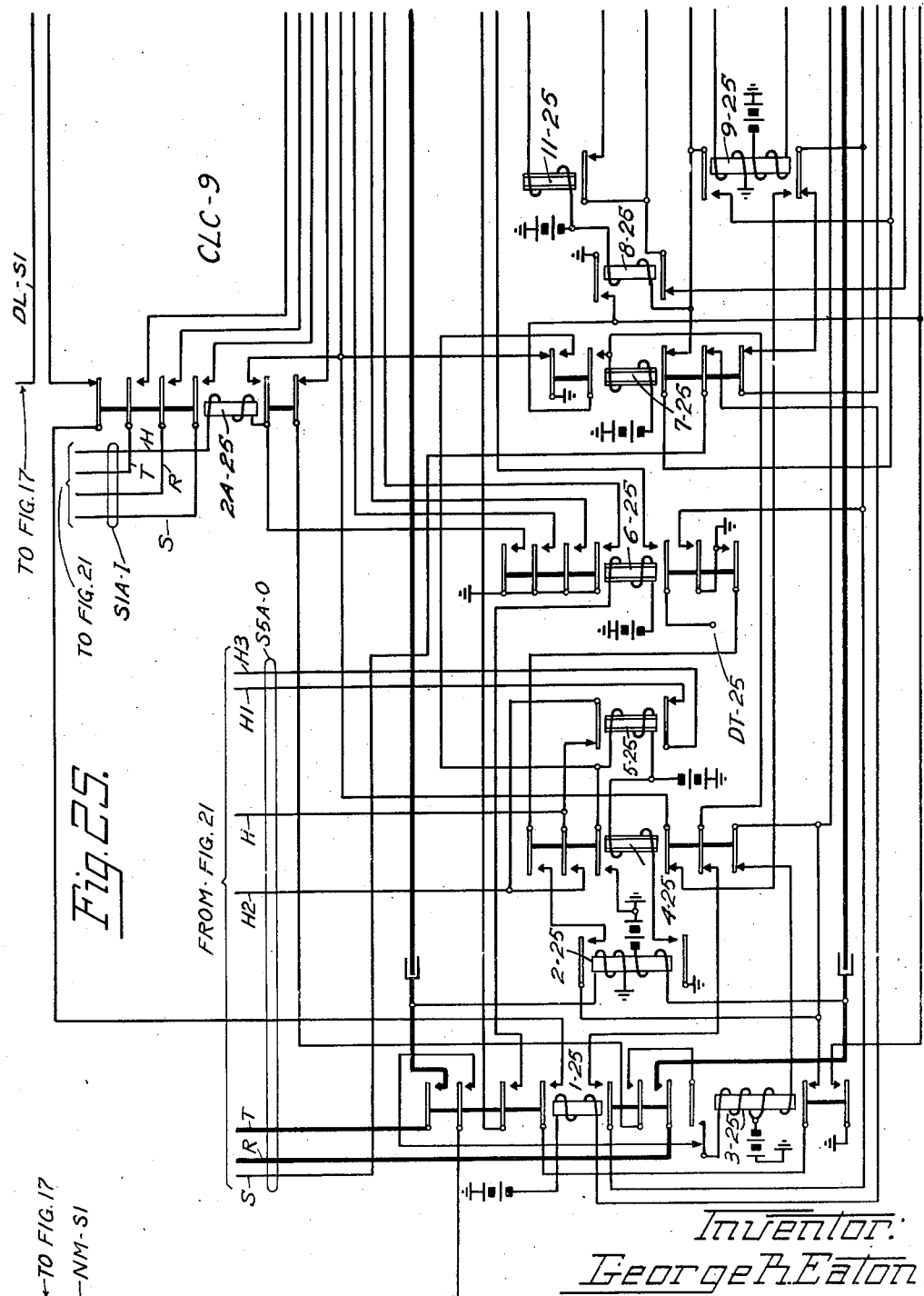

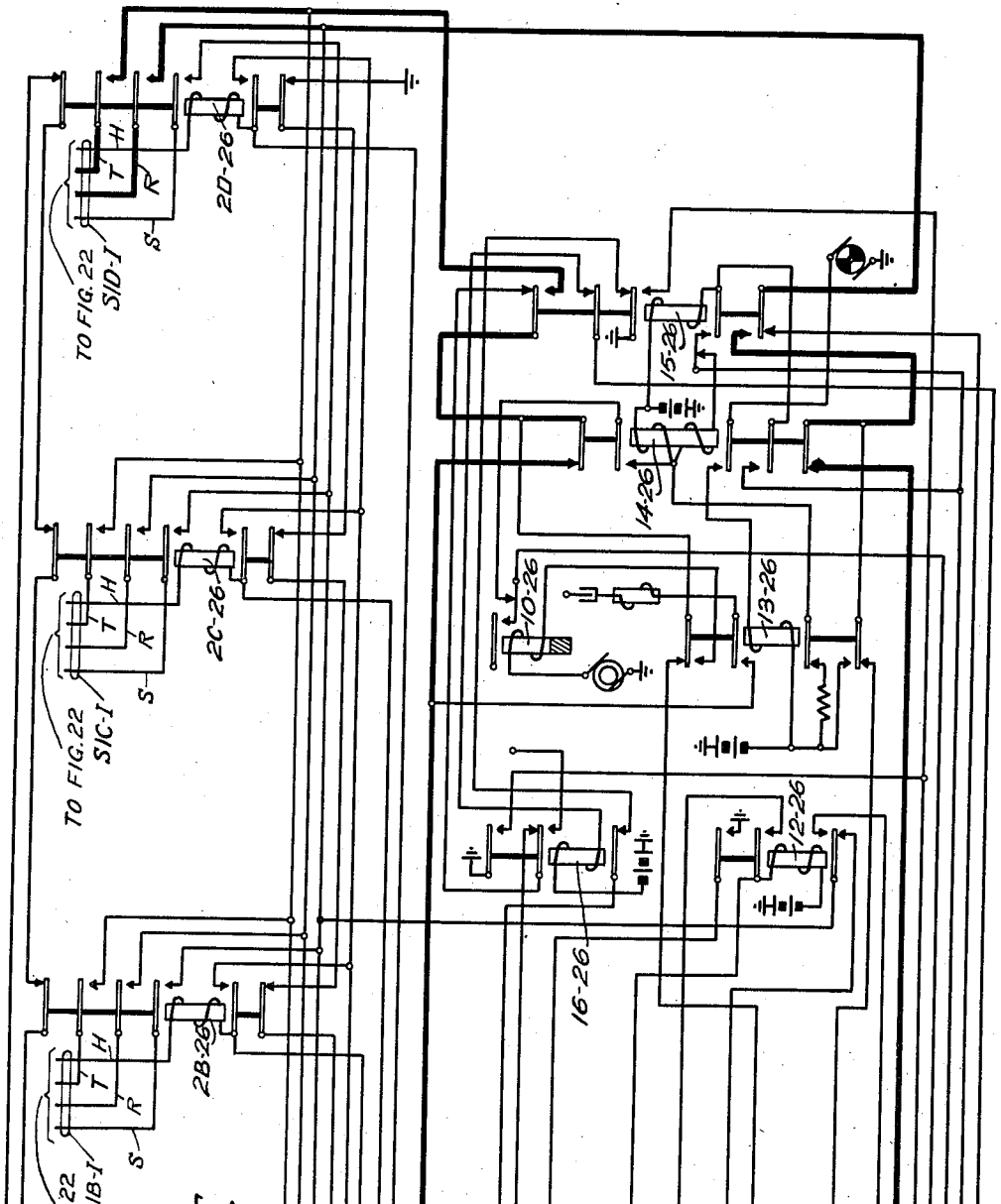

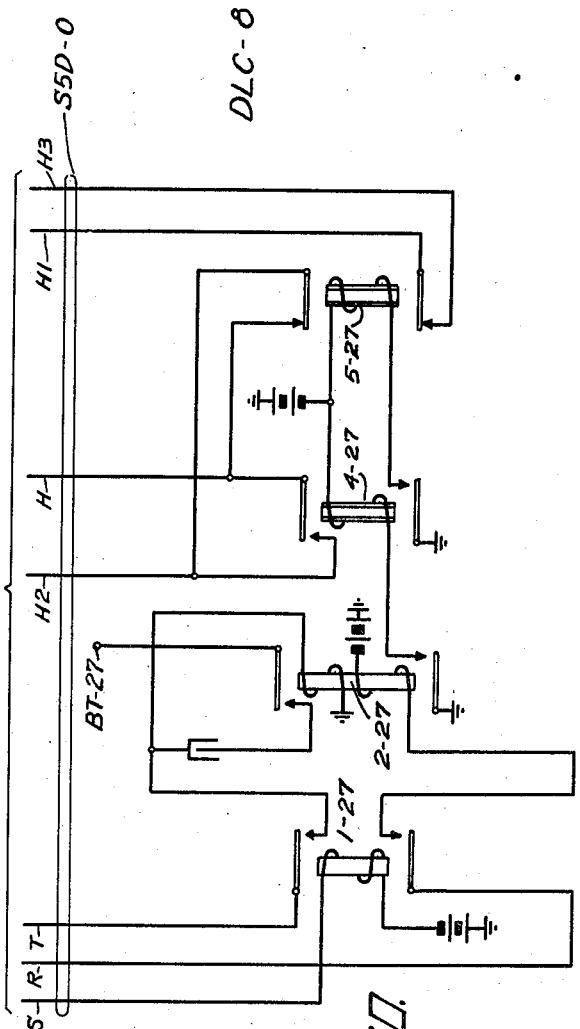

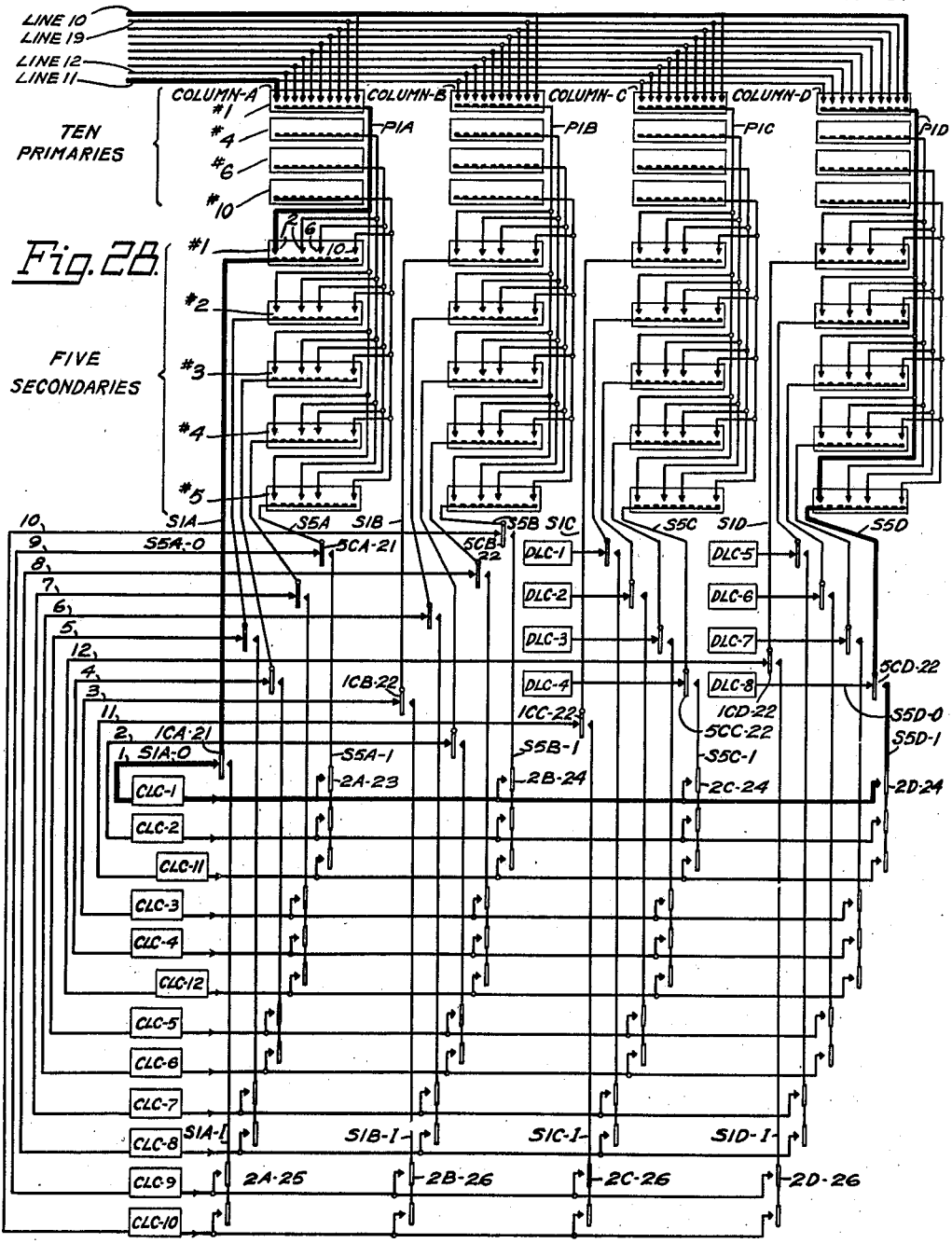

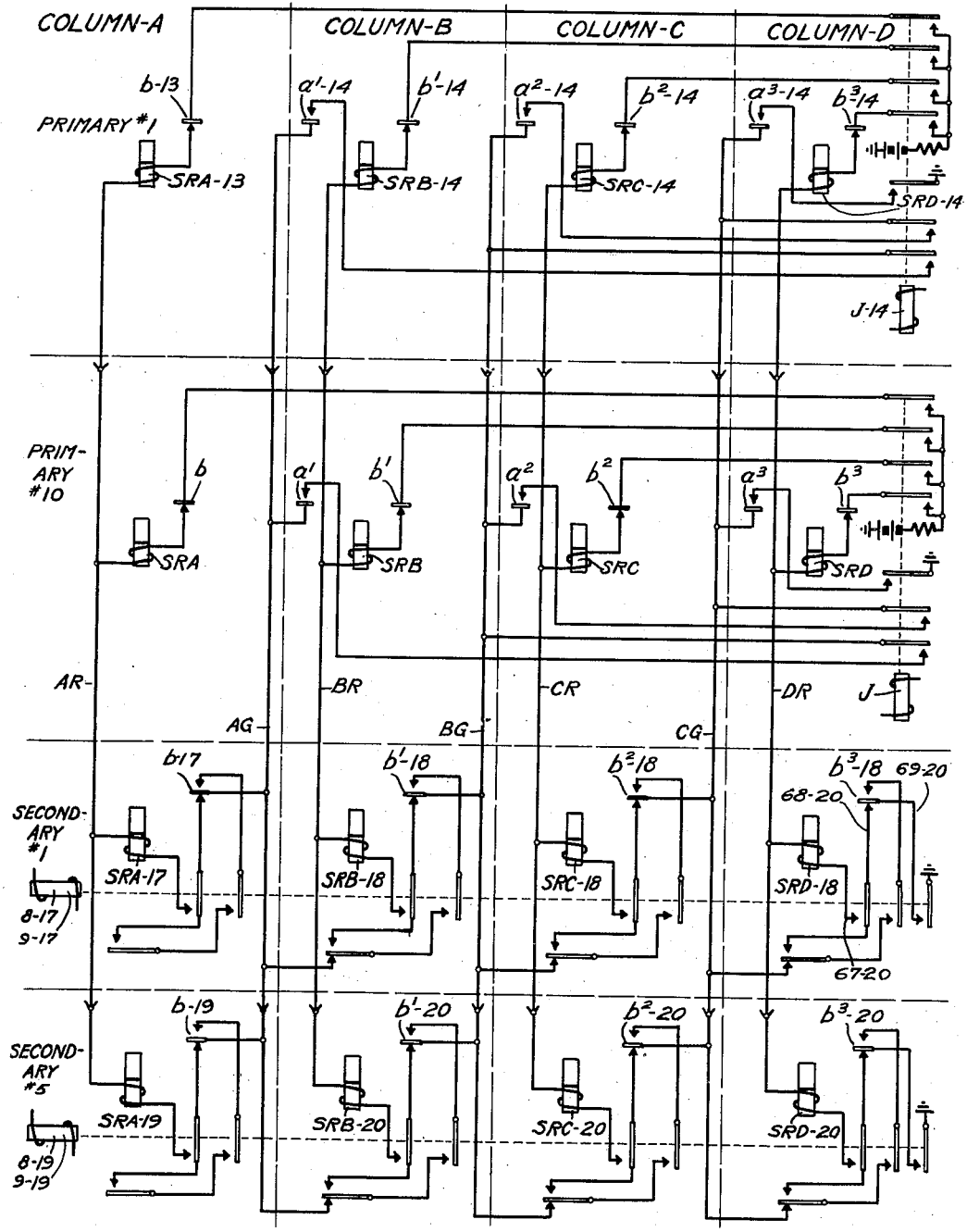

Patented June 15, 1943

2,321,588

UNITED STATES PATENT OFFICE 2,321,588

AUTOMATIC TELEPHONE SYSTEM

George R. Eaton, Oak Park, Ill., assignor to Kellogg Switchboard and Supply Company, Chicago, Ill., a corporation of Illinois Application June 27, 1941, Serial No. 400,031

29 Claims. (Cl. 179—18)

This invention relates to an improvement in automatic telephone systems, such as are used to establish connections between the lines of calling and called telephone subscribers, although the apparatus and system obviously may be used to extend connections for other purposes.

The object of this invention is the provision of a system of this type which is compact, durable, reliable in operation, and economical to manufacture.

GENERAL DESCRIPTION

The present invention is an expansion of the invention disclosed in applicant's application Serial No. 229,266, filed September 9, 1938, and uses the same type of switching device as therein disclosed. This switching device comprises a control mechanism and shaft common to four switching units, each unit comprising ten sets of contacts.

In the disclosed use of the switching device the shaft may be rotated into any one of ten selecting positions, and any switching unit of the device may be allotted or selected and thus placed under the control of the common mechanism and shaft. In the selected unit, the contact set corresponding to the setting of the shaft is actuated. The common mechanism thus selectively actuates any one of ten contact sets in any one of the four units. The units may be selected successively, and a contact set may be actuated in each, a total of four actuated contact sets at any one time.

In the prior application, the four units of contact sets are linked together in pairs, to provide a ten-line telephone system with two conversational paths. Two of said units act to seize calling lines, the other two being adapted to extend connections to the called or wanted lines.

In the system of the prior application, the calls originate and terminate in contact sets of one or another of the units of the same switching device. An important feature of the present system is that the connection is extended serially through units of a plurality of switching devices. By this expedient, the mechanism and general mode of operation disclosed in the above-mentioned application may be used in establishing connections between subscribers of large exchanges. While the present disclosure is that of a 100-line system, in which a connection passes selectively through the units of but two switching devices, the idea here present may be extended to include larger systems, in which the connections are extended selectively through units of three or more switching devices.

An important feature of the present invention is that any idle unit of a switching device having access to subscriber lines may function either as a line finder to seize a calling line, or as a connector to extend a connection to a wanted or called line. While, in the prior invention, the two units at the left in the drawings are always used as calling-line-finding apparatus, and the two at the right are employed only for extending connections to wanted lines, in the present disclosure, any one of the four units of a switching device may be employed to find and seize a calling line, and any one of the four units may be used to extend a connection to any called line accessible thereto.

The drawings

Referring to the accompanying drawings, they show sufficient of the circuits and apparatus involved in a 100-line system constructed according to the invention to enable the invention to be understood.

Fig. 1 is a plan view of a switching device showing a common control mechanism and the left-hand one of the four units (A to D) of contact sets controlled thereby, the parts to the right of unit A being omitted;

Fig. 2 is a view of the structure shown in Fig. 1, as seen from the bottom of the page;

Fig. 3 is a view similar to Fig. 1, with part of unit A, and parts to the left and right thereof, omitted, but showing the commutator mechanism at the right of unit A, between it and unit B, the shift plate of unit A being shown with the parts in the positions they occupy when one of the contact sets of unit A is to be actuated;

Fig. 4 is a side view of the motor mechanism by means of which the common shaft is rotated;

Fig. 5 is a cross-sectional view taken through Fig. 1, showing one set of contact springs and the associated actuating mechanism;

Fig. 6 is another section through the apparatus of Fig. 1, showing further details of construction;

Fig. 7 is a view looking at the right-hand end of one of the units of contact sets, showing the shift magnet which operates to place the unit under the control of the common shaft;

Fig. 8 is a cross-sectional view through the apparatus of Fig. 1, showing a set of contacts in actuated position;

Fig. 9 is a detached view of one of the cam discs, forming part of the selecting mechanism;

Fig. 10 is a fragmentary view of the contact-actuating magnet C and its armature structure;

Fig. 11 is a view of the mechanism of Fig. 10, as seen from the bottom of the page;

Fig. 12 shows the cams of the commutator in detached relation;

Figs. 13 and 14 show the circuit details of the first one of ten primary switching devices, each of which may function at one time as a line finder and at another as a connector;

Figure 14:
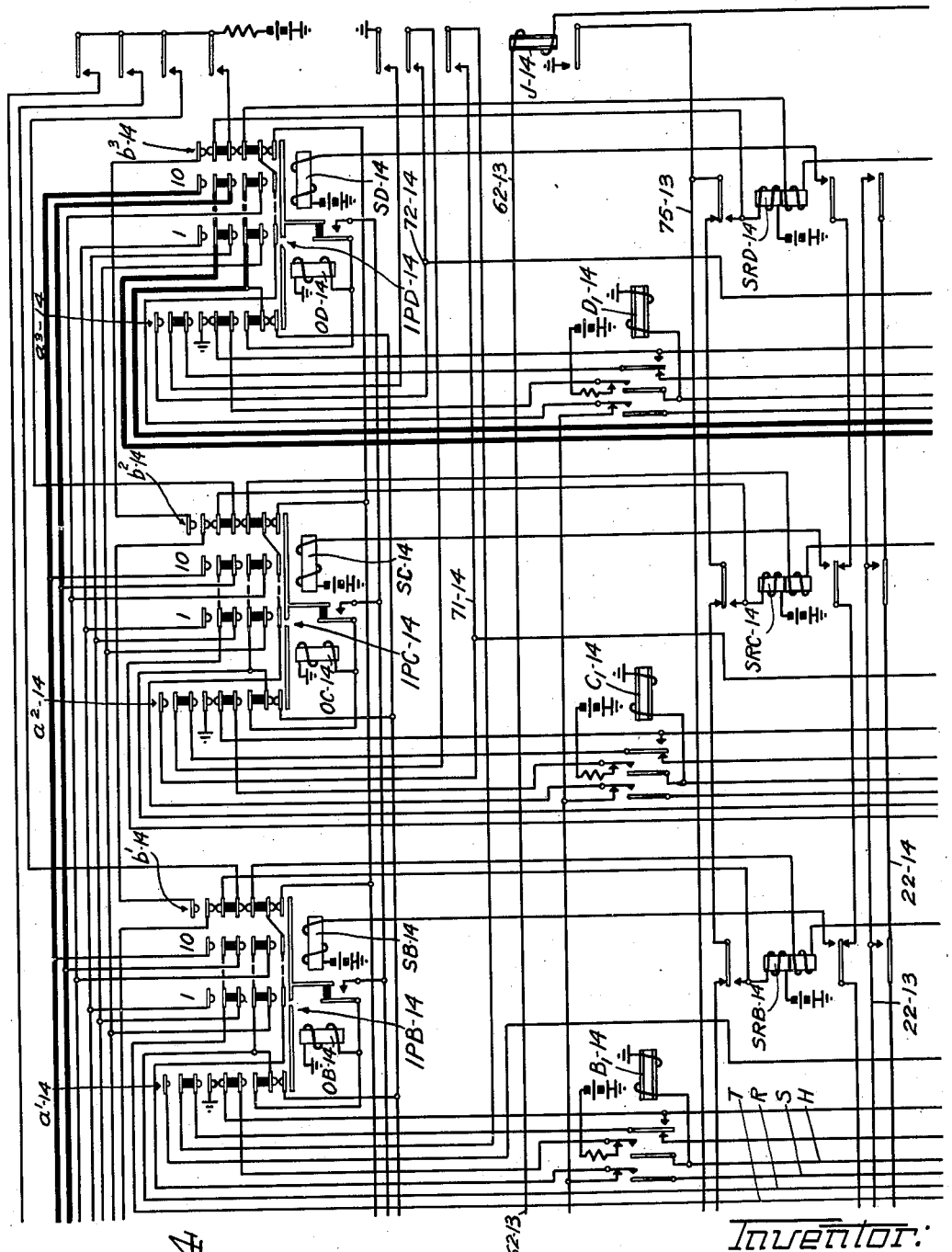
Figure 15:
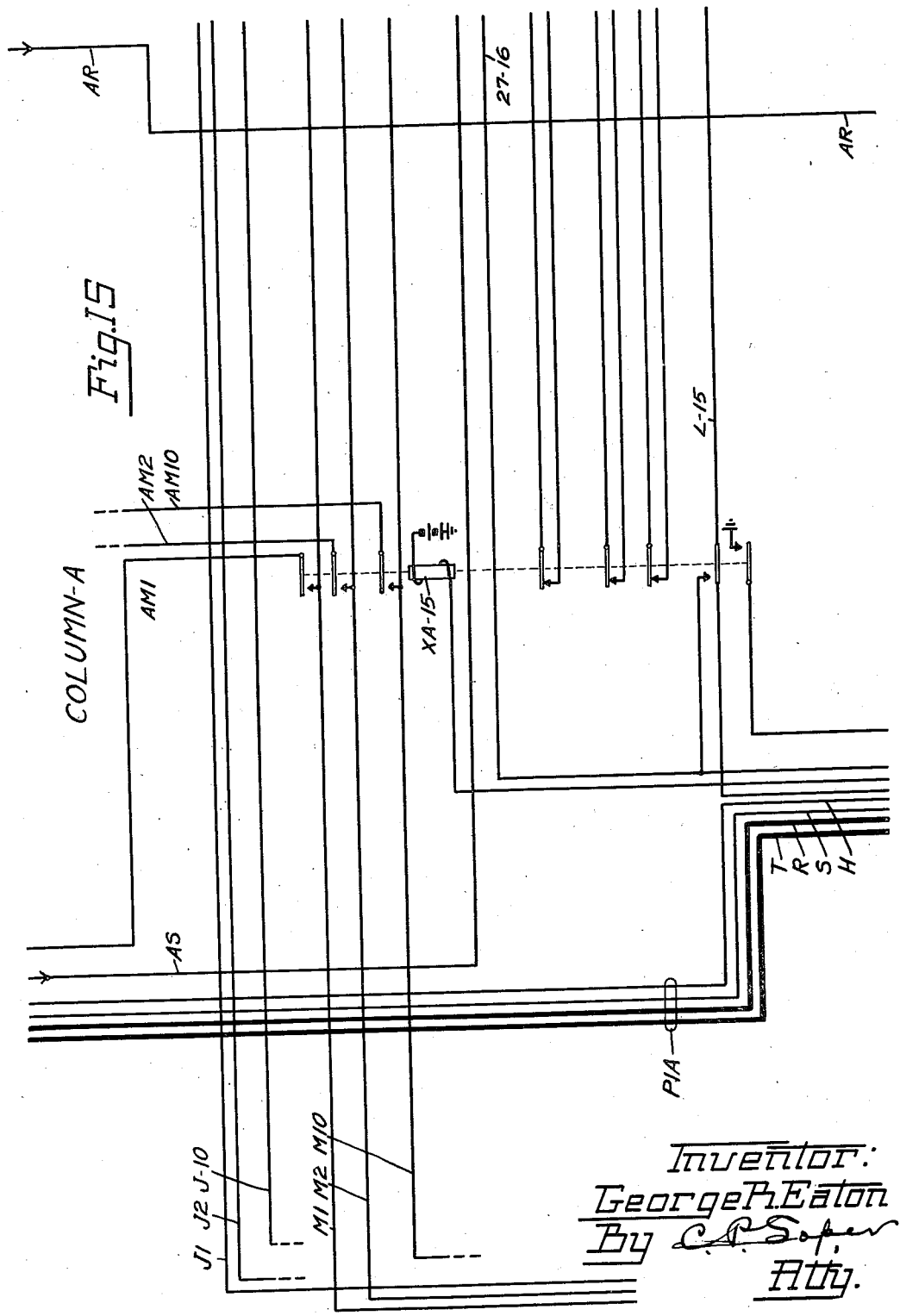
Figure 16:
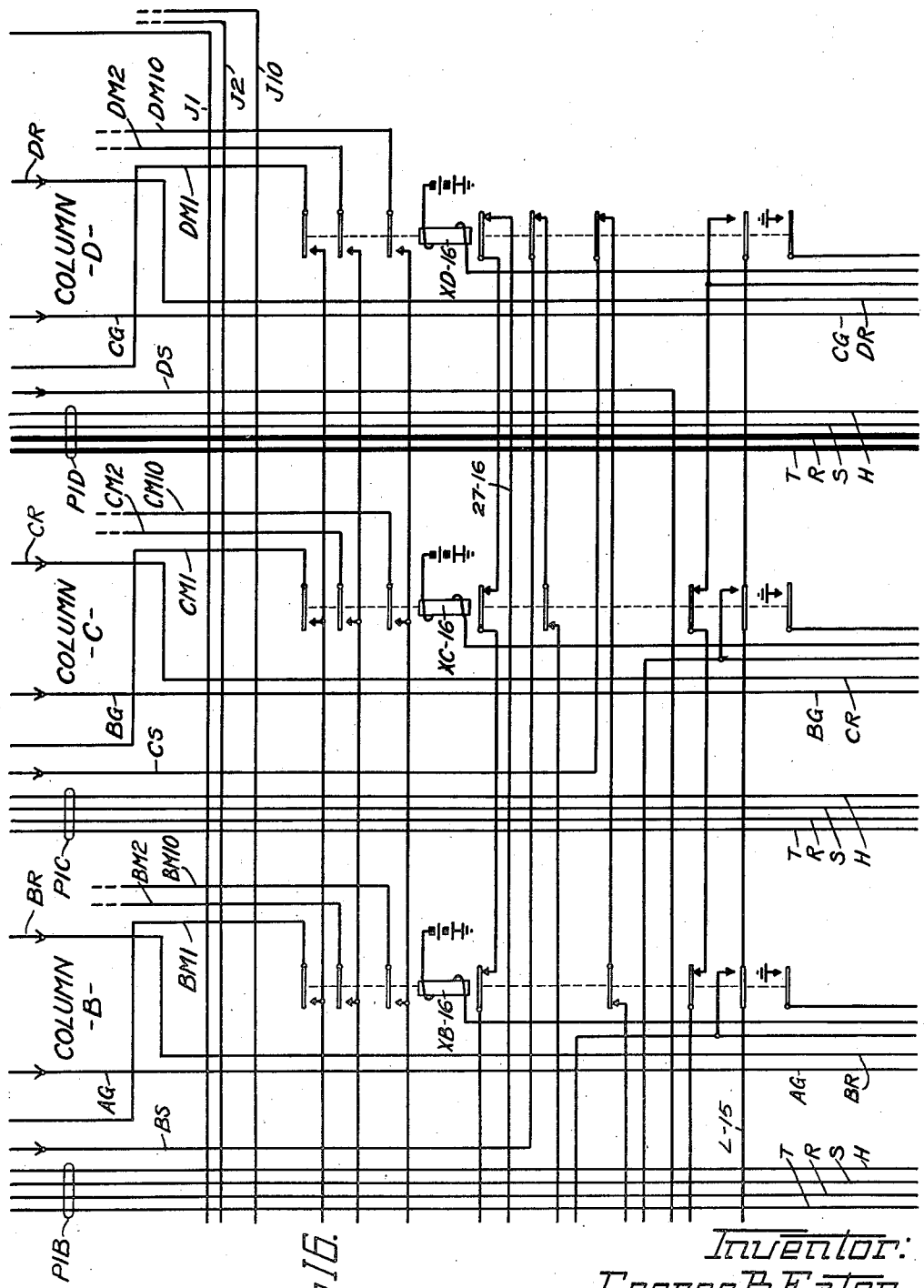
Figure 17:
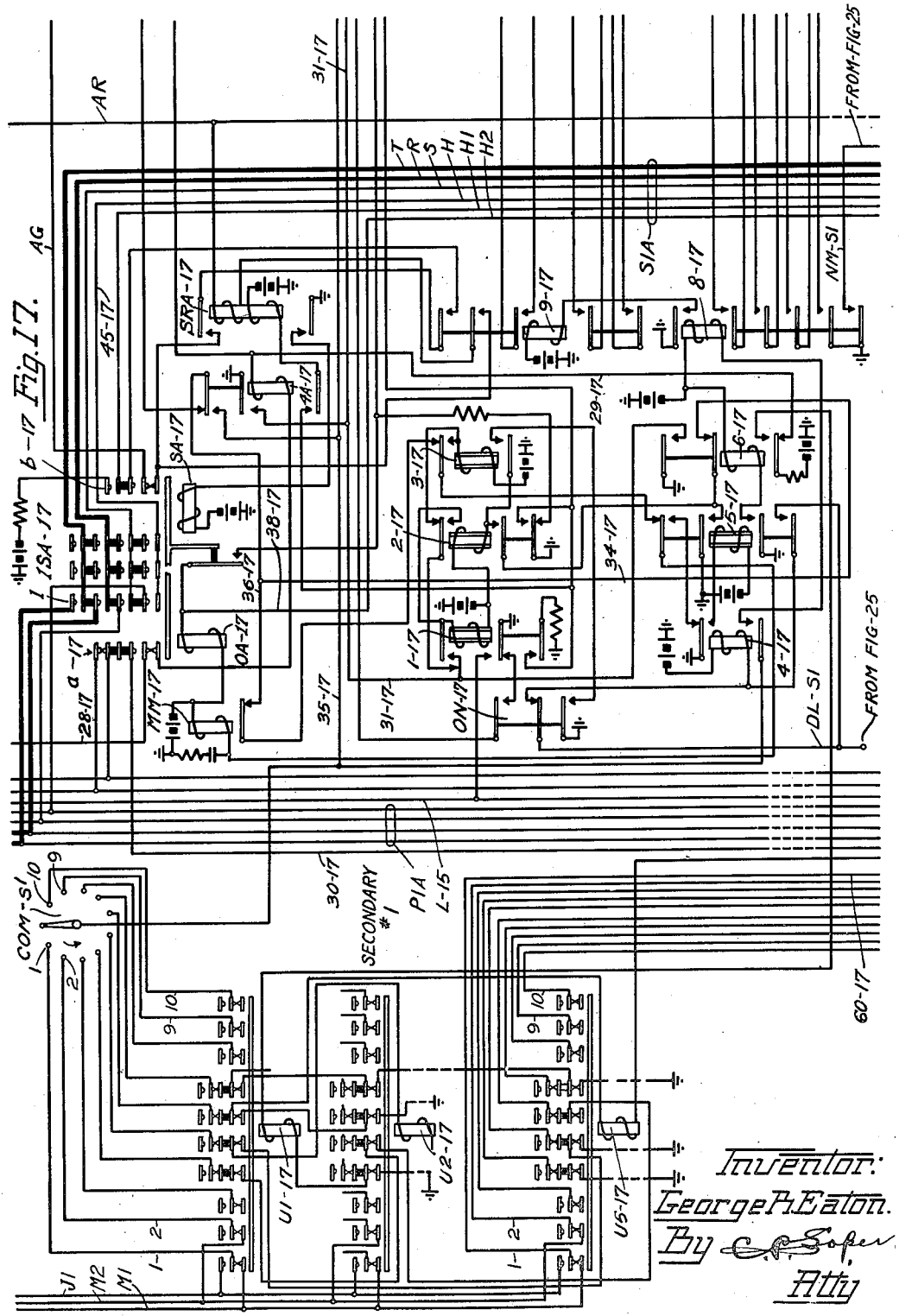
Figure 18:
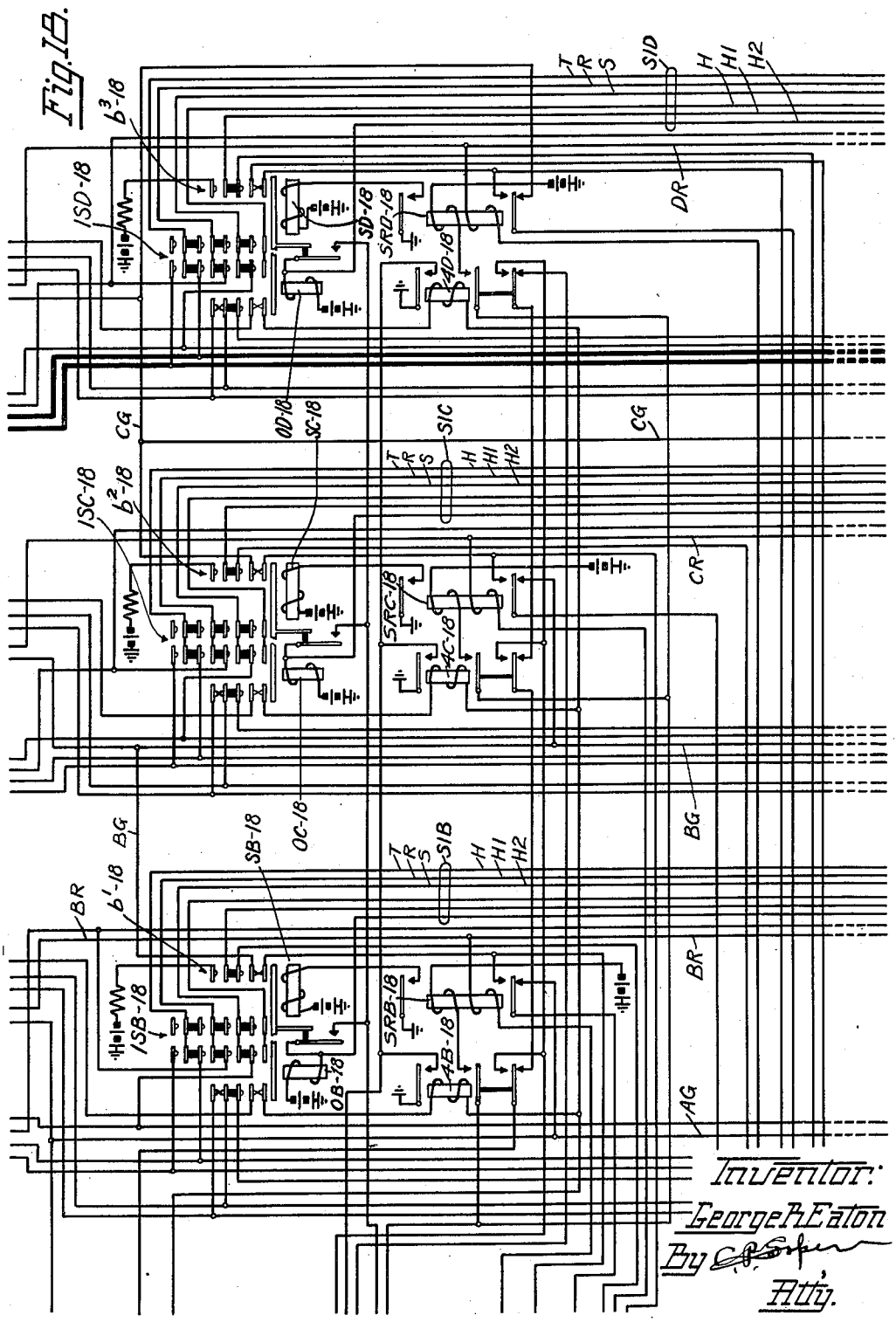
Figure 19:
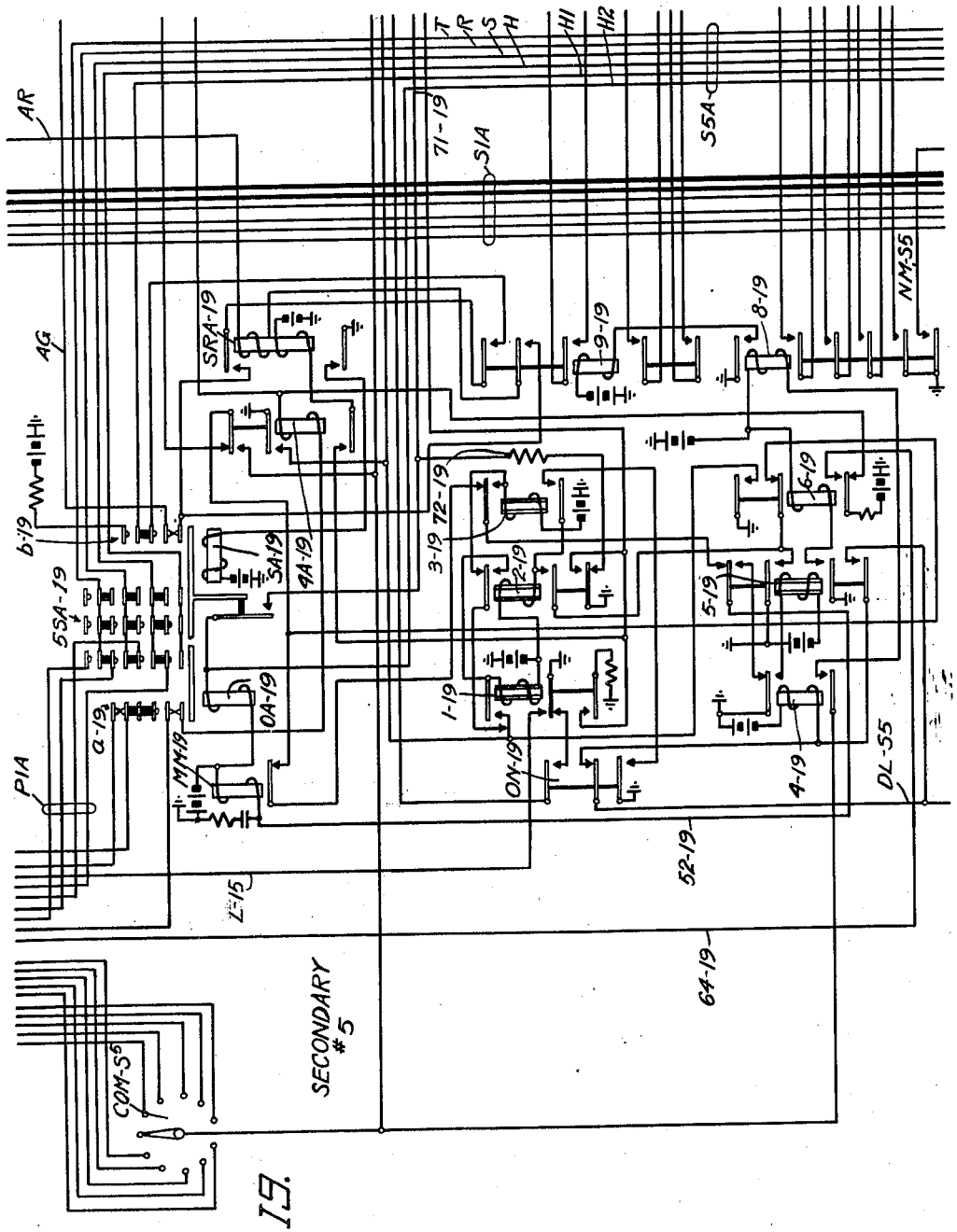
Figure 20:
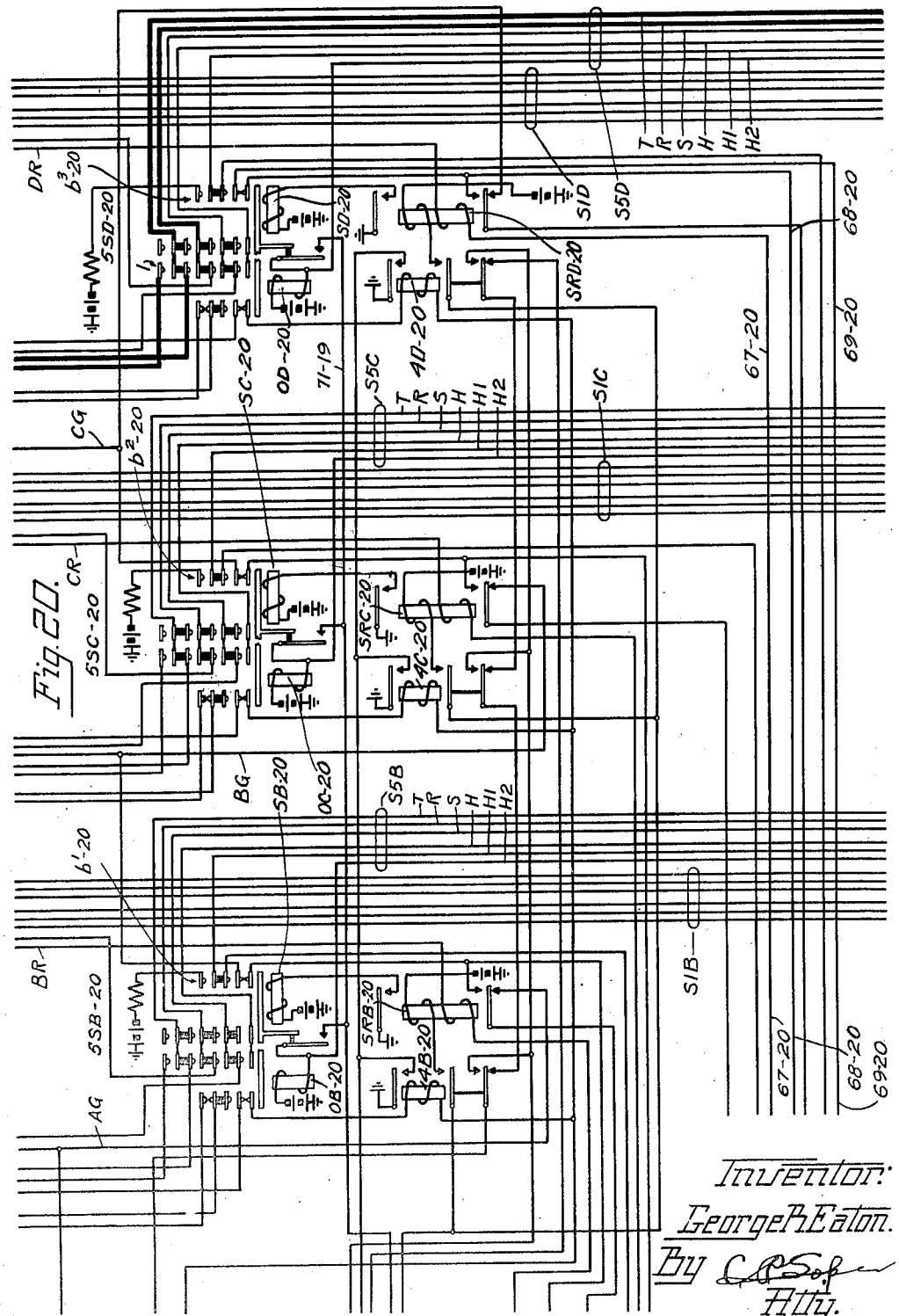
Figure 21:
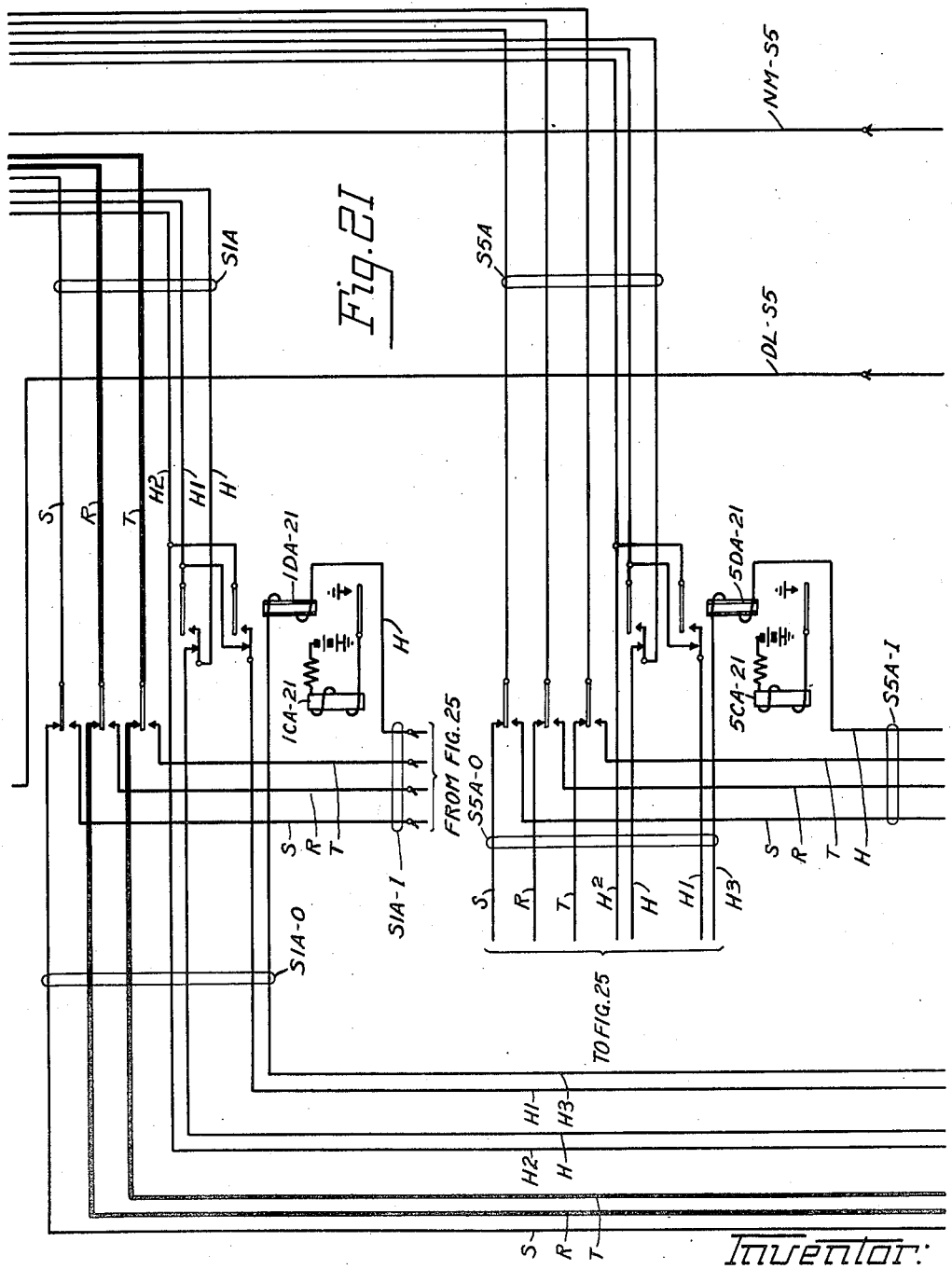
Figure 22:
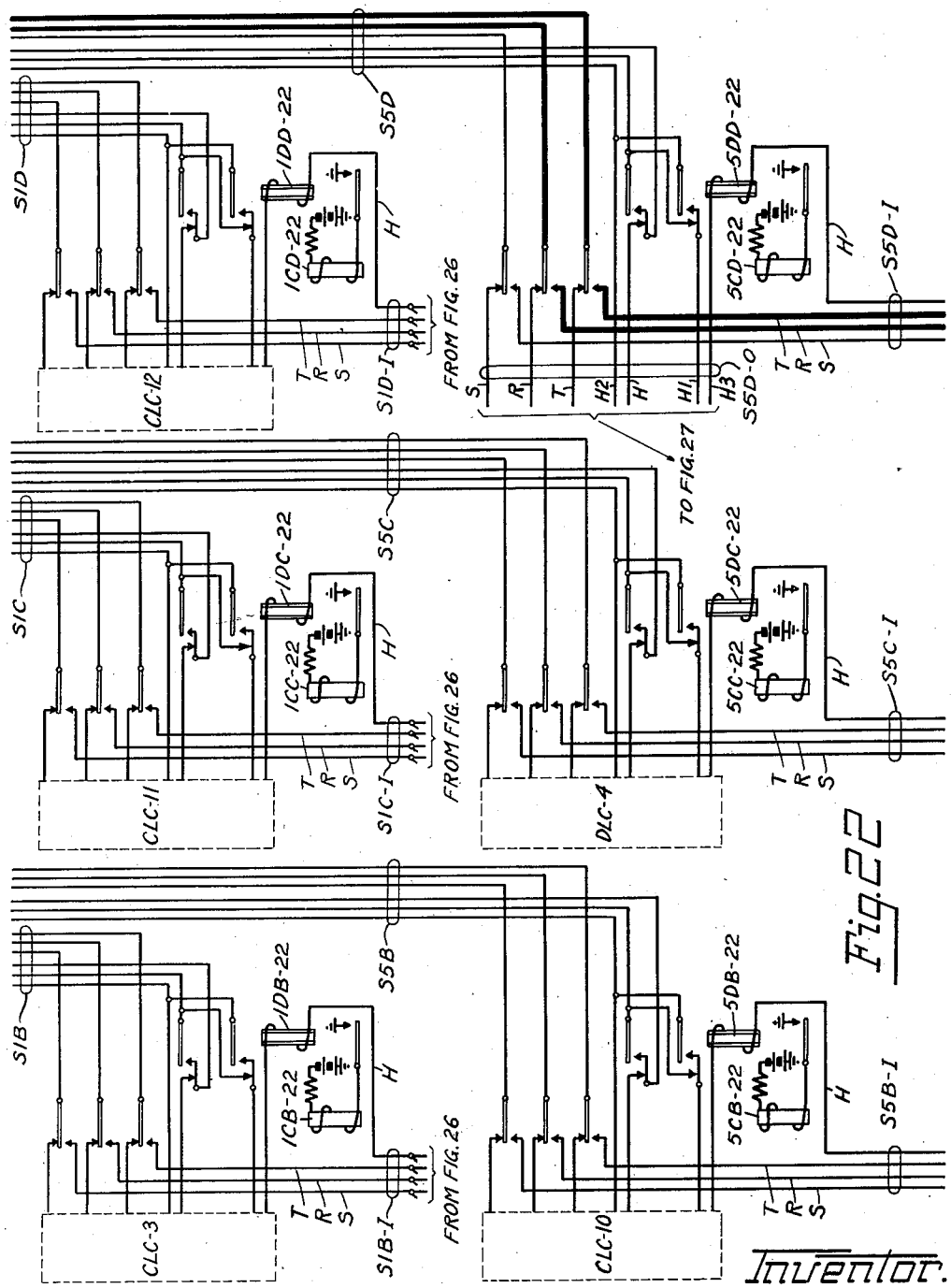

Figs. 15 and 16 indicate certain group relays common to the ten primary switching devices, one of which is shown in Figs. 13 and 14;

Figs. 17 and 18 show the circuit details of the first one of five secondary switching devices;

Figs. 19 and 20 show the circuit details of the fifth secondary switching device;

Figs. 21 and 22 show transfer relays associated with the secondary links;

Figs. 23 and 24 show a connecting link circuit;

Figs. 25 and 26 show another connecting link circuit;

Fig. 27 shows a dummy link circuit;

Fig. 28 shows the arrangement of the system;

Fig. 29 shows the matching circuits separated from the other circuit apparatus and conductors; and Fig. 30 is a diagram indicating how the sheets of circuit drawings should be arranged to form the system of the invention.

DETAILED DESCRIPTION

The invention having been described generally, a detailed description thereof will now be given.

*The switching device*

In order that the circuit arrangement disclosed herein be understood best, a description will first be given of the mechanical arrangement of the switching device as shown in Figs. 1 to 12. Fig. 1 shows a plan view of the common operating mechanism, with the common shaft 16, which extends across four similar units of contact sets, together with the first of the four units, unit A. Fig. 2 shows a front view of the apparatus shown in Fig. 1.

Unit A of the device includes ten sets or stackups of contact springs, such sets being indicated $s^1$ to $s^{10}$. By reference to Fig. 2, showing a front view of set or stackup $s^1$, and by reference to Fig. 5, showing a side view thereof, it will be noted that each of the stackups $s^1$ to $s^{10}$, as shown, comprises four pairs of normally open contacts. When the switching device is used as a primary switching device (Figs. 13 and 14) only three contact pairs to a set are needed, four contact pairs to a set being employed when the device is used as a secondary switching device (Figs. 17 to 20).

Extending adjacent to and underlying the free ends of the spring stackups $s^1$, $s^2$, etc., is a shift plate 10 which is slidably mounted on the screws 11, extending through slots 12 in plate 10. Pivotally supported on shift plate 10 by means of screws 13, are ten selecting arms or levers 14, one for each stackup $s^1$ to $s^{10}$, which are normally maintained in the positions shown in Fig. 1 by means of the respective springs 15.

In addition to the individually selectable stackups $s^1$ to $s^{10}$, the contact unit A has stackups $a$ and $b$, located at the left and at the right respectively of the selectable stackups. Stackups $a$ and $b$ are always operated (by plate 22) along with whichever one of the stackups $s^1$ to $s^{10}$ is actuated.

As seen in plan view in Figs. 1 and 3, and in end view in Figs. 5 to 8, backstop bar 8, of insulating material, underlies the stackups $s^1$ to $s^{10}$ to define the normal position of each of these stackups.

As stated, the shaft 16 extends across the front of four selecting units, the units B, C, and D being each similar to the illustrated unit A. As illustrated, ten discs 17, one for each arm 14, are fixed on the shaft or rod 16 opposite unit A, the discs being opposite respectively the stackups $s^1$ to $s^{10}$. Each of the discs 17 is provided with an offset, or cam, portion 18. These cam portions are spirally arranged around the shaft at intervals of approximately 32.7 degrees. In other words, shaft 16 has eleven positions—a normal or home position for which there is no corresponding cam 18, and ten selective, or lever-actuating, positions in each of which a cam 18 is positioned opposite one or another of the laterally extending lugs 19 at the free ends of levers 14. Electromagnetic means subsequently to be described, are provided for shifting plate 10 to the right. It is now obvious that, with one of the cams 18 opposite the projecting lug 19, corresponding to the selected stackup $s^1$, $s^2$, etc., as the case may be, and with plate 10 shifted to the right to select the unit, the selected lever 14 in the selected unit will be rotated in a clockwise direction about its supporting screw 13, against the tension of its spring 15, and the inner end, thereof, will be placed under the lowermost spring of the selected stackup, as shown in Figs. 3 and 6 of the drawings. The inner end of each of the levers 14 is provided with a groove 20 which receives a projecting stud of insulating material 21 on the lowermost spring of the stackup.

Pivotally supported under the sets of springs $a$, $s^1$ to $s^{10}$, and $b$, is an operating plate 22, having fixed thereto an armature 23 extending adjacent to a common operating magnet O, Figs. 2, 5, 6 and 8. Screws 11, on which plate 10 is slidably mounted, have their screw-threaded ends received by threaded openings in operating plate 22 so that plate 10 is tilted, along with plate 22, whenever magnet O is energized, but plate 10 is mounted for limited longitudinal movement relative to plate 22. A restoring spring 25, having one end attached to plate 10 and the other end attached to plate 22, tends to move plate 10 to the left as seen in Figs. 1 and 2.

The means for rotating shaft 16 is best seen in Fig. 4. Fixed to shaft 16 is a ratchet wheel 26 arranged to be engaged by pawls 27 and 28, fixed to arm 29 in any desired manner. Arm 29 is pivotally supported by pivot pin 30 and is arranged to be engaged by the laterally extending end 31 of the armature 32 of actuating magnet MM. From an inspection of the drawings, it will be obvious that when magnet MM is energized, armature 32 will be drawn into contact with the core of the magnet, causing the right end of arm 29 to move upwardly. Pawl 28, which comes into engagement with one of the teeth 34 of ratchet wheel 26, will now operate to rotate shaft 16 one-half step or approximately $\frac{1}{22}$ of a complete revolution. Upon the deenergization of the magnet MM, spring 35, one end of which is fixed to arm 29 and the other fixed to the magnetic circuit member 36, acts to draw arm 29 downwardly, and pawl 27 engages a tooth on the opposite side of ratchet wheel 26 to complete the rotary step of shaft 16. Thus the shaft 16 will be rotated one step or approximately $\frac{1}{11}$ of a complete revolution each time the actuating magnet MM is energized and deenergized. Except when the selecting mechanism is in its normal position, each step will act to place one or another of the cams 18 opposite a projecting portion 19 of an arm 14 so that the corresponding contact stack-up $s^1$, $s^2$, etc., or whichever it may be, will be actuated, as shown in Fig. 8 of the drawings as a result of the energization of the operating magnet of the selected one of the four units A to D (only unit A is shown) which has its plate 10 shifted to the right.

As shown to the right in Fig. 3, located between units A and B, an arrangement is provided which is termed herein a commutator. This commutator is shown schematically at COM-P in Fig. 13 and again at "COM—S'" in Fig. 17 and at "COM—S⁵," Fig. 19. In actual construction, this commutator preferably comprises ten pairs of contact springs 37, one pair for each of the selective, or off-normal, positions of the shaft 16, which pair is closed whenever the shaft occupies a position corresponding thereto. Only five pairs of springs 37 are shown in Fig. 3, but it is to be understood that five other pairs of springs are located directly below those shown. Positioned on shaft 16, between each two pairs of springs 37, is a disc 38, having a cam projection 39. These cams are shown in their relative positions in Fig. 12 and they are so arranged as to close a pair of springs 37 in each operative position of shaft 16, all of cams 39, as well as cams 18, being inoperative when the shaft is in its eleventh or home position.

In Fig. 7 is shown the means for shifting plate 10 laterally at the time a connection is to be made through the illustrated unit A. Extending downwardly from shift plate 10 is a pin 40 arranged to be engaged by the arm 41, extending at substantial right angles to armature 42, pivotally supported on pin 43. An electromagnet S is associated with armature 42, which upon energization, moves arm 41 into engagement with pin 40, moving shift plate 10 to the right, as seen in Figs. 1 and 2 of the drawings. Shift magnet S appears in Fig. 13 as SA—13, the similar magnets SB, SC, and SD of Fig. 14 being those of units B, C, and D, respectively.

Arm 42 is provided with a lug 45 of insulating material adapted to engage spring 46 and move it into engagement with contact spring 47 when a magnet S is energized. Contact springs similar to 46 are shown, for example, at 46A—13, Fig. 13.

A very simple expedient is provided for quickly and accurately positioning the various cams on the shaft 16. Shaft 16 is provided, along one side, with a groove or keyway arranged to receive a bar or rod 48 which forms a spline or key. The various discs, such as the cam discs 17 and the commutator discs 38, are provided with eleven equidistant notches 50, shown in Figs. 9 and 12. Thus, all of the cams 17 may be made alike and all of the cam discs 38 may be formed alike. In mounting the discs (as for instance the discs 38) on the shaft 16, it is only necessary to slip the successive discs one notch to secure the necessary spiral arrangement of the cams on the shaft. The cam discs 17 may also be mounted in the same manner, being slipped one notch 50 for each cam added to the shaft. Thus, after the first cam discs 17 of the group have been correctly placed on the shaft in relation to the discs 38, the other discs 17 may be added in an obvious manner. Spacers 51 are provided between the various cam discs to maintain them in the proper spaced relation along shaft 16.

The sequence of operations of the contact stack selecting mechanism, above described, is as follows. Suppose unit A is alotted or selected. Then, shift plate 10 thereof is moved to the right by magnet S to select the unit. Shaft 16 is rotated, through the medium of the mechanism shown in Fig. 4, to a position corresponding to the desired spring stackup of unit A. With shift plate 10 moved to the right, the lever or arm 14 corresponding to the set position of shaft 14 will have been rotated in a clockwise direction by means of the operative selecting cam 18, as best seen in Fig. 3. Finally, magnet O of the selected unit A is energized, tilting plate 22, and shift plate 10 carried thereby, into the position shown in Fig. 8. All of the arms 14 of the selected unit A, except the one corresponding to the operative cam 18, are in a position such that, when magnet O tilts plates 22 and 10, they pass idly between the successive contact stacks, as shown in Fig. 3. The selected arm 14, however, underlies its contact stack, and the groove 20 at the inner end thereof will receive the end of the insulating pin 21 carried by the lowermost spring, and the contacts of the selected stackup are moved in operated position, as indicated in Fig. 8. In the normal operation of the mechanism, the operating magnet O will remain energized during a connection, but the shift magnet S, Fig. 7, is restored to permit the shift plate 10 of Figs. 1 to 3 to return to its normal position illustrated in Fig. 1 as soon as the selected contact set or stackup of the allotted or selected unit has been actuated. By reason of the indentation at 20 (seen in section in Figs. 6 and 8) in the operating end of each of the levers 14, the actuated contact arm is maintained under its actuated contact set to hold it actuated as long as the operating magnet O is maintained energized, whereby no harm results when the shift plate 10 restores to terminate the allotted or selected condition of the unit.

As soon as it has performed its function, the selecting mechanism, comprising the shaft 16 and the common apparatus associated therewith, immediately returns to its normal position so the switching device may be used in the establishment of another connection, through another of the four selecting units. In other words, the common selecting mechanism of a switching device is tied up only so long as it is actually in use in establishing a connection through one of its four units.

As previously stated, the shaft 16 has ten working or off-normal positions and an eleventh or normal position. The return of the shaft to its normal position after a use thereof is controlled by certain ones of the springs in the off-normal stackup ON, shown in Figs. 1 to 3, and controlled by COM—9. This off-normal stackup of contact springs is associated with the common shaft 16, and is, therefore, common to the four units of selective contact sets A to D. The number and arrangement of the contact springs in said stackup ON may be varied as desired, one such arrangement being shown at ON—13 in Fig. 13, while a specifically different arrangement is shown at ON—17, in Fig. 17, and again at ON—19, Fig. 19.

Although only one unit, unit A, of the switching device is shown in the mechanical drawings, Figs. 1 to 12, it will be understood that units B, C, and D are arranged to the right of the apparatus disclosed in Fig. 3 and are similarly associated with the extended shaft 16. Each of the units, as previously pointed out, contain the ten selectively operable contact sets or spring stackups, such as $s^1$ to $s^{10}$ of unit A, together with a shift plate such as 10, and the control levers such as 14, as well as the ten discs 17. Additionally, it will be understood that each of the four units has two common stackups of springs, similar to *a* and *b* of unit A, both of which are actuated each time the associated operating magnet such as O is energized. The springs in stackups *a* and *b* are included in certain control circuits to be hereinafter described.

The system arrangement

Referring now particularly to Fig. 28, the arrangement of the system as disclosed therein will be described.

A number of switching devices, each similar to the switching device illustrated in Figs. 1 to 12 and hereinbefore described, are used in the system. The ones of these switching devices which have access to the subscriber lines may be termed primary switching devices, or primaries, while those which have access to the primary switching devices, and thus indirectly to the subscriber lines, are termed secondary switching devices, or secondaries. The system as disclosed herein employs ten primaries (primary switching devices) and five secondaries (secondary switching devices).

The switching devices are conveniently mounted with the shafts 16 thereof extending horizontally as indicated in the plan and front views, Figs. 1 and 2. The devices are also conveniently mounted one above the other, with the "A" units vertically aligned to form a column of such units; the "B" units vertically aligned to form a column of such units; and with the "C" and "D" units respectively aligned to form the C and D columns. With such an arrangement, the units of the switching devices are conveniently referred to as lying in the concerned one of four columns, A, B, C, and D. It will be understood, of course, that the column arrangement is merely one of convenience, and that the switching devices may be mounted in any other desired relationship. The reference hereinafter to columns A, B, C, and D will be understood in the light of the above explanation.

In Fig. 28, only the first, fourth, sixth, and tenth of the ten primaries are indicated, the others being omitted for the sake of compactness of the illustration. All five of the secondaries, however, are indicated. The "A" units of the primaries and secondaries are shown aligned in a column labeled "Column A"; the "B" units are shown aligned in a column labeled "Column B"; the "C" units are shown aligned in a column labeled "Column C"; and the "D" units are shown aligned in a column labeled "Column D."

Each primary has access to ten subscriber lines. Primary #1, for example, has access to the ten-line group of lines designated by the initial digit "1" of the telephone numbers, lines 11 to 10. The lines 11 to 10 are associated respectively with the spring stackups in unit A (column A) of the first primary which corresponds respectively to the stackups $s^1$ to $s^{10}$, Fig. 1. The lines 11 to 10 are multipled to and similarly connected with the B, C, and D units of primary #1, located at the head of columns B, C, and D, respectively. The primary #1 is thus identified in each of the four columns with the lines of the first tens group. Each of the other nine primaries similarly has access to and is identified in all four columns with the lines of the correspondingly numbered tens group, the ten primaries collectively giving access to one hundred lines, a separate tens group of lines for each primary.

As each primary has four units, one for each of the columns A to D, four lines of any tens group can be connected with simultaneously, one line for each of the columns A to D.

As will be pointed out more fully hereinafter, the unit of a primary in any column can act alternatively as a line finder to connect with a calling line or as a connector to make connection with a called line, the use of a unit depending upon the traffic conditions existing from time to time in the system as calls are made. The order of preference, however, for line finder action is from left to right or from column A to column D, while the order of preference for connector action is from right to left, or from column D to column A. Generally speaking, therefore, the units in columns A and B are used more often for finder action (extending connections from calling lines), while columns C and D are used more often for connector action (extending connections to called lines).

With reference to the other illustrated primaries (#4, #6, and #10), it is to be noted that the line multiples of these primaries have been omitted for the sake of compactness of the illustration, as the line multiple of each of the other primaries is as illustrated for primary #1, that is, each of the four units of any primary has access to all of the ten lines of the correspondingly numbered tens group of subscriber lines.

For the purpose of enabling desired interconnections to be made between any primary unit in any column and any other primary unit in the same or any other column, the primaries are linked with the five secondaries and the secondaries are interconnected with each other. The link between the column-A unit of primary #1 and the secondaries in the primary link P1A, primary links P1B, P1C, and P1D similarly linking the column-B, column-C, and column-D units of primary #1 with the secondaries. The links to the secondaries for the other illustrated primaries are shown.

It is to be observed that primary link P1A occupies the first selective position in the column-A unit of each of the five secondaries; the column-A link associated with the fourth primary occupies the fourth selective position in the column-A units of all of the five secondaries, the column-A units of the sixth and tenth primaries occupying the sixth and tenth selective positions, respectively in the column-A units of all of the five secondaries. The same arrangement of inter-linkage between the primary and secondary units is carried out in each of the other columns B, C, and D. By this arrangement each of the five secondaries has a link path in each column to each of the ten primaries.

As noted, each of the primaries 1 to 10 is reached from the secondary through the correspondingly numbered selective position thereof. The selective position through which a primary is reached from a secondary has no particular significance from the standpoint of line-finder action, but is significant during connector action when a secondary is actuated in response to a dialed tens digit to make connection with the primary having access to the tens group of lines designated by such dialed digit.

It may be noted at this point that the multipling between the selective positions of the primaries is horizontally or between columns, while the multipling between the selective positions of the secondaries in each case is vertical, or within the column.

One of the possible paths over which a connection can be extended from line 11, as a calling line, to line 10, as a called line, has been indicated by the heavily inked lines. By following these heavy lines it may be observed that the line 11 when calling may be extended through the first selective position of primary #1, column A, to the primary link P1A; through the first selective position of secondary #1, column A; to the secondary link S1A; and thence through normally closed contacts of transfer relay 1CA—21 (shown in Fig. 21) and the outgoing branch S1A—0 of the secondary link S1A to the connecting-link circuit CLC—1.

The extension of the connection thus far takes place responsive to the removal of the receiver on the calling line, by successive operation of the #1 primary and #1 secondary, the column-A unit in each case. The connecting-link circuit CLC—1, shown in full in Figs. 23 and 24, contain control circuits and test circuits by which the further extension and the final clearing out of the connection are controlled.

The heavy lines in Fig. 28 further indicate that the connection may be further extended from the connecting-link circuit CLC—1 (by connector action) through contacts of the column-D relay 2D—24 (shown in Fig. 24), column D having preference for connector action; and thence by way of the incoming branch S5D—I of the secondary link S5D, through contacts of transfer relay 5CD—22, when the relay is operated, and through to the secondary link S5D to the column-D unit of the #5 secondary. The connection proceeds thence through the first selective position of the column-D unit of the #5 secondary, by of and transfer it to the incoming branch S5D—I unit of the #1 primary; and thence, by way of the tenth selective position thereof, to the called line 10. In the establishment of this connection, it should be noted that transfer relay 5CD—22 is required to operate to disconnect the secondary link S5D from the outgoing branch S5D—0 thereof and transfer it to the incoming branch S5D—I thereof. Each of the secondary links is correspondingly provided with a transfer relay which is arranged to control the connection of the link with the outgoing and incoming branches of the link.

It will be understood, of course, that five secondaries are illustrated by way of example, and that the number of secondaries may be increased or decreased according to the traffic requirements, depending somewhat upon the locality and upon the nature of the subscriber lines, whether largely individual lines, or largely party lines, for example. Likewise, the number of columns may be increased or decreased as desired, depending upon the traffic requirements.

From Fig. 28 and the explanation hereinbefore given it will be observed that, for the 100-line system as shown, there are forty primary links (such as P1A to P1D), one for each of the ten primary units in each of the four columns. It will be observed, further, that these forty primary links extend calls to and receive calls from twenty secondary units, one for each of the five secondaries in each of the four columns. There are thus provided twenty secondary links (such as S1A to S1D), one for each of the twenty secondary units. This reduction from forty to twenty is made possible by the greater trunking efficiency in the secondary and secondary links, because any secondary unit in any column has access to all of the primary units in the same column.

Experience has shown that about ten conversational paths are about all that need be provided for the average 100-line system, and the twenty illustrated secondary units, when interconnected in pairs, provide for ten conversational paths, such as the one indicated by the previously discussed heavy lines, each from a separate calling line to a separate called line. As previously stated, the number of secondaries may be increased above five, or the number of columns may be increased above four in the event that more conversational paths are needed in any given instance.

It is to be observed that the connecting-link circuit CLC—1 is only one of twelve such connecting-link circuits. The connecting-link circuits are provided somewhat in excess of the maximum number of conversational paths that can be set up, because sometimes the incoming or connector-action branch of a conversational path may be through a secondary link provided with a connecting-link circuit, whereby a second connecting-link circuit is withdrawn from common use on single connection. In the contemplated operation of the system, however, such occurrences are infrequent, occurring generally only when all, or nearly all, of the secondary units are in use.

It is to be observed that the outgoing or finder-action branch of each of the five column-A secondary links (including secondary links S1A and S5A) leads to a connecting-link circuit, the connecting-link circuit associated with the column-A secondary links being respectively CLC—1, CLC—5, CLC—4, CLC—7, and CLC—9. Similarly the outgoing or finder-action branches of the five column-B secondary links, including S1B and S5B, are connected respectively to connecting-link circuits CLC—3, CLC—6, CLC—2, CLC—8, and CLC—10.

Of the column-C and column-D secondary links, only those (S1C and S1D) associated with the #1 secondary are extended to connecting links, being the connecting links CLC—11 and CLC—12, respectively. The outgoing branches of the remaining ones of the column-A secondary links are connected respectively to dummy-link circuits DLC—1 to DLC—4, while the outgoing branches of the second to fifth secondary links of column D are connected respectively to dummy-link circuits DLC—5 to DLC—8. These dummy-link circuits are provided to enable a busy signal to be given the calling subscriber and to enable the partially established connection to be cleared out in those rare instances when a connection is made by finder action to the concerned secondary links, which are not equipped for connector action. If desired, of course, some or all the dummy-link circuits DLC—1 to DLC—8 can be replaced by connecting-link circuits equipped to control extension of connections by connector action, but the use of the simpler dummy-link circuit (shown in full in Fig. 27) is believed to be preferable in view of the relative infrequency with which the line finder action of the primaries and secondaries results in extension of calling lines to the column-C and D units of secondaries #2 to #5.

It is to be observed that the incoming or connector-action side of the connector link CLC—1 can be connected alternatively by the four relays 2D-26 to 2A-25 to the incoming branches of the four secondary links extending to the four units of secondary five. It will be observed further that similar relays are provided through whose contacts the connecting-link circuits CLC—2 and CLC—11 may be connected with the same links, leading to the units of the #5 secondary. Similarly, connecting-link circuits CLC—3, CLC—4 and CLC—12 have access to the links leading to the units of the #4 secondary; connecting-link circuits CLC—5 and CLC—6 have access to the links leading to the #3 secondary; connecting-link circuits CLC—7 and CLC—8 have access to the links leading to the #2 secondary; and connecting-link circuits CLC—9 and CLC—10 have access to the links leading to the units of the #1 secondary.

It is to be observed that the connecting-link circuits CLC—1 to CLC—12 are reached in finder action in each case from secondaries different from those to which they have access for connector action, whereby a connection, extended by finder action to a secondary unit in any column, and thence to one of the connecting-link circuits (CLC—1 to CLC—12), can be extended by connector action to a secondary unit in any column.

As will be pointed out hereinafter, what are termed matching circuits, and what are termed dialing circuits, are carried over conductors generally separate from the illustrated link circuits, but this aspect of the arrangement is not susceptible of being shown and described in connection with the system layout drawing, Fig. 28, but is shown in the circuit drawings and will be described hereinafter in connection therewith.

*The circuit drawings*

The circuit drawings shown in Figs. 13 to 29 will now be described generally, preliminary to a detailed description of the operation of the system.

In order to facilitate the locating on the circuit drawings of the various parts referred to herein, the reference characters employed for the parts generally have in each case a suffix indicating the figure of the drawings showing such part; for example, the part IPA—13 indicates the column-A unit of the primary #1, shown in Fig. 13.

As previously mentioned, Figs. 13 and 14 show the circuit arrangements of the first of the ten primaries, primary #1, the circuits of the other primaries not being shown in the circuit drawings, for the circuits of one of the primaries are illustrative of the circuits of any other primary, the only difference between the primaries being that each serves a specifically different ten-line group and each is reached from a specifically different selective position of the secondaries.

The equipment shown in the upper left-hand corner of Fig. 13 includes that of the first and tenth subscriber lines (Nos. 11 and 10) of the first group, the automatic telephone substations connected respectively thereto being indicated in each case by a circle with the number of the line therein. The substation circuits have not been shown in detail as they are well known and form no part of this invention. Each of the illustrated lines has a line circuit associated therewith, including line and cutoff relays such as LR—13 and CO—13.

The column-A unit of the first primary is shown at IPA—13, the a and b stackups (a—13 and b—13) being shown, along with the selective-position stackups 1, 2, and 10, corresponding respectively to contact-spring stackups $s^1$, $s^2$, $s^{10}$ of Fig. 1. The third to ninth selective-position contact sets have been omitted for the sake of compactness. The position occupied by them is indicated by the broken or dotted portions of the horizontal multipling between contact sets. Similarly, the column-B to column-D units of the #1 primary are indicated in Fig. 14 at IPB—14 to IPD—14. In Fig. 14 the contact sets shown for a unit are the a and b contact sets, such as a'—14 and b'—14, together with the first and tenth selective-position contact sets, the selective-position contact sets 2 to 9 being omitted in each case in order to conserve drawing space.

Fig. 13 shows also certain equipment, within the broken-line rectangle, common to the four units of primary #1. This equipment includes the commutator COMP, shown at 37 and 38 in Fig. 3, but indicated diagrammatically in Fig. 13 as a rotating brush standing in home position and arranged to engage ten selective-position contacts successively. The other common equipment includes the motor magnet MM—13, shown at MM in Fig. 4, being the magnet which controls the step-by-step rotation of the shaft 16, shown in the drawings such as Figs. 1 to 4. Also included within the broken-line rectangle of Fig. 13 are the finder-action relays 1—13 to 3—13, and the three connector-action relays 4—13 to 6—13.

Each of the primary units has associated therewith an operating magnet and a shift magnet, corresponding respectively to the operating magnet 9, Figs. 2, 5, 6, and 8, and the shift magnet indicated at S in Fig. 7. The operating magnets are respectively OA—13 to OD—14, while the shift magnets are SA—13 to SD—14.

Each of the column-A to column-D units of the #1 primary has a four-conductor link extending therefrom, the links P1A to P1D. Each link has a link relay associated therewith, such relays being indicated respectively at $A_1$—13 to $D_1$—14.

Each unit of a selecting device has associated therewith a relay termed a shift relay, but which may also be termed a selecting relay. The shift relays for the four units of primary #1 are respectively SRA—13 to SRD—14.

Each of the ten primaries has a "J" relay, or a matching-control relay, associated therewith. The matching-control relay for the #1 primary is shown in Fig. 14 at J—14.

The marking-control relays (XA—15 to XD—16) shown in Figs. 15 and 16 are each associated with a separate one of the columns A to D, and each "X" relay is common to the ten primary units in the associated column. Relays XA—15 to XD—16 are arranged to operate only one at a time during line-finder action in any primary column to temporarily associate the individual marking conductor of that column with the common marking conductors M1 to M10 of the secondaries to the exclusion of the other primary columns during that short interval of time required for the secondary to make connection with the calling one of the primaries in the column concerned.

Figs. 17 and 18 show the circuit arrangements of the first of the five secondaries. The commutator COM—$S^1$ and relays 1—17 to 6—17 correspond respectively to the parts COM—P and relays 1—13 to 6—13, above discussed, being common to the four units 1SA—17 to 1SD—18 of the first secondary. Additionally, the motor magnet MM—17 corresponds to the motor magnet MM—13, being the one which rotates the shaft in the first secondary. Each unit of the secondary #1 has an operating magnet and a shift magnet, as well as a shift relay. The column-A unit ISA—17, for example, has operating magnet OA—17, shift magnet SA—17 and shift relay SRA—17. Additionally, each unit of the secondary has a start relay. The start relay for unit A is relay 4A—17, start relays 4B—18 to 4D—18 being associated respectively with the B, C, and D units.

The four units of secondary #1 are linked respectively to the connecting-link circuits by six-conductor links S1A, S1B, S1C, and S1D.

The second, third, and fourth secondaries are not shown in the circuit drawings, but the circuits of the fifth secondary are shown in full in Figs. 19 and 20. The parts thereof correspond respectively to the parts of the secondary #1, and similar reference characters are applied to enable a ready comparison to be made.

The primary links, as shown in Fig. 28, are multipled to the selective contacts of all five secondaries, the multipling being by columns as shown. Such multipling is shown in Figs. 17 to 20 by certain of the vertically extending conductors between secondary #1 and secondary #5. The portions of these conductors which are broken or dotted indicate the place therein where the conductors are multipled to secondaries #2 #3, and #4, but such multiple has been omitted for the lack of space.

Referring again to Figs. 15 and 16, it will be observed that ten marking conductors M1 to M10 are provided, of which conductors M1, M2 and M10 are shown extending horizontally across Figs. 15 and 16. One such conductor is provided for each of the ten primaries. These ten marking conductors are normally connected in multiple to the respective selective-position contacts of the commutators of all the secondaries, such as COM—S1 of secondary #1 and COM—S5 of secondary #5. The connection between the commutator contacts and the common multiple of the marking conductors M1 to M10 is taken through contacts of five relays termed "U" relays, one for each secondary. The "U" relays for the first, second and fifth secondaries are shown along the left-hand edge of Fig. 17, being, respectively, relays U1—17, U2—17, and U5—17. Each of the "U" relays is adapted to be actuated when the associated secondary is taken for use in connector action, to disconnect the ten conductors of the associated commutator from the marking conductors M1 to M10 of Figs. 15 and 16 and to transfer them to the matching conductors J1 to J10 of Figs. 15 and 16, associated respectively with the ten primary matching-control relays, such as J—14 of primary #1.

Referring now to Figs. 21 and 22, the transfer-relay equipment (indicated in Fig. 28 for the twenty secondary links) is shown for the links of secondaries #1 and #5. The relay pairs including relays 1CA and 1DA (21) to 1CD and 1DD (22) are associated respectively with the links S1A to S1D of secondary #1, while the transfer relay pairs including relays 5CA and 5DA (21) to 5CD and 5DD (22) are associated respectively with links S5A to S5D of secondary #5. The outgoing (finder-action) branch S1A—0 of link S1A extends to the connecting-link circuit CLC—1, shown in Figs. 23 and 24, while the outgoing (finder-action) branches of the links S1B, S1C, and S1D of the first secondary extend respectively to connecting-link circuits CLC—3, CLC—11, and CLC—12, each of which is indicated connected in Fig. 22 as a broken-line rectangle. These link circuits are each similar to CLC—1, as shown in Figs. 23 and 24, and they are interconnected for connector action as indicated in Fig. 28, hereinbefore described.

The outgoing branch S5A—0 of link S5A (column A, of secondary #5) extends to the connecting-link circuit CLC—9, Figs. 25 and 26; the outgoing branch of the secondary link S5B extends to the connecting-link circuit CLC—10, shown in Fig. 22 as a dotted rectangle, its circuits being as illustrated in Figs. 23 and 24; the outgoing branch of the secondary-link circuit S5C extends to the dummy-link circuit DLC—4, indicated in Fig. 22 as a dotted rectangle, its circuits being as shown in Fig. 27; and the outgoing branch S5D—0 of the link circuit S5D extends as connected to the dummy-link circuit DLC—8 shown in Fig. 27.

Referring now to Figs. 23 and 24, the connecting-link circuit CLC—1 shown therein includes the test and control relays 1 to 16, those shown on Fig. 23 having the suffix 23 after the distinguishing reference character, while those on Fig. 24 have the suffix 24 after the distinguishing reference character. The function and operation of these relays will be described hereinafter.

The connecting-link circuit CLC—1 also has four connecting relays (2A—23, 2B—24, 2C—24, and 2D—24) associated therewith, each of which relays is associated with a separate one of the columns A to D, as shown in the circuit drawings and as indicated in the previously described Fig. 28. It is through the action of one or another of these relays that the incoming or connector-action end of the connecting-link circuit CLC—1 is interconnected with one or the other of the columns A to D to enable a connection which has been extended by outgoing action, or finder action, to the connecting link circuit CLC—1 to be extended by incoming connector action to the called line.

As shown in the circuit drawings, the connecting-link circuit CLC—1 has access, through its connecting relays 2A—23 to 2D—24, to the incoming or connector-action branches S5A—I to S5D—I of the link circuits S5A to S5D of secondary #5. The connecting-link circuit CLC—1 is only one of the three connecting-link circuits identified from the standpoint of connector action with the #5 secondary, the other two being CLC—2 and CLC—11, Fig. 28. As a result the dial lead DL—S5 of the #5 secondary extends in multiple to the connecting-link circuit CLC—1 of Figs. 23, 24, and 28, and connecting-link circuits CLC—2 and CLC—11 of Fig. 28. The no-match conductor, NM—S5, of the #5 secondary, is similarly connected in multiple to the three connecting-link circuits just named.

As shown in Figs. 21, 22, 25, and 26, connecting relays 2A—25 to 2D—26 of the connecting-link circuit CLC—9 afford access, respectively, by way of the incoming or connector-action branches S1A—I to S1D—I, to the secondary links S1A to S1D of the secondary #1, Figs. 17 and 18. The connecting-link CLC—9 is thus identified with the secondary #1 for connector action, along with connecting-link CLC—10, as shown in Fig. 28 and described in connection therewith. As a result, the dial and no-match leads DL—S1 and NM—S1 (Fig. 17) of the secondary #1 are each connected in multiple to the corresponding conductors of the connectors CLC—9 and CLC—10.

Operation

The apparatus, system arrangement, and circuit drawings having been described hereinbefore, a detailed description of the operation of the system in setting up and releasing connections between the lines will now be given. For this purpose, it will be assumed that the subscriber at substation 11, Fig. 13 (on line 11) desires to converse with the subscriber at substation 10 (on line 10).

A call from line 11 to line 10

Before proceeding with the description of the connection between lines 11 and 10, it may be pointed out that the connection whose establishment is about to be described, when completed between the calling line 11 and the called line 10, is over the talking conductors which are heavily inked through Figs. 13, 15, 17, 19, 21, 23, 24, 22, 20, 18, 16, 14, and 13. The heavily inked lines correspond to those shown in Fig. 28, representing one of the possible circuits as over which a connection may be established from the line 11, as a calling line, to the line 10, as a called line.

One point to be noted about the connection about to be described is that the line called is one in the same tens group and served by the same primary (primary #1) that serves the calling line. It will be understood from a reading of the description which is to follow how calls can be set up with equal facility from any calling line in any tens group to any called lines in the same or any other tens group.

When the receiver is removed at substation 11, the double-wound line relay LR—13 is energized over the associated line and through the calling substation in the usual manner, its circuit including normally closed contacts of cutoff relay CO—13. Upon operating, line relay LR—13 disconnects ground potential from its individual marking conductor, extending to the No. 1 selective position of the commutator COM—P. The controlling shaft of the #1 primary (corresponding to shaft 16 of Figs. 1 to 3) is thus enabled, when started into operation, to stop in the No. 1 position, the position assigned to the calling line 11.

Line relay LR—13 also places ground potential on the associated start conductor P1—ST, common to the ten lines served by primary #1. The grounding of conductor P1—ST serves to start the shaft-control equipment of the primary into operation in search of the calling line.

Initiating primary finder action

With ground potential on conductor P1—ST a circuit is closed, through contacts of relay 5—13, and thence by way of normally closed contacts controlled by the inner armature of relay 1—13, and the inner armature and back contact of relay 2—13, to the winding of start-pulse relay 3—13, the other terminal of which is connected to free pole of the exchange battery, as shown. Relay 3—13 thereupon operates, and at its upper armature it temporarily disconnects the motor magnet MM—13 from its self-interrupting circuit and transfers it to the now-grounded upper terminal of the winding of relay 3—13. As a result motor magnet MM—13 is energized, through contacts of relay 5—13, causing the associated shaft to be rotated a half step, from its normal position toward its first selective position, the operation being as explained in connection with Fig. 4.

Upon the movement of the shaft of the #1 primary from its normal position, off-normal-spring stackup ON—13, corresponding to spring stackup ON of Figs. 1 to 3, is shifted by a cam corresponding to cam 9 of Figs. 1 to 3. The off-normal contacts operate as soon as the mechanism leaves its home position, and remain operated until the home position is again reached.

When the off-normal springs ON—13 shift, the middle contact pair thereof closes a circuit through the lower contacts of the actuated start-pulse relay 3—13 for test relay 2—13. Test relay 2—13 thereupon operates, and at its lower armature it connects its winding to the brush of the commutator COM—P, so as to hold operated over this brush as long as the commutator is advancing over contacts connected with grounded, or non-calling, marking conductors. Relay 2—13 also disconnects the grounded start conductor P1—ST from the upper terminal of start-pulse relay 3—13, and consequently from the winding of motor magnet MM—13, thereby opening the circuit of relay 3—13 and of the motor magnet MM—13. Relay 3—13 is somewhat slow-acting and remains operated for a slight interval, but motor magnet MM—13 restores immediately and advances the mechanism the remaining half step to the first selective position.

Test relay 2—13 also transfers the grounded start conductor P1—ST to conductor 22—13, thereby closing a circuit through the lower pair of off-normal contacts ON—13 for the winding of slow-restoring hold relay 1—13. Hold relay 1—13 thereupon operates and connects conductor 23—13 to the grounded start conductor P1—ST, at its inner upper armature, at the same time disconnecting the start conductor from the inner upper armature of relay 2—13. Slow-restoring hold relay 1—13 thus opens its initial circuit and prepares a locking circuit for itself, subject to completion at the lower contacts of any one of the shift relays SRA—13 to SRD—14. Additionally, relay 1—13 at its uppermost armature applies a ground potential to the second contact spring (from the top) in stackup b—13, the ground potential being applied by way of the upper armature and back contact of relay 5—13, through the upper armatures of the actuated relays 2—13 and 1—13. Assuming that the column-A unit of primary #1 (1PA—13) is idle, the contacts a—13 and b—13 thereof are not shifted, wherefore, the ground potential on the second contact spring from the top in stackup b—13 is extended, through the third contact in this stackup, to the upper winding of the column-A shift relay SRA—13. On the other hand, if the column-A unit of the primary had been in use, and the contacts of stackup b—13, therefore, shifted, the ground in question would have been extended through the corresponding contacts in stackup b'—14 of the unit 1PB—14, and thence to the upper winding of the column-B shift relay SRB—14, provided unit 1PB—14 were idle. Similarly, if the column-B unit were in use, the unit-selecting ground potential would be transferred further in the chain to the upper winding of the column-C shift relay SRC—14, or finally to the column-D shift relay SRD—14, in the event that the column-C unit of the primary were also in use, while if the column-D unit were in use the shift relay control circuit would be completely open.

In the present assumed example, the unit 1PA—13 is idle, wherefore the unit-selecting (or allotting) ground potential extended to the second contact spring in stackup b—13, is further extended, by way of the third contact in the same stackup, to the upper winding of shift relay SRA—13. Relay SRA—13 thereupon operates. At its upper armature, relay SRA—13 prepares a locking circuit for itself, but this locking circuit is not closed during finder action, only during connector action. At its lowermost contacts, relay SRA—13 completes the prepared locking circuit for the slow-releasing hold relay 1—13, from the grounded start conductor 1—ST, by way of contacts of relay 5—13, the inner armature of the operated hold relay 1—13, conductor 23—13, lower contacts of relay SRA—13, and thence by way of the lower pair of off-normal contacts ON—13, to the winding of hold relay 1—13. Relay 1—13 is thus held operated subject to the continued grounded condition of the start lead P1—ST, and to the continued actuated condition of relay SRA—13.

Shift relay SRA—13, at its inner lower armature, also opens the chain circuit extending through similar contacts of the relays SRB—14 to SRD—14 and closes a circuit for shift magnet SA—13, which magnet energizes and moves the shift plate 10—13 to the right, thereby mechanically selecting the column-A unit IPA—13 for operation according to the finally assumed position of the shaft and commutator. The shift plate 10—13 corresponds to shift plate 10 of Figs. 1 to 3. Shift magnet SA—13 also prepares an operating circuit for the operating magnet OA—13, corresponding to the operating magnet 0 shown in Figs. 2, 5, 6, 8, 10, and 11.

*Finding the calling line*

When start-pulse relay 3—13 restores, a moment after the described opening of its circuit and that of motor magnet MM—13 by relay 2—13 and the consequent restoration of the motor magnet to complete the first full step, it connects the winding of motor magnet MM—13 to the brush of commutator COM—P to enable the motor magnet MM—13 to operate in a buzzer-like manner to advance the shaft and attached commutator brush step by step until an ungrounded contact is reached, one associated with the calling line. The connection between the winding of motor magnet MM—13 and the brush of the commutator includes an armature and back contact of relay 5—13, upper armature and back contact of relay 3—13, and the self-interrupting contacts of the motor magnet MM—13.

As a further result of the restoration of relay 3—13, the initial circuit for test relay 2—13 is interrupted at the lower armature of relay 3—13, whereby the continued energization of relay 2—13 is rendered dependent upon the ground potential encountered on the contacts successively engaged by the brush of the commutator through the lower armature of relay 2—13. COM—P reaching the winding of relay 2—13.

In the present assumed example, the calling line is the line 11 associated with the first selective position of the device. In this case no ground potential is encountereed by the brush of the commutator when it arrives in its first selective position. The operation of the motor magnet MM—13 is thereby terminated and test relay 2—13 is thereby deprived of current. Test relay 2—13 is slightly slow-releasing in order to prevent its restoration as the commutator passes from one selective position to the next during rotation of the shaft. Relay 2—13 restores after a slight interval. When it does so, at its lower armature it opens a further point in its locking test circuit. At its upper armature relay 2—13 inserts a current limiting resistor in the circuit previously traced for the upper winding of relay SRA—13, but relay SRA—13 remains operated in series with this resistor.

*Seizing the calling line*

Also, upon restoring, test relay 2—13 completes a circuit at its middle upper armature for operating magnet OA—13. This circuit is from battery by way of the resistor associated with the middle armature of the actuated hold relay 1—13, the said armature, the middle upper armature of the restored test relay 2—13, and thence by way of the contacts of shift magnet SA—13 to the ground-connected winding of the operating magnet OA—13.

As a result of the shaft of the mechanism having been brought into its first selective position, and of the shift plate 10—13 having been shifted to the right by shift magnet SA—13, the contact arm corresponding to the arm 14, Fig. 1, associated with the first selective stackup springset (such as $s^1$ of Figs. 1 to 3), has been rotated in a clockwise direction as seen in Figs. 1 and 3 to bring the contact-actuating end thereof under the first selective contact stackup of Fig. 13, corresponding to $s^1$ in Figs. 1 to 3. Consequently, when the operating magnet OA—13 is energized as above noted and thus tilts its pivoted plate (not shown in Fig. 13) corresponding to plate 22, seen best in Figs. 5, 6, and 8, underlying the slidable shift plate 10—13, the #1 selective contact set in Fig. 13, associated with line 11, is actuated. The contact pairs of this stackup thereupon assume the closed position illustrated in Fig. 8 for the lowermost pair of contacts in the stackup $s^1$. Additionally, the contact spring stackups a—13 and b—13 (actuated whenever the operating magnet OA is actuated) are actuated by the plate corresponding to 22 in the mechanism drawings.

As a result of the actuation of the first selective set of contacts of the unit IPA—13, the calling line 11 is seized, and the tip, ring, and sleeve conductors thereof are closed through to the link side of the primary. The tip and ring conductors extend directly through link PIA to the secondary multiple at this time, while the sleeve conductor is extended temporarily, through normally closed contacts controlled by the outermost armature of link relay A₁—13, to battery by way of resistor 22—13, common to the four link relays A₁—13 to D₁—14 of the first primary. Current supplied through this resistor, contacts controlled by the outermost armature of relay A—13, and thence through the lowermost pair of contacts in the first selective set of the unit IPA—13, flows in series with the ground-connected winding of cutoff relay CO—13, whereby the line is marked busy, and relay CO—13 is operated. Upon operating, relay CO—13 disconnects line relay LR—13 from the line, permitting this relay to restore. Upon restoring, line relay LR—13 disconnects ground potential from start conductor P1—ST, whereupon this conductor becomes ungrounded unless another line associated with primary #1 has called in the meantime. Additionally, relay LR—13 replaces ground potential on the associated marking conductor to thereby again mark the associated line 11 as non-calling in the associated primary.

The second contact pair from the bottom in stackup a—13 close a self-locking circuit for operating magnet OA—13, to battery by way of the normally closed contacts controlled by the middle armature of link relay A1—13, and the associated resistor. By the closure of this circuit, the operating magnet is maintained operated after its initial circuit is opened, as will be described subsequently. The lowermost contacts in stackup a—13 clear the ring conductor R of primary link P1A from the connector-action conductor 73—13, common to the four units of the primary, while the lowermost contacts in stackup b—13 clear the sleeve lead of the unit from the common dial lead 72—13 of the primary. The second contact pair from the bottom of stackup b—13 opens a point in the circuit of the lower or matching winding of sleeve relay SRA—13 to thereby prevent unit 1PA—13 from being taken into use subsequently from connector action. Finally, the uppermost contact set of the actuated stackup b—13 shifts the selecting or allotting chain from the upper winding of shift relay SRA—13 to the upper winding of the shift relay of the next idle one of the units of the primary, thereby opening the circuit of the upper winding of relay SRA—13 and restoring this relay. This action occurs with relays 3—13 and 2—13 in a restored condition as previously described, and with slow-acting hold relay 1—13 still operated. The shift relay to which the chain circuit has been newly extended is unable to operate at this time over the extended allotting circuit, because of the resistor included in the circuit at the upper contacts of relay 2—13. This resistor so limits the current that, while an operated shift relay can remain operated, one not operated cannot become operated in series with this resistor.

When shift relay SRA—13 restores, at its middle armature it opens the circuit of shift magnet SA—13, while at its lowermost armature it opens the locking circuit of the slow-acting hold relay 1—13. Shift magnet SA—13 now deenergizes and thus opens the initial circuit of operating magnet OA—13, but magnet OA—13 is now held operated as previously pointed out in its locking circuit, which includes contacts in stackup a—13, and the resistor associated with link relay A1—13. The restoration of shift magnet SA—13 also allows shift plate 10—13, corresponding to shift plate 10, in Figs. 1 to 3, to restore, thereby terminating the temporary selective association between the unit 1PA—13 and the operating mechanism common to the four units of the primary. As long as the operating magnet OA—13 remains operated, the particular lever 14 associated with the now-operated selective contact stackup #1 remains under the contact stackup to keep the contact springs thereof in actuated position, because of the depression 20, Figs. 1, 6, and 8, in the lever being engaged with the exposed end 21 (see Fig. 8) of the contact-actuating bushing.

Slow-acting hold relay 1—13 restores a short interval after its locking circuit is opened by the described restoration of shift relay SRA—13, thereby completing the restoration of the three relays 1—13, 2—13, and 3—13 of the common equipment which were actuated pursuant to the described finder action of the column=A portion of primary #1.

*Clearing out primary #1*

Responsive to the described regrounding of the marking conductor associated with line 11, upon the described restoration of line relay LR—13, the homing circuit for the mechanism of primary #1 is reclosed from ground by way of the armature and back contact of relay LR—13, the No. 1 commutator contact, the brush of the commutator COM—P, the self-interrupting contacts of motor magnet MM—13, contacts of relays 3—13 and 5—13, and thence to battery by way of the winding of motor magnet MM—13. The motor magnet MM—13 now operates in a buzzer-like manner to advance the mechanism of the primary step by step until the home position is reached, or until a contact corresponding to a further calling line is reached, in case a further call has been originated in the short interval of time elapsing after the removal of the receiver at substation 11. In the latter event, ground potential is maintained on the start conductor P1—ST and the restoration of hold relay 1—13 is followed by a reoperation of start-pulse relay 3—13 to start a new cycle of operation of the relays 1, 2, and 3 of Fig. 13, resulting in finder action at the next idle unit (in column B, C, or D) of the primary, the shift control circuit having been transferred at the uppermost contact set in stackup b—13, as previously described.

*Initiating secondary finder action*

In order to initiate the finder action in the secondaries to cause a column-A secondary unit to find link P1A, to which the calling line has now been extended by the described primary finder action, the uppermost set of contacts in the stackup a—13 is shifted to remove ground potential from the marking conductor AM1 (individual to unit 1PA—13), and to extend ground potential, through the inner armature and back contact of link relay A13, to column-A start conductor AS, common to all ten column-A primary units.

*Seizing the common marking conductors M1 to M10*

The immediate purpose of the grounding of column-A start conductor AS is to cause the column-A marking-control relay XA—15 to operate and seize the common marking conductors M1 to M10, Figs. 15 and 16, for the sole use of column A. The circuit of relay XA—15, however, is maintained open for the time being in the event that any one of the corresponding relays XB—16 to XD—16 associated with the other columns of primary units is operated. Each of the relays XA—15 to XD—16 is arranged, when operated, to prevent operation of any one of the others and to seize the common marking conductors M1 to M10 and connect them respectively to the individual marking conductors (such as AM1 to AM10) in the concerned column. The circuit of relay XA—15 cannot be completed at this time if all of the column-A secondary units are busy, the purpose of the latter arrangement being to avoid the needless operation of relay XA—15 to bar operation of the other three similar relays in the event that no secondary unit is available in column A.

Assuming now that all of the marking-control relays (XA—15 to XD—16) are unoperated at the time start conductor AS is grounded as previously pointed out, the ground potential thereon is further extended, through contacts of relays XB—16 to XD—16, to conductor 27—16, and thence by way of the uppermost contacts in the *a* stackup of any idle column-A secondary unit, to the winding of relay XA—15. The *a* stackup of secondary #1 is shown at *a*—17, while the corresponding stackup of secondary #5 is shown at *a*—19. Marking-control relay XA—15 operates when ground potential is extended to the winding thereof, as above noted, and upon so doing it opens a point in the circuit of each of the other "X" relays at its first three lower armatures. At its ten upper armatures, only three of each are shown, relay XA—15 connects the ten start conductors AM1 to AM10 (individual respectively to the column-A units of primaries #1 to #10) respectively to the marking conductors M1 to M10, normally extending in multiple to the commutators of the five secondaries. Each of the individual start conductors AM1 to AM10 whose primary unit is not in a calling condition is grounded at such primary unit, and the ground potential on the respective individual marking conductors is thus extended to the respective ones of the common marking conductors M1 to M10. The marking conductor AM1 of the now-calling column-A unit 1PA—13 of primary #1 has been ungrounded by the contacts of stackup *a*—13, as previously pointed out, resulting in the marking conductor M1 being not supplied with ground potential at this time, thereby predetermining that the secondary mechanism to be started into operation will stop in the first selective position, corresponding to primary #1.

Starting secondary #1

Relay XA—15 also prepares a self-locking circuit over conductor L—15, and at its lower armature it applies ground potential to the column-A secondary-start chain. The first of the secondaries having an idle column-A unit responds to this grounding of the column-A secondary-start chain. Assuming that the unit 1SA—17 of secondary #1 is idle at this time, the contact-spring stackup *a*—17 is not actuated, and the starting ground potential is extended through the lower contacts thereof to the column-A start relay 4A—17 of secondary #1, completing a circuit for relay 4A—17 through the lowermost contacts of relay 6—17, to battery. As a result, start relay 4A—17 now operates. At its lowermost armature, relay 4A—17 prepares a circuit for the lower winding of shift relay SRA—17; at its uppermost armature it opens the homing chain-circuit of motor magnet MM—17 and connects the motor magnet to the brush of the commutator COM—S¹; and at its inner upper armature it extends ground potential to conductor 31—17 thereby closing a circuit through contacts of relays 1—17 and 2—17 for start pulse relay 3—17.

Relay 3—17 now operates, and temporarily disconnects operating magnet MM—17 from its self-interrupting contacts and transfers it to the now-grounded upper terminal of relay 3—17, thereby closing an operating circuit for motor magnet MM—17 through the upper contacts of relay 6—17. Motor magnet MM—17 thereupon operates to advance the associated shaft of the secondary and the commutator COM—S¹ one-half step from the home position, toward the first selective position. When this occurs, off-normal contacts ON—17 are shifted. The uppermost pair in stackup ON—17 closes a point in the homing circuit of magnet MM—17 but this circuit has previously been opened at the upper contacts of start relay 4A—17, and subsequently at the upper contacts of relay 3—17; and the middle pair of contacts ON—17 disconnects repeating relay 4—17 from the associated dial lead DL—S¹, so as to prevent relay 4—17 from becoming actuated at this time over the dial lead to interfere with the finder operation.

Selecting unit 1SA—17 for operation

The lowermost pair of off-normal contacts close a circuit through the lower armature of the operated start pulse relay 3—17 for test relay 2—17. Test relay 2—17 thereupon operates and prepares a locking circuit for itself, at its inner lower armature, to the brush of the commutator COM—S¹; at its lower armature it opens a point in the circuit through which the A-unit operating magnet OA—17 is to be subsequently energized, at the same time applying ground potential to the shift-relay control conductor common to the four units of secondary #1. A circuit is thus established through the lower contacts of test relay 2—17, and the lower contacts of the operated column-A start relay 4A—17 for the lower winding of shift relay SRA—17. Shift relay SRA—17 now operates to close a circuit at its lower armature for the shift magnet SA—17. Magnet SA—17 now moves the associated shift plate to the right, thereby mechanically selecting the column-A unit of the secondary for selective operation. At the same time, the contacts of shift magnet SA—17 are closed to prepare an operating circuit for magnet OA—17.

As a further result of the operation of test relay 2—17, at its upper armature, it breaks the connection between the grounded conductor 31—17 and the upper terminal of start-pulse relay 3—17, transferring the grounded conductor 31—17 into connection with hold relay 1—17. Hold relay 1—17 is thereupon operated over conductor 31—17 from the ground potential applied to the latter by relay 4A—17. Upon operating, hold relay 1—17 locks itself directly to conductor 31—17, at the same time disconnecting this conductor from the upper armature of the now-operated relay 2—17. Relay 1—17, at its inner low armature, also opens a further point in the homing circuit of motor magnet MM—17 and applies ground potential to the locking conductor L—15, common to all the secondaries. By this operation a locking circuit for relay XA—15 is closed over conductor L—15, through the second contact pair from the bottom of relay XA—15, through the upper contacts in multiple of the *a* stackups of the column-A secondary units. Relay XA—15 is thus maintained locked temporarily until the secondary has completed its operation, independent of the continued maintenance of ground potential on the column-A start conductor AS of the primaries.

Finding the calling primary link P1A

Returning now to the point at which test relay 2—17, at its upper armature, disconnected ground potential from the upper terminal of the temporarily energized start-pulse relay 3—17 and thereby open-circuited the winding of relay 3—17 and the winding of motor magnet MM—17, motor magnet MM—17 promptly restores, and thereby advances the shaft and the brush of commutator COM—S¹ the remaining half step to the first selective position. The slow-acting start-pulse relay 3—17 restores a moment later, and when it does so it opens the initial energizing circuit of test relay 2—17 at its lower armature, rendering the continued energization of relay 2—17 dependent upon the continued grounded condition of the brush of commutator COM—S¹, to which the winding of relay 2—17 is now connected, through the inner lower contacts of relay 2—17, the inner armature and back contact of relay 6—17, conductor 34—17, upper armature and front contact of relay 4A—17, and conductor 35—17. The restoration of start relay 3—17 also connects motor magnet MM—17 through its self-interrupting contacts to the brush of the commutator COM—S¹ in a circuit path from the lower terminal of motor magnet MM—17, through the upper contacts of relays 5—17 and 3—17, the interrupter contacts of magnet MM—17, conductor 36—17, upper armature and front contact of relay 4A—17, and thence to the commutator brush, by way of conductor 35—17. As a result, test relay 2—17 remains operated in its locking circuit, above traced, (through the brush of the commutator), and the motor magnet MM—17 is operated in a buzzer-like manner to advance the shaft and the commutator from one selective position to another, as long as the commutator engages grounded marking conductors. Test relay 2—17 is slightly slow-releasing so as to enable it to remain operated while the brush of the commutator is passing from one selective position to another.

In the present assumed example, the call reached the secondary from unit IPA—13 at primary #1, served by primary link PIA, and the associated marking conductor AMI (now connected to the secondary marking conductor MI at the upper contacts of relay XA—15) is ungrounded (in stackup a—13 of the actuated column-A unit of primary #1), wherefore, marking conductor MI, connected through contacts of relay UI—17 to the first selective contact of commutator COM—S¹, is ungrounded. As a result, no further hunting action takes place after commutator and shaft have been advanced one full step, for the brush of the commutator engages an ungrounded contact in its first selective position. Test relay 2—17 restores after a slight interval. At its lower armature it opens the initial circuit of shift relay SRA—17, leaving relay SRA—17 operated through the lower armature of hold relay I—17.

Seizing the calling primary link PIA

As a further result of its restoration, relay 2—17 closes a circuit through its lower armature and back contact, through the illustrated resistor, and contacts of the actuated shift magnet SA—17 for the winding of the battery-connected operating magnet OA—17. Operating magnet OA—17 is thereby operated to tilt its armature plate and its now-actuated shift plate, corresponding to plates 22 and 10, shown in Figs. 1 to 3, 5, 6, and 8. The mechanism of the secondary having been stopped in the first selective position, the illustrated No. 1 selective contact stackup in Fig. 17 is actuated, to seize the primary link PIA. The tip, ring, sleeve, and hold conductors (T, R, S, and H) of the primary link PIA are thus extended respectively to the tip, ring, sleeve and hold conductors of the secondary link SIA, connected to the unit ISA—17 of secondary #1. Additionally, the a and b stackup contacts a—17 and b—17 are shifted, as they are whenever operating magnet OA—17 operates. The actuation of the contacts in stackup b—17 are without any particular effect at this time, as they are associated with the control and matching circuits employed in connector action, to be described hereinafter.

The uppermost contact pair a—17 opens one point in the operating and locking circuit of marking-control relay XA—15, but these contacts are shunted by similar contacts (such as a—19) of any idle column-A secondary unit. At the lowermost contacts a—17, the column-A start conductor grounded at the lower contacts of relay XA—15 is disconnected from column-A start relay of secondary #1 and transferred through the column-A start chain of the secondaries to the corresponding relay of the next idle column-A secondary unit, such as relay 4A—19 of secondary #5. Relay 4A—17 thereupon restores, opening the circuit of shift relay SRA—17, which relay thereupon restores and opens the circuit of shift magnet SA—17. The shift magnet SA—17 thereupon restores and permits the associated shift plate to return to normal position, thereby terminating mechanically the selection of the unit ISA—17 of secondary #1 for operation in connection with the shaft mechanism. The actuated selective-position contact springs, however, are maintained actuated so long as the operating magnet OA—17 remains operated, as previously pointed out in connection with the column-A primary unit IPA—13.

When shift magnet SA—17 restores, the contacts controlled thereby open the operating circuit of magnet OA—17, but this magnet is held operated over conductors H2 and H of the associated secondary link SIA in a circuit to be hereinafter traced.

Clearing out secondary #1

Start relay 4A—17 also removes ground potential from the start conductor 31—17, local to secondary #1, thereby opening the locking circuit of hold relay I—17. Relay I—17 thereupon restores, and at its inner armature it removes ground potential from the locking conductor L—15, thereby enabling marking-control relay XA—15, locked up over this conductor, to restore as soon as the associated column-A start conductor AS becomes ungrounded. Relay I—17 also closes a homing circuit for magnet MM—17 at its inner armature, through the upper pair of contacts ON—17, the lowermost contacts of relays 4D—18, 4C—18, and 4B—18, the uppermost contacts of relay 4A—17, interrupter contacts of the motor magnet MM—17, and the uppermost contacts of relays 3—17 and 5—17 to motor magnet MM—17. The motor magnet MM—17 may now operate in a buzzer-like manner over this circuit to advance the shaft and commutator step by step until the home position is reached, whereupon the homing circuit is opened at the uppermost pair of off-normal contacts ON—17.

Extending the sleeve and hold leads

It will be recalled that the sleeve lead of primary unit IPA—13 (over which cut-off relay CO—13 is being held operated) was extended temporarily, through contacts of link relay A₁—13, to battery through resistor 22—13, and that the holding circuit of operating magnet OA—13 was completed temporarily through contacts of relay A₁—13 and the illustrated resistor to battery, the two concerned conductors not being yet extended over the link PIA to the secondaries. Upon the above-described seizure of the link PIA by secondary unit ISA—17, link relay A₁—13 is caused to operate to extend the sleeve and hold leads over link PIA, and thence, through contacts of secondary unit ISA—17, and over conductors in the secondary link SIA, to the connecting-link circuit CLC—1 of Figs. 23 and 24. Link circuit CLC—1 thereupon takes over the control of the partially extended connection, and subsequently causes the operated switching units to be released, after the connection has been finally completed to the called line and the calling subscriber has replaced his receiver. Additionally, the operation of link relay A₁—13 results in the regrounding of the marking conductor AM—1 of unit IPA—13, and in the ungrounding of column-A start conductor AS to permit marking-control relay XA—15 to restore and free the common marking conductors M1 to M10. The way in which these results are accomplished will now be pointed out:

The closure of the lowermost contact pair in the actuated selective stackup No. 1 of unit ISA—17 completes a locking circuit for operating magnet OA—17 of the unit as follows: From battery through the winding of magnet OA—17, branch hold conductor H2 of link SLA, branch hold conductor H2 in outgoing branch S1A—0 of the link, upper contacts of the auxiliary release relay 5—23 of the connecting-link circuit CLC—1, hold conductor H of branch line S1A—0, normally closed contacts controlled by the upper armature of transfer relay 1DA—21, hold conductor H of link S1A, lowermost contact pair in the actuated stackup No. 1 of secondary unit ISA—17, hold conductor H of primary link P1A, and thence to ground through the winding of link relay A₁—13. It will be recalled that the initial operating circuit of magnet OA—17 includes the contact of the lower armature of relay 2—17, and the associated resistor. This resistor is of sufficiently high resistance that relay A₁—13 operates readily in shunt thereof. Upon operating, link relay A₁—13 extends the hold conductor H of the link P1A, through contacts of stackup a—13, to the winding of magnet OA—13, at the same time opening the hold circuit previously established for magnet OA—13. Magnet OA—13 is now held operated in parallel with link relay A₁—13, over the circuit traced therefor, in series with the operating magnet OA—17 of the secondary.

Link relay A₁—13 also connects the sleeve lead S of the primary link P1A to the extended sleeve lead of the calling line 11, at the same time disconnecting battery-supply resistor 22—13. The actuated cutoff relay CO—13 is now maintained operated over the sleeve lead of the partially established connection, in a circuit including the sleeve conductor S of link P1A, actuated contacts of secondary unit ISA—17, sleeve lead S of the outgoing branch S1A—0 of the secondary link, middle lower armature and back contact of disconnect relay 7—23 of the connecting-link circuit CLC—1, to battery through sleeve relay 1—23. The cutoff relay CO—13 is henceforth held operated in series with relay 1—23 over the circuit path above-traced, and sleeve relay 1—23 operates thereover.

*Freeing the common marking conductors M1 to M10*

Link relay A₁—13 also disconnects the upper contacts in stackup a—13 from the column-A start conductor AS and replaces ground potential on marking conductor AM1, individual to primary unit IPA—13, to mark this unit henceforth as non-calling.

In the event that no other column-A primary unit is in calling condition, the column-A start conductor AS is now ungrounded. As a result, marking-control relay XA—15 is henceforth held operated only over locking conductor L—15, held grounded at the contacts of hold relay 1—17 of secondary #1 until this relay restores an instant later, as previously described.

When conductor L—15 is ungrounded, by the restoration of hold relay 1—17 (to start the previously described clearing-out operation of secondary #1) relay XA—15 is unlocked and restored. At its lower contacts, relay XA—15 ungrounds the column-A secondary-start conductor to thereby prevent the further starting of secondaries over this conductor until another call is made through column-A of the primaries.

Marking-control relay XA—15 also closes a point in the circuit of each of the other relays XB—16 to XD—16, to permit any one of them to operate (each over its associated column start conductors, BS, CS, and DS). Relay XA—15, at its ten upper armatures, only three of which are shown, disconnects the individual marking conductors AM1 to AM10 from the common marking conductors M1 to M10.

*Preparing the connecting-link circuit CLC—1 for operation*

Upon its described operation over the extended sleeve lead, in series with cutoff relay CO—13, sleeve relay 1—23 of connecting-link circuit CLC—1 prepares a circuit for the upper winding of the special test relay 3—23 over conductor NM—S5; prepares a locking circuit for the upper winding of relay 3—23 at its middle lower armature; at its inner upper armature it connects up the dial lead DL—S5 of the secondary with which the connecting-link circuit is associated for connector operation; at its inner lower armature it prepares a circuit for disconnect relay 7—23; and at its upper and lower armatures it connects up the associated tip and ring conductors T and R, thereby completing a connection by way of the heavily inked talking conductors from the calling line, through switching units IPA—13 and ISA—17, and thence by way of normally closed contacts of transfer relay 1CA—21, to the finder-action end of the connecting-link circuit CLC—1, Figs. 23 and 24.

Line relay 2—23 now operates over the calling line, closing a point at its upper armature in the circuit path over which the dial pulses are repeated, while at its lower armature it closes an operating circuit for the slow-restoring release relay 4—23. Release relay 4—23 thereupon operates. At its middle upper armature, it shunts the upper contacts of release-auxiliary relay 5—23 to prevent a premature opening of the circuits of operating magnets OA—17 and OA—13; at its middle lower armature it opens a point in the circiut of disconnect relay to prevent premature operation thereof; and at its inner upper armature it closes an operating circuit for the release-auxiliary relay 5—23. Relay 5—23 thereupon operates and at its upper armature prepares to release the operated units IPA—13 and ISA—17 when release relay 4—23 is subsequently restored.

*Testing the common dial lead*

During the time required for relays 2—23 and 4—23 to operate successively, following the operation of relay 1—23, the special test relay 3—23 tests the dial lead DL—S5, common to the connecting link circuit CLC—1 and two other link circuits, to determine whether or not this dial lead is temporarily in use by one or the other of the other link circuits which share it.

As will be seen in Fig. 28, the connecting link circuits CLC—1, CLC—2, and CLC—11 have common access, through the incoming branches of the links S5A to S5D, to the column-A to column-D units of secondary #5, to which the tens dial lead DL—S5 extends. Accordingly, the dial lead DL—S5 is common to the three connecting link circuits just named. As will appear hereinafter, when the dial lead DL—S5 is in use by any one of the three links, ground potential is maintained normally thereon. Therefore, if the dial lead is in use at this time, ground potential thereon is effective to actuate the lower winding of special test relay 3—23 upon the described connecting-up of the dial lead DL—S5 by sleeve relay 1—13: from ground, on lead DL—S5, upper contacts of relays 2D—24 to 2A—23, inner upper contacts of relay 1—23 and contacts of relays 3—23 and 4—23, and the winding of relay 3—23, to battery. Upon operating, special-test relay 3—23 closes a locking circuit for itself by way of its upper winding, from ground, by way of the lowermost contacts of the relays 2D—24 to 2A—23, the middle lower armature of sleeve relay 1—23, and thence to battery, by way of the upper armature of relay 3—23, and the upper winding of the relay. Relay 3—23 also disconnects its upper winding from the conductor NM—S5 at the contacts controlled by its upper armature; disconnects the busy dial lead DL—S5 from the connecting-link circuit at its inner lower armature, so as to prevent interference therewith; and at its lowermost armature it closes a circuit from ground over conductor 51—24, middle upper armature and back contact of switching relay 15—24, and thence to battery by way of the winding of busy relay 16—24. Busy relay 16—24 thereupon operates to apply a busy-tone signal from terminal BT—24, through the inner upper armature of relay 16—24, and thence to the tip talking conductor of the connecting-link circuit CLC—1. Busy relay 16—24 also opens a point in the circuit of dial-tone relay 6—23 at its lower armature to prevent operation of this relay at this time. Busy-tone current, from busy-tone lead BT—24, now flows over the tip talking conductor of the link circuit CLC—1, back over the established connection to the calling line to inform the calling subscriber of the busy condition, whereupon he is expected to replace his receiver and cause the partially established connection to clear out in a manner which will be made clear from the portion of the description which is to follow.

In the present example, it is assumed that the secondary to which the connecting-link circuit CLC—1 has access for connector action is not in use by another connecting-link circuit when the connecting-link circuit CLC—1 is seized as above pointed out, in which event special test relay 3—23 is not energized over dial lead DL—S5, and busy relay 16—24 is consequently not operated at this time to give the calling subscriber a busy signal.

The lower winding of special test relay 3—23 is disconnected from the dial lead DL—S5 at the lower contacts of release relay 4—23, thus terminating the dial-lead test, which must therefore be made during the time required for relays 2—23 and 4—23 to operate successively following the operation of sleeve relay 1—23.

With relays 3—23 and 16—24 not having been operated, the following circuit (closed at one of the contact pairs of sleeve relay 1—23) becomes effective to operate dial-tone relay 6—23: From ground through the inner upper armature and back contact of switching relay 15—24, lower contacts of busy relay 16—24, contacts of the operated sleeve relay 1—23, and the winding of relay 6—23 to battery. Dial-tone relay 6—23 now operates and impresses a dial-tone signal on the associated tip talking conductor of the connecting link circuit over the following circuit path: From the dial tone lead DT—23, through the inner lower armature of the operated dial-tone relay 6—23, through the inner upper armature of the unoperated busy relay 16—24, and thence, through the upper contacts of relay 15—24, to the heavily inked tip talking conductor. This dial-tone signal then passes back over the established connection to the calling line to give the calling subscriber a signal indicative of the fact that he may now begin to dial the desired number.

*Preparing secondary #5 for connector operation*

Special test relay 3—23 having failed to operate, and dial-tone relay 6—23 having operated as a result of the consequent failure of busy-tone relay 16—24 to operate, the dial lead DL—S5 of secondary #5 is now seized and the secondary is prepared for connector operation thereover, as will now be described.

Dial-tone relay 6—23, at its four upper armatures, applies ground potential to the lower terminal of each of the connecting relays 2A—23 to 2D—24, thus preparing circuits for these relays, none of which is completed until after the tens digit has been dialed. At its middle lower armature, dial-tone relay 6—23 prepares a circuit to be later completed for disconnect relay 7—23, while at its lowermost armature it seizes the dial-pulse lead DL—S5, by applying ground potential thereto over the following path: From ground through the lower contacts of the operated dial-tone relay 6—23, upper contacts of the operated release and line relays 4—23 and 2—23, inner lower contacts of the unoperated special test relay 3—23, inner upper contacts of sleeve relay 1—23, and thence, through the uppermost contacts of each of the connecting relays 2A—23 to 2D—24, to the secondary #5 dial lead DL—S5 (common to three connecting-link circuits, as previously stated). The ground potential on this lead marks it busy to the other two connecting-link circuits having access thereto.

With ground potential on lead DL—S5, a circuit is completed thereover, through the normally-closed middle contact pair of off-normal stackup ON—19, and thence to battery through the winding of repeating relay 4—19 of secondary #5.

Repeating relay 4—19 now operates over its above-traced circuit. At its lower armature it connects the free terminal of the match-control relay 8—19 to the brush of the associated commutator COM—S5, while at its upper armature it closes a circuit for the associated slow-acting release relay 5—19.

Release relay 5—19 now operates; at its lowermost armature it shunts the middle contact pair of stackup ON—19 so as to maintain the circuit of relay 4—19 intact after the off-normal springs have shifted, as they did upon delivery of the first dial pulse; at its upper armature it disconnects the free terminal of motor magnet MM—19 from the homing circuit thereof and transfers it to the dial pulse circuit, preparatory to the transmission of dial pulses to the motor magnet; and at its inner lower armature it operates auxiliary relay 6—19. At its lower armature, relay 6—19 disconnects battery from each of the windings of the start relays 4A—19, 4B—20, 4C—20, and 4D—20 (one for each column) of the secondary to prevent the dialing operation from being interfered with by attempted finder action in the secondary.

In order to complete the change-over of secondary #5 from finder-action condition to connector-action condition, relay 6—19 applies battery potential at its lower armature, over conductor 64—19, to the lower terminal of the associated "U" relay U5—17, thereby completing a circuit for this relay to ground through normally closed contacts of each of the other "U" relays. The circuit of each "U" relay (only three of the five are shown, as stated) is taken through normally closed contacts of each of the other four to preclude simultaneous operation of two of them. Assuming all of the "U" relays to be in restored condition, relay U5—17 operates to open-circuit each other "U" relay. U5—17 also disconnects the ten associated marking conductors, connected respectively to the ten selective positions of the commutator COM—S⁵, from the ten marking leads M1 to M10 (indicated more fully in Figs. 15 and 16) and transfers them respectively to the ten marking control conductors J1 to J10 (indicated more fully in Figs. 15 and 16). The purpose of the operation of relay U5—17 is to arrange for the operation of the "J" relay (such as marking-control relay J—14 of primary #1) of the primary corresponding to the first or tens digit about to be dialed, as each of the ten primaries is associated with a separate tens group of the one hundred subscriber lines. By this operation, the "J" relay of the selected primary and tens group can be operated through the brush of the commutator COM—S⁵, in series with matching control relay 8—19, at the end of the dialing of the first digit.

*Dialing the tens digit 1*

When the calling subscriber at substation 11, having heard the dial-tone signal transmitted to his substation as previously pointed out, manipulates his calling device (not shown) in accordance with the first, or tens, digit in the desired number, the calling loop extending through substation 11, and now including line relay 2—23 of the connecting-link circuit CLC—1, is interrupted momentarily a number of times corresponding to the value of the digit. Each time the calling loop is interrupted, line relay 2—23 is momentarily restored, opening the circuit of slow-acting release relay 4—23 each time. Being slow-acting, relay 4—23 remains operated throughout the series of restorations of line relay 2—23. As a further result of each restoration of line relay 2—23, the previously traced repeating circuit is opened at the upper contacts of relay 2—23, whereby repeating relay 4—19 of secondary #5 is restored momentarily a like number of times.

Each time repeating relay 4—19 restores, at its lower armature, it disconnects the brush of commutator COM—S⁵ from relay 8—19, while at its upper armature it opens the circuit of the associated slow-acting release relay 5—19. Being slow-acting, relay 5—19 remains operated throughout the series of momentary restorations of relay 4—19.

As a further result of each momentary restoration of repeating relay 4—19, a circuit is closed at the upper armature of the relay, through the upper armature of the operated release relay 5—19, and over conductor 52—19 for the motor magnet MM—19. Motor magnet MM—19 responds to the dial pulses thus transmitted thereto by advancing the shaft of the secondary (corresponding to shaft 16 of Figs. 1 to 3) one step for each dial pulse received (one-half step at the receipt of the pulse and the remaining half step at the termination thereof).

Each time the brush of the commutator COM—S⁵ engages a selective-position contact, and with repeating relay 4—19 reoperated between impulses, a circuit is momentarily closed for matching-control relay 8—19 in series with a "J" relay of the primary associated with the contact engaged by the brush of the commutator. Relay 8—19, together with any "J" relays of the primaries, is of sufficient impedance that the rise in current-flow following the closure of a circuit for relay 8—19 in series with a "J" relay is sufficiently slow that neither the connected "J" relay nor relay 8—19 can operate during the comparatively slight interval that they are interconnected between the successive restorations of relay 4—19 during the delivery of a series of impulses. Since the circuit of relay 8—19 includes contacts of relay 4—19, this circuit is opened upon each restoration of relay 4—19, thereby insuring that any current flow which may have started to build up in the relay 8—19 between successive restorations of relay 4—19 is interrupted before relay 8—19 is associated with the next "J" relay. By this expedient, none of the matching-control "J" relays successively encountered momentarily by the brush of the commutator COM—S⁵ during the dialing of a tens digit can operate until the final one is selected at the end of the digit, nor can matching-control relay 8—19 operate until the brush of the commutator COM—S⁵ comes to rest in its final position at the end of the tens digit.

In the present assumed example, the tens digit to be dialed is the digit 1. In this case, the line relay 2—23 is restored only once momentarily and thereby causes only one momentary restoration of repeating relay 4—19. The brush of the commutator COM—S⁵ is, therefore, brought to rest in the first selective position, associated with primary #1, Figs. 13 and 14.

*Closing the matching circuit*

An instant after the commutator COM—S⁵ comes to rest in the first selective position, at the end of the dialing of the tens digit 1, relays 8—19 and J—14 energize in series over the following circuit to close points in four matching circuits (one for each column) only one of which will be complete: From battery by way of the winding of relay 8—19, lower contacts of relay 4—19, commutator COM—S⁵, in its first selective position, the middle and upper contacts of the #1 stackup of the operated relay U5—17, conductor J1 (of conductors J1 to J10), the winding of relay J—14, and thence to ground, through the upper contacts of connector-action relays 4—13 and 5—13 of primary #1, in series. Relays 4—19 and J—14 operate over the above-traced circuit a short interval after the closure thereof. Relay J—14, at its lower armature, applies ground potential to conductor 75—13 thereby preparing a chain locking circuit for whichever one of the shift relays SRA—13 to SRD—14 now operates over the successful matching circuit, while at its upper armatures relay J—14 applies battery potential to the lower windings of all of the shift relays SRA—13 to SRD—14 whose associated primary units are idle, and makes other preparations for the matching operation, to be subsequently described.

In the secondary #5, when relay 8—19 operates in series with relay J—14 over the previously traced circuit, it closes an operating circuit for relay 9—19. Relays 8—19 and 9—19 (two relays are used in place of one simply because of the number of contacts required) together close necessary points in the matching circuits, to be hereinafter described, preparatory to operating one of the shift relays (SRA—19 to SRD—20) of secondary #5 in series with the corresponding one of the shift relays (SRA—13 to SRD—14) of the selected primary (#1), preparatory to the extension of a connection from the connecting-link circuit CLC—1 of Figs. 23 and 24, through an idle one of the units of the secondary #5 to an idle one of the units in the selected primary #1.

*Matching delayed*

Before a description is given of how the matching takes place, a description will be given of the operations taking place when all the link paths from the secondary #5 to primary #1 are in use, in which case the matching operation is delayed for the want of an idle circuit path through the secondary in use to the selected primary. In order to provide for the giving of a busy signal to the calling subscriber and the freeing of secondary #5 in this event, ground potential is applied at the lower contacts of matching-control relay 8—19 to the no-match conductor NM—S⁵, common to the three connecting-link circuits having access to the units of secondary #5. The grounding of conductor NM—S⁵ closes a circuit through contacts of the operated sleeve relay 1—23 and contacts controlled by the upper armature of special-test relay 3—23 for the upper winding of relay 3—23. The upper winding of relay 3—23 preferably has sufficient impedance that the operation of relay 3—23 is retarded sufficiently that the matching operation, if able to occur immediately, as intended, is completed ahead of the operation of relay 3—23. When special-test relay 3—23 operates, (after a slight interval) it closes a locking circuit for its upper winding as previously described, through the lower contacts of connecting relays 2A—23 to 2D—24, while at its lower armature it closes the previously traced circuit for busy relay 16—24, resulting in the operation of busy relay 16—24 to apply busy-tone current from lead BT—24 to the associated heavily inked tip talking conductor to inform the calling subscriber of the busy condition of the interconnecting links. Relay 3—23 at its lower armature also opens the repeating circuit extending over dial lead DL—S5 to the repeating relay 4—19 in the secondary #5, thereby initiating the clearing-out of the secondary, to be hereinafter described. The preliminary portion of the clearing-out operation is the opening at the lower contacts of relay 4—19 of the series circuit for relays 8—19 and J—14 at the lower contacts of relay 4—19, whereby the attempted matching operation is terminated. In this event, in case the calling subscriber ignores the busy signal and proceeds to dial the remaining digit in the desired number, no particular result occurs because the dial circuit outgoing to the associated #5 secondary from the connecting-link circuit CLC—1 has been opened at the inner lower contacts of special-test relay 3—23, and the inter-digit transfer relay 12—24 (which must operate to prepare a dialing circuit for the units digit) has not been operated under the condition being described, wherein matching has failed to take place.

*The matching operation*

It is evident from an inspection of the drawings that the connection to be established from the connecting-link circuit CLC—1 back to the primary #1 must be established to one of the units (A, B, C, or D) of primary #1, through the corresponding one of the units (A, B, C, or D) of secondary #5, associated with the link circuit CLC—1 for connection action. The unit of secondary #5 which now operates to extend connection to the corresponding unit of #1 is the one in which the shift control relay (SRA—19 to SRD—20) is able to operate over the matching circuit conductors, in series with the shift control relay (SRA—13 to SRD—14) of the corresponding unit of the selected primary #1.

As previously pointed out, particularly in connection with the system layout shown in Fig. 28, the order of preference for connector action is reversed from the order of preference for finder action; that is, while the finder-action preference is from column A to column D, matching always takes place in column D if both of the units concerned are available, but takes place instead in column C if one or the other concerned units in column D is in use, taking column B only in the event that columns D and C are both unavailable, and finally, the matching takes place in column A only in the event that one or the other (or both) of the units concerned in each of the columns D, C, and B is in use.

*Matching in column D*

Let it be assumed now that the column-D unit 5SD—20 of the secondary #5 is idle, and that the column-D unit 1PD—14 of primary #1 is idle, when relays J—14, and relays 8—19 and 9—19 are energized as previously pointed out. Under this condition, the lower windings of relays SRD—20 and SRD—14 are immediately energized in series over the following circuit: From ground by way of the second lowermost contact pair of relay 8—19, conductor 69—20, lowermost pair of contacts in stackup b³—20 of secondary unit 5SD—20, conductor 68—20, contact pair of relay 8—19, conductor 67—20, the lower winding of shift-control relay SRD—20, the column-D relay bus DR (common to the column-D units of all of the primaries and secondaries), the lower winding of relay SRD—14, a pair of normally closed contacts in stackup b³—14 of primary unit 1PD—14, and contacts of relay J—14, to battery. Relays SRD—20 and SRD—14 immediately operate in series over the above-traced matching circuit. As will be pointed out more fully hereinafter, no other matching circuit is complete under the present assumed condition, wherefore relays SRA—13 to SRC—14, and relays SRA—19 to SRC—20 fail to operate.

In column D of the selected primary #1, shift relay SRD—14, upon operating in the above-described matching circuit in series with shift relay SRD—20, locks its upper winding to conductor 75—13, grounded at the lower contacts of the slow-restoring match-control relay J—14. In the event that the common mechanism of primary #1 is idle and none of the other shift relays (SRA—13 to SRC—14) are therefore in operated condition, the inner lower armature of relay SRD—14 completes a circuit for shift magnet SD—14 of unit IPD—14, the circuit including the inner lower armature and back contact of each of the relays SRA—13 to SRC—14. Shift magnet SD—14 thereupon slides the associated shift plate to the right to mechanically select the unit IPD—14 for operation, at the same time preparing a circuit for operating magnet OD—14, which circuit, however, is open at this time at the contacts of relay 6—13, and is not completed until after the final digit of the number has been dialed to position the associated control shaft.

In the secondary unit 5SD—20, when relay SRD—20 operates in the matching circuit in series with relay SRD—14, as described, at its lowermost armature it opens a further point in the incomplete column-C matching circuit, at the same time preparing a temporary locking circuit for itself over which it is held after the b stackup ($b^3$—20) of contacts in the secondary unit 5SD—20 have operated, along with the a stackup and the selected #1 selective contacts, as they now do. At its upper armature, relay SRD—20 closes a circuit for the associated shift magnet SD—20, which thereupon operates to slide the illustrated shift plate (corresponding to plate 10, Figs. 1 to 3) to the right to cause mechanical selection of the first set of selective contacts of the associated secondary unit 5SD—20, the shaft of the #5 secondary having previously been set by the dialing operations into the first selective position, as described.

Shift magnet SD—20, at the contacts controlled thereby closes a circuit for the associated operating magnet OD—20, over conductor 71—19, and thence to ground through resistor 72—19, and the lower contacts of relay 2—19. Magnet OD—20 thereupon operates, resulting in the shifting of contacts in the associated a stackup (the one to the left) of unit 5SD—20, shifting of the stackup $b^3$—20, and the closing of the contacts in the first selective stackup. In this way the tip, ring, sleeve, and hold conductors (T, R, S, and H) of secondary link S5D are connected through to the corresponding conductors of the primary link P1D.

Upon the shifting of the contacts of stackup $b^3$—20, the second lowermost contact is moved out of engagement with the lowermost contact and into engagement with the one immediately above it in preparation for the shifting of the matching circuits to prevent matching from again taking place in column D of secondary #5 until the connection now being established has been cleared out. At this time, the extension of what is termed "matching ground" to the concerned column-C ground bus CG, and the premature opening of the matching circuit through relays SRD—20 and SRD—14, is prevented by the operated lower armature of relay SRD—20. The relays last-mentioned are, therefore, maintained operated for the time being in a new circuit as follows: From ground on conductor 69—20, second and third contacts from the bottom of stackup $b^3$—20, the middle lower contact pair of relay 8—19, lower armature and front contact of relay SRD—20, conductor 68—20, and thence to battery over the circuit previously traced, through the windings of relays SRD—20 and SRD—14.

*Link-relay action incident to matching*

Upon the closure of the lowermost or hold-conductor contacts in the now-operated first selective-position stackup in unit 5SD—20, a locking circuit is established for operating magnet OD—14, whereupon link relay $D_1$—14 on the primary link P1D operates (in parallel with resistor 72—19) in series with operating magnet OD—20, over the following circuit path: From battery by way of the winding of magnet OD—20, branch hold conductor H2 of link S5D, conductor H2 of outgoing branch S5D—O, upper contacts of auxiliary release relay 5—27, conductor H of outgoing branch S5D—O, contacts of relay 5DD—22, hold conductor H of link S5D, contacts of unit 5SD—20, hold conductor H of link P1D, and thence to ground through the winding of link relay $D_1$—14. Relay $D_1$—14 thereupon operates. At its middle and outermost armatures it extends the hold and sleeve conductors H and S of the link P1D through to the unit IPD—14, at the same time clearing these leads of their normal battery connections on the primary side of the link relay. The inner armature of the relay makes a transfer operation hereinabove described in connection with relay $A_1$—13 in order that the subsequent operation of the associated unit IPD—14 shall not result in the starting of a secondary into finder operation.

In order to bring about the operation of secondary-link relay 5DD—22 and of connecting relay 2D—24, the uppermost contacts of stackup $b^3$—20 of unit 5SD—10 apply battery potential to the branch hold conductor H1 of the link S5D, thereby closing a circuit thereover, through contacts of link relay 5DD—22, lead H1 in the outgoing branch S5D—0, lower contacts of relay 5—27, conductor H3 of outgoing branch S5D—0, the winding of link relay 5DD—22, hold conductor H of the incoming branch S5D—I of the link, the winding of link-connecting relay 2D—24, conductor 70—24, and thence to ground, through contacts of the operated dial-tone relay 6—23. Relays 1DD—22 and 2D—24 operate in series over the above-traced circuit.

Link-connecting relay 2D—24, at its inner lower armature, locks itself to ground through the upper contacts of disconnect relay 7—23, independent of the continued energized condition of dial-tone relay 6—23; and it extends the associated tip, ring, and sleeve leads of the connector-action end of connecting-link circuit CLC—I to the corresponding leads of the incoming branch S5D—I of the link S5D.

When link relay 5DD—22 operates, it closes a circuit at its lower armature for the associated transfer relay 5CD—22, which latter relay operates and transfers the tip, ring, and sleeve conductors T, R, and S of the link 5SD from the corresponding conductors of the outgoing branch S5D—O to the corresponding conductors of the incoming branch S5D—I, thereby extending the connector-action end of the connecting-link circuit CLC—I through the operated secondary unit 5SD—20 to the selected primary unit IPD—14.

Relay 5DD—22 also alters the series circuit for relays 5DD—22 and 2D—24 by substituting branch conductor H2 of link S5D in their circuit in place of branch conductor H1. This shift is accomplished at the inner, upper armature and associated contacts of relay 5DD—22. Battery potential is now applied to the upper terminal of relay 5DD—22 from operating magnet OD—20, lead H2 of link S5D, inner upper armature of relay 5DD—22, and the associated conductors H1 and H3 of branch S5D—0 in series. At the same time, at the upper armature and associated contacts of relay 5DD—22, the operating circuit for link relay D1—14 is shifted from the operating magnet conductor H2 of link 5SD to include, in place thereof, conductor H1 of the link S5D, to which battery potential is applied at the uppermost contacts in stackup $b^3$—20.

*Terminating the matching condition*

The matching operation has been completed in column D, as described, and the matching condition may now be terminated, and secondary #5 may be cleared out.

It will be recalled that the lower armature of relay 8—19 grounded the no-match conductor NM—S5 upon the initiation of the matching operation to close a circuit for the upper winding of special-test relay 3—23 in the connecting-link circuit CLC—1. It will be further recalled that the upper winding of special-test relay 3—23 (unlike the lower winding thereof) has a high impedance, whereby the build-up current through the upper winding to an operating value is considerably delayed, giving time for the matching operation to occur before relay 3—23 operates over the no-match lead NM—S5. In the present assumed example, matching has taken place in column D, as described, rendering the operation of relay 3—23 over its upper winding unnecessary.

Returning now to the point at which relay 2D—24 of the connecting-link circuit CLC—1 operated incident to the described successful matching in column D, relay 2D—24, at its lower armature, opens the locking circuit of special-test relay 3—23 to prevent that relay from locking itself operated, in the event that it succeeds in operating before the matching condition has been terminated.

At its upper armature, relay 2D—24 opens dial lead DL—S5. When this occurs, repeating relay 4—19 of the secondary #5 immediately restores, disconnecting matching-control relay 8—19 from the brush of commutator COM—S5, thereby opening the circuit of relay 8—19 and of relay J—14, the two relays having been energized in series as previously described. Relay 8—19 now restores immediately, but relay J—14, being a slow-releasing relay, remains operated for a slight interval to maintain locking conductor 75—13 grounded (to thereby maintain the operated shift relay SRD—14 locked) until the control relays shown in Fig. 13 have been operated to take over the grounding of conductor 75—13, as will be described hereinafter.

When relay 8—19 restores as above pointed out, it opens circuits and restores relay 9—19, and the restoration of these two relays terminates the matching condition in secondary #5.

The previously traced series-matching circuit for the lower windings of shift relays SRD—20 and SRD—14 is now open, at contacts of relay 8—19. Shift relay SRD—14 remains operated, however, over the previously described locking circuit for its upper winding (over conductor 75—13 and the lower contacts of slow-restoring relay J—14 to ground), but relay SRD—20 (having fulfilled the purpose for which it was operated) now restores. At its lower armature, relay SRD—20 prepares to transfer ground potential to the column-C ground bus CG upon the next matching operation involving secondary #5, while at its upper armature it opens the circuit of shift magnet SD—20, whereupon this magnet restores and permits the associated shift plate to return to its normal position. At the contacts of controlled by magnet SD—20, the initial circuit of operating magnet OD—20 is opened, leaving this magnet operated in the previously described locking circuit therefor, which now includes relays 5DD—22 and 2D—24 in series.

The lower contacts of relay 8—19 remove ground potential from the no-match conductor NM—S5, thereby opening the circuit previously established thereover for the high-impedance upper winding of special test relay 3—23. As previously stated, with the preferred adjustment of relay 3—23, the relay has not operated by the time matching has been completed. Nevertheless, as described, the locking circuit for the upper winding of relay 3—23 includes the serially connected lower contacts of connecting relays 2A—23 to 2D—24 to effect a restoration of relay 3—23 upon the operation of any one of the said connecting relays, in case relay 3—23 should have operated sufficiently far to close its locking circuit.

*Clearing out secondary #5*

Returning again to secondary #5, the restoration of repeating relay 4—19 again closes the impulse circuit for motor magnet MM—19 through contacts of the operated slow-acting release relay 5—19, whereupon the motor magnet operates to advance the shaft mechanism and commutator brush one-half step toward normal position. A moment later, the slow-acting release relay 5—19 restores and opens the circuit of auxiliary relay 6—19. Relay 6—19 thereupon restores and removes battery potential from conductor 64—19, thereby permitting relay U5—17 to restore to thus disassociate the ten selective position conductors of the commutator COM—S5 from conductors J1 to J10 (Figs. 15 and 16) and transfer them back to the marking conductors M1 to M10.

As a further result of the restoration of slow-acting release relay 5—19, the directive stepping circuit of motor magnet MM—19 is opened and the homing circuit of the motor magnet is closed (at the upper armature of the relay), as follows: From ground by way of the lower armature and back contact of relay 1—19, the now-closed upper contacts of off-normal group ON—19, lower contacts of relays 4D—20, 4C—20, and 4B—20, upper contacts of relay 4A—19, interrupter contacts of motor magnet MM—19, upper contacts of relays 3—19 and 5—19, conductor 52—19, and thence to battery, through the winding of motor magnet MM—19. Magnet MM—19 operates in a buzzer-like manner in this circuit until the normal position is reached, whereupon the homing circuit is opened at the uppermost contacts ON—19.

Secondary #5 is now available for use in finder action, battery potential having been restored, at the lower contacts of auxiliary relay 6—19, to the local start relays 4A—19 to 4D—20.

*Inter-digit transfer in the connecting-link circuit CLC—1*

Upon the described closing through of the connector-action end of connecting-link circuit CLC—1 to the selected column-D unit 1PD—14 of primary #1, by way of the operated column-D unit 5SD of secondary #5, ground potential is on the ring conductor of the extended connection, in primary #1, thereby operating inter-digit transfer relay 12—24 in the connecting-link circuit CLC—I over the following circuit: from ground by way of the middle upper contact pair of relay 6—13, conductor 73—13, lowermost contacts in stackup $a^3$—14, the ring conductor R of primary link PID, contacts of unit 5SD—20, ring conductor R of link S5D, contacts of transfer relay 5CD—22, ring conductor R of incoming branch S5D—I, contacts of the operated relay 2D—24, the lower armature and back contact of switching relay 15—24, conductor 52—24, lower contacts of busy test relay 8—23, contacts of transfer-auxiliary relay 11—23, and the winding of relay 12—24, to battery. Relay 12—24 now operates; at its inner upper armature shunts the contacts of auxiliary relay 11—23 so as to maintain its circuit closed after relay 11—23 has operated, as it now does responsive to the closure of a circuit therefor at the upper contacts of relay 12—24. At its lower armature, relay 12—24 disconnects the sleeve conductor of the right-hand or connector-action end of the connecting-link circuit from busy-test relay 8—23 and transfers it to ground through the upper contacts of line relay 2—23, thereby completing a units-digit dial circuit for repeating relay 4—13 of primary #1 over the sleeve lead, as follows: From ground through the lower contacts of dial-tone relay 6—23, upper contacts of the relays 4—23 and 2—23, conductor 20—23, lower armature of the now-operated inter-digit-transfer relay 12—24, sleeve conductor 21—24, inner upper contacts of relay 2D—24, sleeve conductor S of branch S5D—I, upper contacts of relay 5CD—22, sleeve conductor S of link S5D, contacts of unit 5SD—20, sleeve conductor S of link PID, outermost contacts of the operated link relay D$_1$—14, lowermost contacts of stackup $b^3$—14, the common sleeve conductor 72—13 of primary #1, and thence to battery, through the winding of repeating relay 4—13. Repeating relay 4—13 is thus operated before the slow-releasing matching control relay J—14 has restored responsive to the described opening of its circuit in secondary #5.

*Preparing primary #1 for connector operation*

When repeating relay 4—13 operates over the above-traced circuit, it disconnects ground potential from the upper terminal of matching-control relay J—14 to prevent further matching in the primary until the present connection has been completed and it makes a multiple ground connection to conductor 75—13 so as to maintain shift control relay SRD—14 locked after slow-releasing relay J—14 restores.

When slow-restoring relay J—14 restores, shortly after the described opening of its circuit in secondary #5, at its lower armature it removes ground potential at one point from locking conductor 75—13, but conductor 75—13 has previously been grounded at the upper armature of repeating relay 4—13, as described, whereby the locking circuit for the upper winding of relay SRD—14 is maintained. Relay J—14 also opens the matching-circuit points previously closed thereby, to thus free the common matching conductors for use in further matching operations.

If the operation of relay 4—13 occurs when the shaft and commutator COM—P are off-normal (during finder action), the off-normal springs ON—13 are shifted. In this event, ground potential, applied through the middle contacts of off-normal contacts ON—13, is extended through the lower contacts of repeating relay 4—13 to the brush of the commutator COM—P, closing a homing circuit to continue the hunting action of the primary over all of its remaining selective positions. At its inner lower armature, relay 4—13 attempts to close a circuit for the associated slow-acting release relay 5—13 but is prevented from so doing, under the conditions assumed, because ground potential is held removed from the said armature of relay 4—13 until the normal position of the mechanism is reached. Relay 4—13 also closes a circuit at its inner upper armature for relay 6—13 as follows: From ground by way of the uppermost contacts ON—13, relay 6—13, inner upper armature of relay 4—13, and thence to battery, through resistor 25—13. With release relay 5—13 having been unable to operate at this time, as explained, relay 6—13 is unable to operate over the above-traced circuit because its winding is short-circuited to ground at the inner armature and back contact of release relay 5—13. As a result of the described provisions, only repeating relay 4—13 is able to operate at this time, relays 5—13 and 6—13 remaining restored until the normal position of the mechanism is again reached.

As soon as the mechanism reaches its normal position, off-normal contact springs ON—13 restore to the normal position indicated in the drawings. When this occurs, the middle contact pair of springs ON—13 removes ground potential from the front contact associated with the lower armature of repeating relay 4—13 thereby opening the above-described homing circuit (closed by repeating relay 4—13) to permit the mechanism to stop in its normal position. At the same time, the lowermost contact pair of ON—13 opens the circuit of hold relay 1—13 so as to restore this relay and thus open the circuit of the upper winding of any shift relay SRA—13 to SRD—14 that may have been energized as a result of the attempted finder action, thereby preventing operation of the unit of the primary currently allotted for finder operation.

The uppermost contacts of ON—13 disconnect ground potential from the winding of relay 6—13 and transfer it to the inner lower armature of the operated repeating relay 4—13, thereby closing a circuit for release relay 5—13. Upon operating, release relay 5—13 disconnects ground potential from the upper terminal of the winding of relay 6—13 and extends it to the inner lower armature of relay 4—13 independent of the off-normal contacts, whereby the inner lower armature of relay 4—13 is thereafter maintained grounded independent of contacts ON—13. Release relay 5—13 also, at its third armature from the top, disconnects motor magnet MM—13 from the portion of the circuit thereof used for finder and homing action, and transfers it to the contacts to be subsequently used for the transmission of directive impulses to the motor magnet; at its second armature it opens the start lead P1—ST to render the mechanism non-responsive to control thereover; and, at its uppermost armature, it applies ground potential directly (independent of the upper armature and front contact of repeating relay 4—13) to locking conductor 75—13, thereby maintaining a locking circuit for the actuated one of the shift-control relay SRD—14 during the dialing of the final digit.

By the described operation of repeating the release relays 4—13 and 5—13, primary #1 is prepared for connector action, and the locking circuit of the selected shift relay SRD—14, over conductor 75—13, is held intact at the upper armature and front contact of release relay 5—13.

*Dialing the units digit 0*

Having dialed the tens digit 1, with the results hereinbefore described, the calling subscriber may now dial the units digit 0 to cause connection to be made with the desired line (line 10) in the selected No. 1 tens group. When he does so, line relay 2—23 restores ten times momentarily. Each time it does so, at its upper contacts it opens the circuit previously traced (over the sleeve lead of the connection established through secondary unit 5SD—20 and primary link PID for repeating relay 4—13 of primary #1. Repeating relay 4—13 is thus restored ten times momentarily. Release relay 5—13, being slow-releasing, remains operated throughout the series of restorations of relay 4—13. Each time relay 4—13 restores, it closes a circuit at its inner lower armature and back contact for motor magnet MM—13 as follows: From ground by way of the inner armature and front contact of release relay 5—13, inner lower armature and back contact of relay 4—13, lower contacts of change-over relay 6—13, a front contact and an armature of relay 5—13, and thence to battery through the winding of motor magnet MM—13. Motor magnet MM—13 thus momentarily operates ten times, to advance the associated shaft mechanism from home position to the tenth selective position. As previously described, shift magnet SD—14 is being held operated through contacts of the operated relay SRD—14, to maintain the column-D unit IPD—14 mechanically selected for operation. Therefore, the rotation of the shaft mechanism of the primary into the tenth selective position causes the tenth set of selective contacts of unit IPD—14 (associated with the desired line 10) to be selected for operation.

The off-normal stackup ON—13 operates as soon as the mechanism leaves its normal position. As a result, each time repeating relay 4—13 reoperates, following the transmission of an impulse to motor magnet MM—13, it closes a circuit from battery, through resistor 25—13, and the inner upper contacts of relay 4—13, for change-over relay 6—13, to ground through off-normal contacts ON—13. This circuit is effective at this time because the ground connection has been removed from the upper terminal of relay 6—13 by the inner armature of relay 5—13. The winding of relay 6—13, however, is preferably of substantially high impedance, whereby relay 6—13 does not operate during the dialing operation.

At the end of the dialing operation, relay 4—13 comes to rest in an operated condition and change-over relay 6—13 operates. Upon operating, change-over relay 6—13 locks itself energized at its inner upper contacts independent of the corresponding contacts of repeating relay 4—13; at its lower contacts it opens the pulse circuit to magnet MM—13 to prevent advance of the shaft from its present position; at its middle upper armature it ungrounds conductor 73—13 to open the previously traced circuit of inter-digit transfer delay 12—24 of circuit CLC—1; and at its upper contacts it closes an operating circuit, from battery by way of the associated resistor, over conductor 70—13, and through contacts of the operated shift magnet SD—14, for the operating magnet OD—14 of the unit IPD—14. The selected No. 10 contacts, associated with the desired line 10, are thereby operated, along with the contacts of stackups $a^3$—14 and $b^3$—14. At the second set of contacts, counting from the bottom, in stackup $a^3$—14, a prepared locking circuit is completed for operating magnet OD—14, in parallel with the winding of link relay $D_1$—14, as follows: From ground through the winding of the said magnet, the said contacts of stackup $a^3$—14, front contact and middle armature of the operated link relay $D_1$—14, the hold conductor H of the primary link PID, contacts of secondary unit 5SD—20, hold conductor H of secondary link S5D, front contact and upper armature of link relay 5DD—22, branch hold conductor H1 of link S5D, upper contacts of stackup $b^3$—20, and thence to battery through the associated resistor.

As a result of the opening of the lowermost contacts of stackup $a^3$—14, the associated ring conductor of the link PID is disconnected from the normally grounded conductor 73—13 to clear this conductor in the primary for ringing and talking purposes.

*Clearing out the primary #1*

At the lowermost contacts $b^3$—14, the dial circuit previously established over the associated sleeve conductor for repeating relay 4—13 is opened, whereby the repeating relay 4—13 is restored to permit the primary to clear out and condition itself again for finder action. When relay 4—13 restores, it opens the initial circuit of change-over relay 6—13, but relay 6—13 remains operated temporarily because the said contacts of relay 4—13 are shunted at the inner armature and front contact of relay 6—13. Slow-acting release relay 5—13 restores shortly after repeating relay 4—13 restores. When it does so, it removes ground potential, at its inner armature, from the inner lower armature of repeating relay 4—13, whereby relay 5—13 cannot be again operated until the mechanism is restored to home position. Relay 5—13 also removes ground potential at its upper armature from conductor 75—13, thereby unlocking relay SRD—14 and permitting this relay to restore and open the circuit of shift magnet SD—14. Magnet SD—14 restores to terminate the mechanical selection of unit IPD—14, and to open the initial operating circuit of magnet OD—14, leaving this magnet operated in its holding circuit previously traced over the hold conductor H of primary link PID.

Relay 5—13 also again connects up the start lead PI—ST, and it again closes the homing circuit previously traced through the brush of commutator COM—P to permit the mechanism to advance toward its home position. Relay 5—13 also again applies ground potential to the upper terminal of relay 6—13, thereby short-circuiting relay 6—13 and restoring it. When relay 6—13 restores, the relays of primary #1 used for connector action have been completely cleared out, and the further operation of the primary is under the control of start lead PI—ST and the marking conductors associated with the commutator COM—P.

With relays 4—13 and 5—13 restored, ground potential is again applied to conductor 62—13 to prepare a circuit for matching-control relay J—14, to enable further matching to occur in primary #1 to any idle unit thereof when the next call is made to any line of the ten-line group served by primary #1.

*Testing the called line*

When the connection is made from connecting-link circuit CLC—1 (Figs. 23 and 24) through the secondary unit 5SD—20 and primary unit IPD—14, as previously described, the talking conductors are maintained open at the contacts of switching relay 15—24 of the link circuit until the called line is tested to determine its busy or idle condition. The testing of the called line is initiated upon restoration of inter-digit transfer relay 12—24 of the connecting link circuit CLC—1, responsive to the previously described opening of its circuit in primary #1 at the end of dialing.

When its circuit is opened as above pointed out, relay 12—24 falls back, and at its inner upper armature removes the shunt from around the contacts of auxiliary relay 11—23, thereby disconnecting itself from the link talking conductor to avoid interference in case the called line is busy. Slow-releasing relay 11—23 has been maintained operated through the contacts of relay 12—24, and remains operated for an interval after relay 12—24 restores, during which interval relay 8—23 operates to disconnect relay 12—24 at another point.

At its lower armature, relay 12—24 disconnects the associated sleeve conductor 21—24 (now extending over the established connection to the sleeve lead of the called line) from the repeating contacts of line relay 2—23 and transfers it to the test circuit, to which the windings of busy-test relay 8—23 and idle-test relay 14—24 are connected in parallel to battery. Current now flows from ground through the winding of cutoff relay CO'—13 of the called line 10, through the windings of relays 8—23 and 14—24 in a circuit to be traced hereinafter. When the called line is idle both relays 8—23 and 14—24 operate, but when the called line is busy the current flow is reduced sufficiently that relay 14—24 cannot operate, the reduction being effected because the cutoff relay is at that time energized through a resistor such as 22—13, or through a sleeve relay such as 1—23 or 1—25.

The complete test circuit for relays 8—23 and 14—24 is as follows: From ground by way of the winding of cutoff relay CO'—13 of the called line, the associated sleeve conductor of the called line, the two lowermost contacts in selective stackup 10 of unit IPD—14, outermost armature of the operated link relay D—14, sleeve lead S of link PID, fifth and sixth contacts in selective stackup 1 of unit 5SD—20, sleeve conductor S of link S5—D, upper armature and front contact of transfer relay 5CD—22, inner upper armature and front contact of connecting relay 2D—24, sleeve conductor 21—24, lower armature and back contact of relay 12—24, and thence to battery, by way of two branches. One branch is to battery through the winding of busy-test relay 8—23, and the other branch is to battery through the inner lower contacts of disconnect relay 7—23, conductor 53—24, normally closed contacts controlled by the inner lower armature of switching relay 15—24, and the winding of idle-test relay 14—24.

*The called line is busy*

Let it be assumed that the line of substation 10 is busy when called. Under this condition, a connection will have been extended from or to the line of substation 10 by another one of the units of priamry #1, and cutoff relay CO'—13 will have been operated, as stated, by the placing of a battery potential thereon to guard the line, as well as to operate the cutoff relay. Under this condition, the current flow over the above-traced test circuit is so reduced that relay 14—24 is unable to operate, in which event the more sensitive busy-test relay 8—23 operates alone. Upon operating, relay 8—23 further disconnects relay 12—24 at its lower armature to prevent reconnection thereof to the ring talking conductor when slow-releasing relay 11—23 restores, as it shortly does. At its upper armature, busy-test relay 8—23 closes a circuit over conductor 51—24 and contacts of switching relay 15—24 for busy-signalling relay 16—24. Relay 16—24 now operates to apply a busy-tone signal from lead BT—24, at its inner upper armature and front contact, back over the established connection to the calling line, to inform the calling subscriber of the busy condition. The application of dial-tone current, which has been continuously made to the calling line, through the back contact at the last-named armature, ever since the connection was extended to the connecting-link circuit, is thus terminated and a flow of busy-signalling current is substituted.

Busy-signalling relay 16—24 also opens the circuit of slow-releasing dial-tone relay 6—23. Relay 6—23 restores shortly thereafter and opens the dial-tone circuit at another point, at the same time removing ground potential from each of the connecting relays 2A—23 to 2D—24. Relay 2D—24, however, remains operated because it is locked, at its inner lower armature, to ground through the back contact of the upper armature of disconnect relay 7—23.

Having received the busy signal as above described, the calling subscriber is expected to replace his receiver and cause the connection to be cleared out in a manner to be pointed out hereinafter.

*The called line is idle*

Assuming now that the line of substation 10 is idle when called as described, then cutoff relay CO'—13 has no circuit established therefor to lower the current-flow in the test circuit previously traced for relays 8—23 and 14—24 in parallel. As a result of the closure of the test circuit under this condition, cutoff relay CO'—13 operates to clear the called line for ringing and talking purposes, and relays 8—23 and 14—24 both operate in series with relay CO'—13. Busy-test relay 8—23 disconnects relay 12—24 as described above, and (also as above described) closes a circuit for busy-signaling relay 16—24. At this time, however, the operation of busy relay 16—24 is only momentary (if at all) for relay 16—24 shortly becomes disconnected, as will be described.

When idle-test relay 14—24 operates (in series with the cutoff relay on the called line over the previously traced circuit) it opens both of the heavily-inked talking conductors, at its upper and lower armatures, to prevent ringing current from being applied to the calling line when it is applied to the called line; it closes a locking circuit for the upper portion of its winding, at its inner upper armature, to ground through the normally closed contacts controlled by the armature of answering-test relay 10—24, conductor 54—23, lower contacts of the unoperated relays 7—23 and 9—23, conductor 55—23, and thence to ground through the middle lower contacts of the operated dial-tone relay 6—23. At its middle lower armature, relay 14—24 placed the winding of switching relay 15—24 in the test circuit in parallel with its own winding, operating relay 15—24 in a circuit from ground through the cutoff relay CO'—13 and as previously traced to conductor 53—24, and thence through the middle lower contacts of relay 14—24, through the winding of switching relay 15—24, to battery. When relay 15—24 operates it opens the circuit of dial-tone relay 6—23 at its inner upper armature, at the same time making a multiple application of ground potential to conductor 55—23 to maintain the relay 14—24 operated over its described locking circuit after relay 6—23 has restored; it disconnects busy-signalling relay 16—24 at its middle upper armature so as to prevent or terminate operation of this relay; at its lower armature, it disconnects the associated lower talking conductor from the transfer-control lead 52—24 and closes a point in the talking circuit; and at its upper armature it disconnects the associated talking conductor from the dial-tone and busy-tone lead and closes a point in the talking crcuit.

*Ringing the called substation*

With relays 14—24 and 15—24 operated, the circuits are prepared for the intermittent application of ringing current to the called line. Such applications are made by ringing relay 13—24, now connected to the common ringing interrupter I at the inner lower contacts of the operated combined idle-test and ring-cutoff relay 14—24. Each time ringing relay 13—24 operates, it disconnects the windings of back bridge relay 9—23 from the called end of the connecting link circuit, at the same time applying battery potential to the lower, or ring, talking conductor and applying ringing current (from the ringing generator RG, through answering-test relay 10—24) to the upper, or tip, talking conductor of the called end of the circuit. As a further result of each operation of ringing relay 13—24 the illustrated ringing-tone lead (in series with a small condenser and a retard coil) is connected to the upper talking conductor leading to the calling line to apply a mild tone-signal to the calling line to indicate that the ringing operation is proceeding.

Additionally, the inner lower contacts of relay 13—24 remove the associated resistor from in shunt of the uppermost portion of the winding of the combined idle-test and ring-cutoff relay 14—24 to render the relay faster in restoring responsive to an opening of the circuit thereof at the contacts of relay 10—24 than it would be if it remained shunted by the said resistor. By the described intermittent operation of ringing relay 13—24, ringing current is intermittently applied over the established connection to operate the usual ringer (not shown) at the called substation 10. The usual condenser in series with this ringer prevents premature operation of relay 10—24.

*The called subscriber answers*

Assuming now that the called subscriber answers, by removing the receiver (not shown) at the called substation 10, a direct-current bridge is thereby closed across the conductors of the called line. This may occur either during one of the successive applications of ringing current (when ringing interrupter relay 13—24 is in operated condition), or it may occur between applications of ringing current (with relay 13—24 in a restored condition). If answering occurs during a ringing operation, the slow-operating answering-test relay 10—24 (non-responsive to a flow of alternating ringing current) operates in a direct-current circuit from ground through the ringing generator RG, the winding of relay 10—24, front contacts of ringing interrupter relay 13—24; and thence over the tip talking conductor to and through the direct-current bridge in the called substation, back over the ring conductor of the established connection, and thence to battery through the lower armature and front contact of relay 13—24. When relay 10—24 operates, it interrupts the locking circuit for the upper winding of relay 14—24, whereupon relay 14—24 immediately restores and unlocks itself, whereby it cannot reoperate. The circuit of ringing interrupter relay 13—24 is thereupon interrupted at the inner lower contacts of relay 14—24, and relay 13—24 restores. The ringing operation is thus terminated, and the talking circuit is finally completed at the upper and lower contacts of relay 14—24, talking current being supplied to the called line through the windings of back-bridge relay 9—23, and relay 9—23 operates.

On the other hand, if the called subscriber answers during a silent period following an application of ringing current, the back-bridge relay 9—23 is operated immediately, through contacts of the restored ringing interrupter relay 13—24. At its lower armature, relay 9—23 opens the locking circuit over conductor 54—23 for the upper winding of ring-cutoff relay 14—24, whereupon relay 14—24 restores and completes the talking circuit, at the same time opening a further point in the circuit of ringing interrupter relay 13—24 to prevent a reoperation of the latter relay.

Back-bridge relay 9—23 also shunts the inner lower contacts of disconnect relay 7—23 so as to prevent an interruption of the circuit of switching relay 15—24 until relay 9—23 restores.

The calling and called subscribers may now converse with each other as desired over the talking path indicated by the heavily inked talking conductors.

*Clearing out the established connection*

When the conversation has been completed, the calling and called subscribers are expected to replace their receivers to permit the established connection to be cleared out. Back-bridge relay 9—23 restores responsive to the opening of the direct-current bridge therefor when the receiver is replaced at the called substation. Upon restoring, relay 9—23 opens certain circuit points which it had closed preparatory to holding of the called or incoming end of the connection, whereby the complete clearing-out of the connection is placed under the control of line relay 2—23, held energized over the calling line.

Line relay 2—23 is restored upon the receiver being replaced at the calling substation. Slow-acting release relay 4—23 restores shortly after its circuit is opened by line relay 2—23. Upon restoring, release relay 4—23, at its inner upper armature, opens the circuit of the slow-releasing auxiliary release relay 5—23, and at its middle lower armature, it closes a circuit for disconnect relay 7—23 as follows: From ground by way of the inner upper armature and front contact of switching relay 15—24, conductor 55—23, inner lower contacts of sleeve relay 1—23, middle lower contacts of release relay 4—24, and the winding of disconnect relay 7—23, to battery. Relay 7—23 thereupon operates and locks itself at its inner upper contacts to conductor 51—24, now held grounded at the upper contacts of busy-test relay 8—23, At its upper armature relay 7—23 closes a holding circuit for relay 5—23 to maintain the latter relay operated for the time being. The operation of disconnect relay 7—23 initiates the clearing-out of the called or incoming end of the established connection in a manner to be described hereinafter.

With release relay 4—23 restored, and slow-restoring auxiliary relay 5—23 held operated by disconnect relay 7—23, the associated hold conductor H of the associated branch link S1A—O, and consequently of secondary link S1A, is disconnected from the associated lead H2 of branch link S1A—O, and consequently from conductor H2 of secondary link S1A. The separation of these leads breaks the previously traced holding circuit for operating magnet OA—17 of secondary unit 1SA—17 (connected directly to lead H2 of link S1A) and of link relay A₁—13 and operating magnet OA—13, previously energized over the hold lead H of the connection established by finder action, in series with the said operating magnet OA—17. When this holding circuit is thus opened the resultant restoration of magnet OA—17 clears out the secondary unit 1SA—17, and the restoration of operating magnet OA—13 returns the primary unit 1PA—13 to normal condition. The restoration of link relay A₁—13, responsive to the stated opening of its holding circuit, is delayed slightly (relay A₁—13 being slow-releasing as indicated) in order to avoid reestablishment of a holding circuit for magnet OA—13 through the contacts controlled by the middle armature of relay A₁—13 before magnet OA—13 has had time to restore and clear out the switching unit. Restoration of relay A₁—13 returns the primary link P1A to its illustrated normal condition.

By the previously described operations, the outgoing or finder-action end of the previously established connection has been cleared out and the primary and secondary units 1PA—13 and 1SA—17 are each available for either subsequent finder action or connector action.

With the finder-action end of the connection cleared out, the sleeve lead of the called line has now been disconnected from its battery supply through the winding of sleeve relay 1—23, whereby the line of substation 11 is marked idle in the line multiple, and cutoff relay CO—13 restores to again connect up line relay LR—13.

In the connecting-link circuit CLC—1, when the sleeve lead of the finder-action end of the established connection is opened by the described clearing-out operation at the involved primary and secondary units, sleeve relay 1—23 restores and opens the finder-action end of the connecting-link circuit CLC—1. The initial circuit of disconnect relay 7—23 is opened at the inner lower contacts of sleeve relay 1—23, leaving relay 7—23 operated in its locking circuit, closed at its inner upper contacts.

As a further result of the previously described operation of the now-locked disconnect relay 7—23, the associated sleeve lead S of branch S1A—O of the associated link S1A is opened temporarily at the middle lower contacts of relay 7—23 to insure a prompt restoration of sleeve relay 1—23; switching relay 15—24 is unlocked and restored at the inner lower contacts of relay 7—23 to open the talking connection between connecting-link circuit CLC—1 and the called line; and at the upper contacts of relay 7—23 the locking circuit of the operated connecting relay 2D—24 is opened.

Dial-tone relay 6—23 having been restored, as previously pointed out, to disconnect ground potential from the lower terminal of each of the connecting relays 2A—23 and 2D—24, and relay 2D—24 having been maintained operated thereafter in a locking circuit including its inner lower contacts and the upper contacts of disconnect relay 7—23, the opening of this locking circuit by disconnect relay 7—23 open-circuits relay 2D—24, as well as the operated link relay 5DD—22, connected in series with relay 2D—24. Additionally, the series circuit for relays 2D—24 and 5DD—22, with relay 5DD—22 operated, has been extended as previously described over the associated conductors H3 and H1 of branch S5D—O in series, inner upper contacts of the operated relay 5D—22, and over conductor H2 of link S5D, to battery through the operating magnet OD—20 of secondary unit 5SD—20. The current flow through the said devices OD—20, 5DD—22 and 2D—24 is thus terminated by the described opening of the upper contacts of relay 7—23. When this occurs, connecting relay 2D—24 immediately restores to open points in the previously established connection to the called line, and operating magnet OD—20 immediately restores to clear out the secondary unit 5SD—20. Link relay 5DD—22, however, is slow-restoring, as indicated, whereby it maintains its operated position until after operating magnet OD—22 has restored and disconnected the hold conductor H of the link 5SD from the hold conductor H of the link P1D, whereby the clearing-out operation is not held up, which would occur if relay 5DD—22 restored ahead of operating magnet OD—20.

With slow-releasing relay 5DD—22 still maintained in its operated position, the opening of the upper contacts of stackup b³—20 opens the previously traced holding circuit, established (over conductors H1 and H of link S5D, and conductor H of link P1D) for link relay D₁—14 and operating magnet OD—14 of the primary unit 1PD—14. The operating magnet OD—14 is thus able to restore and clear out the primary unit 1PD—14, and link relay D₁—14 restores shortly thereafter to return the link P1D to its illustrated normal condition.

When slow-restoring link relay 5DD—22 restores, the contacts controlled by the upper armatures thereof assume the illustrated normal condition but the initial locking circuits for the concerned primary and secondary units are not now reestablished through the contacts thereof because of the previously described clearing out in the meantime of secondary unit 5SD—20.

Responsive to the described clearing-out operation, the sleeve conductor of the called line 10 is now free of battery potential and the called line is thus marked idle in the line multiple, and cutoff relay CO'—13 is restored to again connect up the associated line relay LR'—13.

In the connecting-link circuit CLC—1, the described clearing out of the called end of the connection open-circuits and restores busy-test relay 8—23. The locking circuit of disconnect relay 7—23 is thereupon opened. The slow-restoring disconnect relay 7—23 falls back shortly thereafter, and, at its upper armature, opens the holding circuit of slow-acting auxiliary relay 5—23. Relay 5—23 restores a moment later, and when it does it rejoins the associated conductors H and H2 of the branch link S1A—O to again prepare a holding circuit thereover to be closed by secondary unit 1SA—17 as previously described upon the next operation thereof. Relay 5—23, at its lower armature, rejoins the branch-holding conductors H1 and H3 of the branch link S1A—O to thereby again enable the incoming or connector-action branch S1A—I of the secondary link S1D to be seized for connector action, following a matching operation, such as described hereinbefore, but involving secondary unit 1SA—17.

The apparatus involved in the previously described connection has now all been restored to normal condition and is in readiness for use in setting up subsequent connections.

*Special conditions of operation*

Certain special conditions of operation will now be explained.

It was explained hereinbefore that the lower winding of special-test relay 3—23 of connecting-link circuit CLC—1 is connected temporarily to the associated dial lead DL—S5 (common to the connecting-link circuits CLC—1, CLC—2, and CLC—11, Fig. 28) upon seizure of the link circuit CLC—1 for connector action, to enable special-test relay 3—23 to be operated over such dial lead to deny use of the dial lead to the circuit CLC—1 and to give a busy signal to the calling subscriber, in the event that the #5 secondary (with which the three connecting-link circuits just named are associated in common for connector action) is busy in connector action.

On the other hand, if the said secondary is busy in finder action, and the dial lead DL—S5 is idle, this dial lead is seized, from the connecting-link circuit CLC—1, for example, and the described dial-tone signal is given to the calling subscriber. Under this condition, however, the mechanism of the secondary being off-normal in finder action, the repeating relay 4—19 is unable to operate for the time being because its circuit is maintained open at the middle off-normal contact pair ON—19, and it is not closed until finder action is completed in the secondary and the mechanism thereof is restored to normal position. This operation, however, ordinarily requires less than a second, with the result that the circuit of repeating relay 4—19 is established at the middle off-normal contacts ON—19 to enable the described operation of relays 4—19 and 5—19 to occur and prepare the secondary for connector action before the calling subscriber responds to the previously mentioned dial-tone signal to start the dialing of the first digit.

It will be understood, of course, that the occurrence of the condition just mentioned is comparatively rare, for, when a connecting-link circuit is taken for use, the secondary associated therewith for connector action is ordinarily idle, and the mechanism thereof in normal position. In this connection, it should be remembered that the total time required to establish a connection is measured in seconds, while the time that a connection ordinarily remains established is measured in minutes. Consequently, any one of the operating mechanisms is idle and in normal position most of the time, even during a period of maximum use of the system.

In the description hereinbefore given of the setting up of the connection from line 11 to line 10, the possibility of the operating mechanism of the primary in the called tens group being off-normal in finder action was considered, and it was explained how the mechanism was caused to proceed immediately to home position without regard to the ensuing finder action (which can obviously take place just as well a second or so later) so as to be in position to respond to the impulses of the units digit when they arrive. There is ordinarily sufficient time between the dialing of successive digits to enable such a homing operation to be accomplished. On the other hand, if the mechanism of the selected primary is in use in connector action, such action cannot be delayed or interferred with by the second attempted use of the mechanism for connector action. In this event, matching into the primary unit is not permitted to occur, even though an idle path through a secondary and the primary is available, because the circuit of the associated matching-control "J" relay is maintained open by the connector-action relays of the primary. For example, with either, or both, of the connector-action relays 4—13 and 5—13 of primary #1 operated, ground potential is maintained disconnected from conductor 62—13, whereby no circuit can be closed for the time being through matching-control relay J—14. In this event, and assuming that the connecting-link circuit CLC—1 of Figs. 23 and 24 is the one involved, the matching-control relay 8—19 of the secondary #5 (associated with the said circuit for connector action) is also unable to operate in the event that the call is directed to the first primary, for relay 8—19 can operate only in series with the "J" relay of the called primary. In this event, the resulting delay in the matching operation gives sufficient time for the special-test relay 3—23 to be operated over its upper winding as previously described to cause the dial lead DL—S5 to be freed and busy-signalling relay 16—24 to be operated to return a busy signal to the calling substation.

A further precaution, touched upon but perhaps not fully explained in the course of the foregoing description, concerns the provision of series leads H1 and H3 of the outgoing branch of any link (such as the outgoing branch S1A—O of link S1A, or the outgoing branch S5D—O of the secondary S5D), and the lower contacts of the auxiliary release relay 5 of any link (such as relays 5—23, 5—25, and 5—27).

From the foregoing description, it will be recalled that the leads H1 and H3 of link S1A—O are held open at the lower contacts of auxiliary-release relay 5—23 throughout the time the link circuit CLC—1 is in use, and are not reclosed until a short interval after the connection set up thereto is cleared out. The separation of the said leads H1 and H3 during this time is an additional precaution to delay for an instant any attempted seizure of the associated incoming, or connector-action, branch of a secondary link during the instant of the clearing-out of the finder-action end of the preceding connection.

Here again, it will be understood, the situation being discussed occurs rarely, because of the close timing of successive calls that must occur for the situation to arise.

*Calls through other connecting-link circuits*

From the description given herein of the operation of the connecting-link circuit CLC—1, Figs. 23 and 24, it is believed that the operation of the other similar connecting-link circuits will be clearly understood. The connecting-link circuit CLC—9, however, is shown in full in Figs. 25 and 26 and the conductors to which this connecting-link circuit are connected are fully indicated.

The connecting-link circuit CLC—9 is taken for use over the outgoing branch S5A—O of the secondary link S5A, extending to the finder-action end of the connecting-link circuit CLC—

9 from link S5A and relays 5CA—21 and 5DA—21, as shown in Fig. 21.

The connecting-link circuit CLC—9 (along with the connecting-link circuit CLC—10, as shown in Fig. 28) is associated for connector action with secondary #1. Accordingly, the dial lead DL—S1 of secondary #1 extends to the connecting-link circuit CLC—9, as shown. Similarly, the no-match lead NM—S1 of secondary #1 extends to the connecting-link circuit CLC—9 as shown.

The connecting relays 2A—25 to 2D—26 of connecting-link circuit CLC—9 have access, along with the similar relays (indicated in Fig. 28) of connecting-link circuit CLC—10 to the incoming or connector-action branches (shown in Figs. 21 and 22) S1A—I, S1B—I, S1C—I, and S1D—I of the secondary links S1A, S1B, S1C, and S1D, respectively. It is to be observed that the secondary links last named are the ones whose outgoing branches extend respectively to the link circuit CLC—9 of Figs. 25 and 26 and CLC—3, CLC—11, and CLC—12 indicated in Fig. 22. The connecting-link circuits (CLC—9 and CLC—10) having access to these links of secondary #1 for connector action are seized by finder action of secondary #5, the last secondary in the line to respond to finder action. The relative number of calls handled by the said connecting-link circuits CLC—9 and CLC—10, therefore, is small, which is the principal reason that these link circuits have been assigned, for connector action, to secondary #1, the first-choice secondary for finder action. On the other hand, the connecting-link circuit CLC—1, first choice in column A for finder action, has access for connector action to the four units of secondary #5, which is the last-choice secondary for finder action.

*Finder action in other columns*

In the foregoing description, finder action in column A (through primary #1 and secondary #5) was described. From this description, it will be clear how finder action occurs from the column-A unit of any primary through the column-A unit of any secondary, as the primaries are all similar and as each secondary unit, on operation, extends the starting control downwardly to the next succeeding secondary to enable that secondary to respond in the same column to a further calling condition in column A of the primaries. Consideration will now be given briefly to finder action in the other columns.

It will be recalled that the order of preference for finder action is from column A to column D. It was further explained that when the column-A unit IPA—13 of primary #1 is operated, it shifts the finder-action control (at the uppermost contacts of stackup b—13) to the column-B unit IPB—14, if idle, and so on to the column-C unit IPC—14, finally to the column-D unit IPD—14, when the preceding units are all in use. Suppose now that any one of the units IPB—14 to IPD—14 is operated in finder action. In this case, the concerned one of the secondary-start conductors BS, CS, and DS is grounded to thereby cause operation of the concerned one of the marking-control relays XB—16 to XD—16, as described hereinbefore in connection with relay XA—15. Whichever one of these relays operates places ground potential, at its lower contact, on the associated start conductor of the corresponding column of secondary units, causing the first idle one thereof to be allotted or selected for finder action by the operation of the concerned one of the individual start relays, such as 4B—18 to 4D—18 of secondary #1.

It will be recalled that there is a secondary start chain for each column and that when the unit in a secondary column operates it extends the starting control to the next idle unit, to thereby cause finder action in such unit, under the control of the common secondary mechanism associated therewith.

In the previous description in connection with Fig. 28, it was pointed out that most of the finder action takes place in columns A and B of the primaries and secondaries and that the finder action in columns C and D is comparatively rare. Only two secondary links in columns C and D are fully equipped for controlling connector action, the links S1C and S1D of secondary S1, these links having their outgoing or finder-action branches extended to connecting-link circuits CLC—11 and CLC—12, respectively. The other secondary links in columns C and D are equipped only with the dummy-link circuits DLC—1 to DLC—8, provided primarily to enable connections which may be extended at rare intervals to any one of them to be held until cleared out, and to enable a busy signal to be sent back therefrom to inform the calling subscriber of the busy condition with respect to finder action.

*Dummy-link-circuit operation*

The operation of the dummy-link circuits is exemplified by the following description of the operation of the dummy-link circuit DLC—8, Fig. 27, when it is seized during one of those rare times when finder action occurs in columns C and D after the concerned one of the connecting-link circuits CLC—11 and CLC—12 associated respectively with these columns has been taken for use in finder action, or is unavailable for finder action because of connector action through the concerned secondary unit.

When the dummy-link circuit DLC—8, Figs. 28 and 27, is taken for use, it is through finder action of secondary #5 in column D, upon the operation of unit 5SD—20. When this occurs, a locking circuit is established for operating magnet OD—20 over conductor H2 of secondary link S5D, conductor H2 of branch S5D—O, upper contacts of auxiliary-release relay 5—27, the associated conductor H of branch S5D—O, contacts of link relay 5DD—22, conductor H of link S5D, operated selective-position contacts of unit 5SD—20, and thence to ground through the column-D primary link relay and operating magnet of the primary unit through which the call came.

The sleeve relay 1—27 of the dummy-link circuit DLC—8 is now energized in series with the cutoff relay of the calling line to connect up the windings of line relay 2—27. Relays 2—27, 4—27, and 5—27 now operate successively. The upper contacts of relay 4—27 maintain the associated conductors H2 and H joined together while the corresponding contacts of relay 5—27 are open, to prevent premature opening of the holding circuit above traced for operating magnet OD—20. At the lower contacts of relay 5—27, the associated conductors H1 and H3 are disconnected from each other for the hereinbefore-explained reason of preventing a possible premature taking for use of the same secondary link subsequently when the finder-action connection now under consideration is being cleared out.

At the upper contacts of line relay 2—27 the associated busy-tone lead BT—27 is connected, through the illustrated condenser, to the associated tip talking conductor T to thereby transmit a busy-tone signal back over the established connection to the calling line to inform the calling subscriber of the busy condition.

When the calling subscriber replaces his receiver, the resulting restoration of relay 2—27 permits relay 4—27 to restore shortly thereafter, followed after a slight interval by the restoration of slow-acting relay 5—27.

When relay 4—27 restores, and pending the restoration of relay 5—27, the associated conductors H2 and H are separated, opening the previously traced holding circuit to thereby clear out the connection. Sleeve relay 1—27, along with the cutoff relay of the calling line, is restored at this time.

When relay 5—27 restores, a moment later, it rejoins the associated conductors H and H2 at its upper contacts in preparation for any subsequent seizure of the circuit, while at its lower contacts it again joins the associated conductors H1 and H3 to permit the incoming or connector-action branch S5D—1 of link S5D to be taken into use by any one of the three link circuits having access thereto for connector action, as hereinbefore described.

*Connector action in other columns*

Connector action in column D has been described hereinbefore. It will be recalled that the column in which connector action takes place is determined by the busy or idle condition of the units of the secondary and primary involved (the secondary associated with the connecting-link circuit for connector action, and the primary unit serving the called ten-line group), the order of preference for connector action being from column D to column A.

It was further brought out in the preceding description that the column used for connector action depends upon the outcome of what is termed a matching operation, taking place upon the energization of the matching-control relay of the secondary (such as relay 8—17 or 8—19) in series with the matching-control relay of the called primary (such as relay J—14 of primary #1) at the end of the dialing of the tens digit, the digit which selects the ten-line groups served by a specified primary.

As was described to some extent hereinbefore, upon the energization of the matching-control relay of a calling secondary, the common matching buses (AR, BR, CR, and DR; and AG, BG, and CG) are connected up to the individual circuit conductors of the calling secondary, while the "J" relay in the called primary makes connections to the common matching buses. Thereupon, in the first column (from right to left) containing an idle unit in the calling secondary and an idle unit in the called primary, the shift-control relay of the said primary unit energizes in series with the shift-control relay of the said secondary unit, to bring about the immediate operation of the secondary unit to seize the primary unit, following which the common mechanism of the called primary responds to the final digit to cause the matched unit of the primary to make connection with the called line.

Referring again to the connecting-link circuit CLC—1 of Figs. 23 and 24, it will be recalled that ground potential is placed on the lower terminal of each of the connecting relays 2A—23 to 2D—24 by dial-tone relay 6—23 upon the seizure of the circuit to prepare for the operation of whichever one of the connecting relays has its circuit completed responsive to matching in the associated column. It was described hereinbefore how relay 2D—24 operated to connect the link circuit CLC—1 with its column-D connector-action path as a result of successful matching in column D. Alternatively, if matching had taken place instead in another one of the columns, the concerned one of the relays 2A—23 to 2C—24 would have operated to connect the link circuit CLC—1 with its connector action path in that column, responsive to the actuation of the matched unit of the associated secondary #5.

The matching-circuit conductors shown in Figs. 13 to 20 are shown in Fig. 29 separated from the other conductors of Figs. 13 to 20 to enable the matching-circuit operations now to be described to be followed more readily. In Fig. 29 the portion of the primary #10 concerned with the matching operation is indicated, in addition to the corresponding portion of primary #1, secondary #1, and secondary #5.

With reference to Fig. 29, and in partial review of the column-D matching operation hereinbefore described, it will be assumed now that secondary #5 is in use in a call to primary #1 and that relay J—14 has been operated in series with relay 8—19, over a circuit path traced hereinbefore in connection with the description of the operation of Figs. 13 and 24. For convenience, in Fig. 29, relay 8—19 is indicated as having thereon all of the contacts of the associated-auxiliary relay 9—19. Similarly, relay 8—17 is indicated as having thereon all of the contacts of relay 9—17.

With relay J—14 operated, battery potential is extended thereby to the matching winding of each of the shift-control relays of primary #1 (SRA—13 to SRD—14), each such connection including the indicated ones of the associated "b" stackup contacts ($b$—13, $b'$—14, $b^2$—14, and $b^3$—14). Each of these contacts is closed except when the associated primary unit is in use. Therefore, battery potential is extended through the said "b" contacts and relay windings of each idle unit of the primary to the associated one of the relay buses AR to DR. Conductors AR to DR, and AG to CG are multipled into each of the ten primaries, but (as explained hereinbefore) only one "J" relay is operated at a time.

In the calling secondary (assumed for example to be secondary #5) contacts of relay 8—19 have made connections to the windings of shift control relays SRA—19 to SRD—20 to prepare for the operation of any one of these relays over the concerned relay bus (AR to DR) in series with the winding of the corresponding relay of the called primary. As will now be described, one, and only one, of these circuits can be closed under any busy or idle condition of the primary and secondary units involved.

*Review of matching in column D*

Assuming first that the column-D unit of secondary #5 and column-D unit of primary #1 are both idle, a circuit (described hereinbefore in connection with the description of the establishment of a connection through the system) is established for the lower or matching windings of relay SRD—20 and relay SRD—14 in series over the D-relay bus DR: from ground through the outer contacts of relay 8—19, normally closed contacts of stackup $b^3$—20, additional contacts of relay 8—19, lower winding of relay SRD—20, the column-D relay bus DR, lower winding of relay SRD—14, normally closed contacts of stackup $b^3$—14, and thence to battery through individual contacts of relay J—14. As hereinbefore described, successful matching in column D follows the operation of relays SRD—14 and SRD—20 in series over the above-traced circuit.

Assuming for the moment that all units are idle in the calling secondary and in the calling primary, only the column-D matching circuit (through the lower windings of SRD—14 and SRD—20) is complete, because ground potential is not applied under this condition to the lower terminals of relay SRC—20, SRB—20, and SRA—19.

Matching in column C

If the column-D unit of primary #1 is in use, the illustrated contacts $b^3$—14 are open, preventing matching in column D, and the illustrated ones of contacts $a^3$—14 are closed to extend ground potential from contacts of relay J—14 to the C-column ground bus CG, to enable matching to occur in column C. On the other hand, assuming the column-D primary unit to be idle and the column-D secondary unit to be in use, the illustrated contacts $b^3$—20 are shifted to open the column-D matching circuit and to extend ground potential through contacts of the now-operated relay 8—19, and through contacts of the restored relay SRD—20, to the said column-C ground bus CG. If the column-D units of the called primary and the calling secondary are both in use, the column-D matching circuit is obviously opened at two points and ground potential is extended at two points to the column-C ground bus CG.

With ground potential thus applied to the column-C ground bus CG, under either of the three conditions named above, matching can take place in column C, and column C only, provided the column-C units of the concerned primary and secondary are both idle. Under this condition, the matching circuit for the lower windings of relays SRC—14 and SRC—20 is as follows: from battery through contacts of relay J—14, closed contacts $b^2$—14, lower winding of relay SRC—14, column-C relay bus CR, lower winding of relay SRC—20, contacts of the operated relay 8—19, normally closed contacts of $b^2$—20, and thence to the said ground on the column-C ground bus CG.

Matching in column B

If matching cannot occur in column D, and the column-C unit of the called primary #1 is in use, contacts $b^2$—14 are open, opening the above-traced matching circuit, and the illustrated contacts $a^2$—14 are closed. A connection is then complete from the then-grounded bus CG, through contacts of matching-control relay J—14, and the closed contacts $a^2$—14, to the column-B ground bus BG, to permit matching to occur in column B. On the other hand, if the column-C unit of the primary is idle and the column-C unit of secondary #5 is busy, the shifted condition of the illustrated contacts of stackup $b^2$—20 opens the above-traced matching circuit for relays SRC—14 and SRC—20, and transfers ground potential from the grounded bus CG, through the alternate contact $b^2$—20, other contacts of relay 8—19, and contacts of the restored relay SRC—20, to the column-B ground bus BG. If the column-C units are busy in both the primary and the secondary, the matching-control circuit for column C is opened in two points and a double connection is made from grounded bus CG to bus BG.

Under any one of the three conditions named, if the column-B units of primary #1 and secondary #5 are idle, a matching circuit is complete as follows for relays SRB—14 and SRB—20: from battery through contacts of relay J—14, closed contacts $b'$—14, the lower winding of relay SRB—14, column-B relay bus BR, the lower winding of relay SRB—20, contacts of relay 8—19, normally closed contacts $b'$—20, and thence to ground on the column-B ground bus BG.

Matching in column A

In the event that matching cannot occur, as assumed, in either column D or column C, and the column-B unit of primary #1 is in use, the above-traced matching circuit is open at contacts $b'$—14, while at contacts $a'$—14, ground potential is extended from the then-grounded bus BG, through contacts of relay J—14, and contacts $a'$—14 to the A-column ground bus AG. On the other hand, if the column-B unit of primary #1 is idle, and the column-B unit of secondary #5 is busy, the above-traced matching circuit is open at the lower one of the shifted contacts $b'$—20, and the ground potential on bus BG is thus extended, through the alternate contact $b'$—20, additional contacts of relay 8—19, and through the lower contacts of relay SRB—20, to the A-column ground bus AG. If the column-B unit of the primary and the column-B unit of the secondary are both in use, the above-traced column-B matching circuit is open at two points, and ground potential is extended by two paths from bus BG to the column-A bus AG.

With ground potential thus extended to the A-column ground bus AG, if the both column-A units concerned are idle, a matching circuit is now complete in column A, as follows: From battery, through contacts of relay J—14, normally closed contacts $b$—13, the lower winding of relay SRA—13, column-A relay bus AR, lower winding of relay SRA—19, contacts of relay 8—19, normally closed contacts $b$—19, and thence to ground on bus AG.

If the column-A unit of primary #1 is in use, the above-traced matching circuit is open at contacts $b$—13. On the other hand, if the column-A unit is idle and the column-A unit of secondary #5 is in use, the said matching circuit is open at contacts $b$—19. If both units are in use, the matching circuit is open at both points.

Matching through other primaries and other secondaries

When secondary #1, for example, is the calling secondary, instead of secondary #5, relays 8—17 and 9—17 are the ones operated at the secondary-end of the matching circuits. Under this condition, and assuming that the primary #1 is the called primary, the matching operations are controlled as hereinbefore described over relay buses AR to DR and ground buses AG and CG. On the other hand, if the call is from any one of the secondaries to primary #10, for example, the matching portion of whose circuits are shown in Fig. 29, one or the other of the relays SRA to SRD of primary #10 is operated in series with the corresponding relay of the calling secondary over the vertically extending matching conductors (AR to DR, and AG to CG), for relay J of primary #10 is operated in this case in place of relay J—14 of primary #1.

I claim:

1. In a telephone system, a group of lines, a plurality of circuit controllers, sets of contacts in each circuit controller, each line terminating in contacts of a set of contacts in each of said circuit controllers, mechanism and circuits for controlling said circuit controllers whereby any idle one of said circuit controllers may be actuated automatically upon initiation of a call on one of said lines to seize the calling line, and means for transmitting directive impulses to said controlling mechanism, said circuits and mechanism being operative under control of said impulses to cause any idle one of said circuit controllers to establish connection to the line corresponding to the number of impulses transmitted.

2. In a telephone system, a group of lines, a plurality of circuit controllers, sets of contacts in each circuit controller, each line terminating in contacts of a set in each of said circuit controllers, controlling mechanism common to said circuit controllers and circuits whereby any idle one of said circuit controllers may be actuated automatically upon initiation of a call on one of said lines to seize the calling line, and means for transmitting directive impulses to said controlling mechanism, said circuits and mechanism being operative under control of said impulses to cause any idle one of said circuit controllers to establish connection to the line corresponding to the number of impulses transmitted.

3. In a telephone system, a group of lines, a group of circuit controllers arranged for both line finder operation and connector operation, groups of contacts in each circuit controller, terminal contacts of each line in one group of contacts of each circuit controller, means providing an order of preference for the operation of the circuit controllers of said group for line finder operation, controlling mechanism and circuits for said circuit controllers whereby the first idle one of said circuit controllers in line finder order of preference will be actuated automatically incident to the initiation of a call on one of said lines to seize the calling line, means for establishing a different order of preference for said circuit controllers when used for connector operation and means for transmitting directive impulses to said controlling mechanism, said circuits and mechanism being operative under control of said impulses to cause the first available one of said circuit controllers in connector order of preference to establish connection to the line corresponding to the number of impulses transmitted.

4. In a telephone system, groups of lines, groups of circuit controllers, one for each group of lines, operable to seize either calling or wanted lines, a plurality of contact sets in each circuit controller, each line terminating in a contact set of each circuit controller of its group, means providing an order of preference for the operation of the circuit controllers of a group for line finder operation, controlling mechanism and circuits for the circuit controllers of each group operable incident to the initiation of a call on one of the lines of a group to cause the first idle one of the circuit controllers serving the calling line to be actuated automatically to seize the calling line, means for establishing a different order of preference for said circuit controllers when used for connector operation, and means for transmitting directive impulses to any said controlling mechanism, said any mechanism and associated circuits being operative under control of said impulses to cause the first circuit controller in connector operation order of preference which is available in the associated group to establish connection to the line thereof corresponding to the number of impulses transmitted.

5. In a telephone system, groups of lines, groups of primary circuit controllers, each group of primary circuit controllers being individual to a group of lines, sets of contacts in each of said circuit controllers, each circuit controller having a terminal contact set for each line of the group to which it is individual, groups of secondary circuit controllers, sets of contacts in each of said secondary circuit controllers, each secondary circuit controller having a set of contacts for each group of primary circuit controllers, corresponding circuit controllers of each of the groups of primary circuit controllers and secondary circuit controllers having a sequence relation, controlling circuits and mechanism individual to each group of circuit controllers but common to the circuit controllers of the group, and means effective responsive to the initiation of a call on any of said lines for causing an idle primary circuit controller of the group individual to the calling line to effect connection to the terminals of said line and means for causing an idle secondary circuit controller in the same sequence as the actuated primary circuit controller, to effect connection to terminals of the said actuated primary circuit controller.

6. In a telephone system, groups of lines, groups of primary circuit controllers, each group of primary circuit controllers being individual to a group of lines, sets of contacts in each of said circuit controllers, each circuit controller having a separate contact set for each line of the group of lines to which it is individual, terminals of said lines in said sets, respectively, groups of secondary circuit controllers, the corresponding primary circuit controllers and secondary circuit controllers being electrically related to form a plurality of series, the said secondary circuit controllers of a series being common to the primary circuit controllers of the same series, contact sets in said secondary circuit controllers, each secondary circuit controller having a contact set for each primary circuit controller in the same series therewith, extensions from said primary circuit controllers terminating in the said contact sets of each of said secondary circuit controllers of the same series, controlling means for said primary circuit controllers actuated incident to the initiation of a call on one of said lines for causing an idle primary circuit controller to close a contact set in which the calling line terminates and controlling means for said secondary circuit controllers actuated as a result of the operation of a primary circuit controller in seizing a calling line for causing an idle secondary circuit controller in the same series as the actuated primary circuit controller to close the contacts of the set in which the extension from said actuated primary circuit controller terminates.

7. In a telephone system, groups of lines, groups of primary circuit controllers, each group of primary circuit controllers being individual to a group of lines, sets of contacts in each of said circuit controllers, each circuit controller having a separate contact set for each line of the group of lines to which it is individual, terminals of said lines in said sets, respectively, groups of secondary circuit controllers, the said primary circuit controllers and secondary circuit controllers being electrically related to form a plurality of series, each series comprising a circuit controller of each group, the said secondary circuit controllers of a series being common to the primary circuit controllers of the same series, contact sets in said secondary circuit controllers, each secondary circuit controller having a contact set for each primary circuit controller in the same series therewith, extensions from said primary circuit controllers terminating in the said contact sets of said secondary circuit controllers, respectively, controlling means for said primary circuit controllers actuated incident to the initiation of a call on one of said lines for causing an idle primary circuit controller to close the single contact set of the said idle primary circuit controller in which the calling line terminates and controlling means for said secondary circuit controllers for causing an idle secondary circuit controller in the same series as the actuated primary circuit controller to close the contacts of the single set in which the extension from said primary circuit controller terminates.

8. In a telephone system, groups of lines, groups of primary circuit controllers individual to said groups of lines, respectively, a group of contacts in each of said circuit controllers for each line of its group in which said line terminates, a group of secondary circuit controllers, sets of contacts in each of said secondary circuit controllers, one for each group of said primary circuit controllers, link circuits, one for each of said secondary circuit controllers, respectively, and circuits and mechanism controlling the operation of said primary and secondary circuit controllers whereby, upon the initiation of a call on one of said lines, an idle one of said primary circuit controllers and an idle one of said secondary circuit controllers will be automatically actuated in succession to extend the calling line to one of said links.

9. In a telephone system, groups of lines, groups of primary circuit controllers, respectively, individual to said groups of lines, a set of contacts in each of said circuit controllers for each line of its group, groups of secondary circuit controllers, corresponding circuit controllers of said groups of primary circuit controllers and said groups of secondary circuit controllers being in a plurality of series, sets of contacts in each of said secondary circuit controllers, one for each of said primary circuit controllers in the same series therewith, link circuits, one for each of said secondary circuit controllers, respectively, and circuits and mechanism controlling the operation of said primary and secondary circuit controllers whereby, upon the initiation of a call on one of said lines, one of said primary circuit controllers and one of said secondary circuit controllers in the same series with the said one of said primary circuit controllers will be automatically actuated in succession to extend the calling line to the link circuit of the actuated secondary circuit controller.

10. In a telephone system, groups of lines, groups of primary circuit controllers, each group of primary circuit controllers being individual to a group of lines, sets of contacts in each of said circuit controllers, each primary circuit controller having a contact set for each line of the group to which it is individual, groups of secondary circuit controllers, the primary and secondary circuit controllers being electrically connected to provide a plurality of series, each series containing a circuit controller of each group, sets of contacts in each of said secondary circuit controllers, each secondary circuit controller having a set of contacts for each primary circuit controller in its series, controlling circuits and mechanism individual to each group of circuit controllers but common to the circuit controllers of the group, and means effective responsive to the initiation of a call on any of said lines for causing an idle primary circuit controller of the group individual to the calling line to close the contacts of the single set in which the calling line terminates and means for causing an idle secondary circuit controller in the same series as the actuated primary circuit controller to close the contacts of its single set corresponding to the said actuated primary circuit controller.

11. In a telephone system, groups of lines, groups of circuit controllers, one for each group of lines, means permitting each of said circuit controllers to be operated either as a line finder or connector, a plurality of contact sets in each circuit controller, each line terminating in a contact set of each circuit controller of its group, means providing an order of preference for the operation of the circuit controllers of a group for line finder operation, controlling mechanism and circuits for the circuit controllers of each group operable incident to the initiation of a call on one of the lines of a group to cause the first idle one of the circuit controllers serving the calling line to be actuated automatically to close the single contact set in which the calling line terminates, means for establishing a different order of preference for said circuit controllers when used for connector operation and means for transmitting directive impulses to any said controlling mechanism, said any mechanism and associated circuits being operative under control of said impulses to cause the first available one of said circuit controllers in connector operation order of preference in the associated group to close only the contacts of the single set corresponding to the number of impulses transmitted.

12. In a telephone system, a group of lines, a plurality of circuit controllers, sets of contacts in each circuit controller, each line terminating in contacts of a set of contacts in each of said circuit controllers, controlling mechanism and circuits for said circuit controllers whereby any idle one of said circuit controllers may be actuated automatically upon initiation of a call on one of said lines to close the single set of contacts in which the calling line terminates, and means for transmitting directive impulses to said controlling mechanism, said circuits and mechanism being operative under control of said impulses to cause any idle one of said circuit controllers to establish connection to the line corresponding to the number of impulses transmitted.

13. In a telephone system, a group of lines, a plurality of circuit controllers, sets of contacts in each circuit controller, each line terminating in contacts of a set of contacts in each of said circuit controllers, controlling mechanism and circuits for said circuit controllers whereby any idle one of said circuit controllers may be actuated automatically upon initiation of a call on one of said lines to close the single set of contacts in which the calling line terminates, and means for transmitting directive impulses to said controlling mechanism, said circuits and mechanism being operative under control of said impulses to cause an idle one of said circuit controllers to close the contacts of the single set corresponding to the number of impulses transmitted.

14. In a telephone system, groups of lines, groups of primary circuit controllers, each group of primary circuit controllers being individual to a group of lines, sets of contacts in each of said circuit controllers, each circuit controller having a contact set for each line of the group to which it is individual, groups of secondary circuit controllers, the primary and secondary circuit controllers being electrically related in a plurality of series, each series containing a circuit controller of each group, sets of contacts in each of said secondary circuit controllers, each secondary circuit controller having a set of contacts for each primary circuit controller in the same series therewith, controlling circuits and mechansm indivdual to each group of circuit controllers but common to the circuit controllers of the group, and means effective responsive to the initiation of a call on any of said lines for causing an idle primary circuit controller of the group individual to the calling line to actuate the set of contacts containing the terminals of the calling line and means thereby rendered effective for causing an idle secondary, in the same series as the actuated primary circuit controller, to close the contacts of the set containing terminals of the said actuated primary circuit controller.

15. In a telephone system, groups of lines, groups of circuit controllers, one for each group of lines, a plurality of contact sets in each circuit controller, means permitting each of said circuit controllers to be operated either as a line finder or as a connector, each line terminating in a contact set of each circuit controller of its group, means providing an order of preference for the operation of the circuit controllers of a group for line finder operation, controlling mechanism and circuits for the circuit controllers of each group operable incident to the initiation of a call on one of the lines of a group to cause the first idle one of the circuit controllers serving the calling line to be actuated automatically to close the contacts of the set in which the calling line terminates, means for establishing a different order of preference for said circuit controllers when used for connector operation, and means for transmitting directive impulses corresponding to the last digit of the number of a wanted line of any group of lines to the associated controlling mechanism, such mechanism and associated circuits being operative under control of said impulses to cause that circuit controller of the group of the called line which is first available in connector operation order of preference to close only the contacts of the set corresponding to the number of impulses transmitted.

16. In a telephone system, groups of lines, groups of primary circuit controllers respectively individual thereto, each circuit controller having a separate contact set for each line of the group to which it is individual, terminals of said lines in said sets, respectively, groups of secondary circuit controllers, the said primary circuit controllers and secondary circuit controllers being electrically related to form a plurality of series, each series including a circuit controller of each group, the said secondary circuit controller of a series being common to the primary circuit controllers of the same series, contact sets in said secondary circuit controllers, each secondary circuit controller having a contact set for each primary circuit controller in the same series therewith, extensions fom said primary circuit controllers terminating in the said contact sets of said secondary circuit controllers, respectively, means actuated incident to the initiation of a call on one of said lines for causing the controlling means of the primary circuit controllers of the calling line group to actuate an idle primary circuit controller to close the single contact set in which the calling line terminates and controlling means for said secondary circuit controllers actuated as a result of the operation of a primary circuit controller in seizing a calling line for causing an idle secondary circuit controller in the same series as the actuated primary circuit controller to close the contacts of the set in which the extension from said actuated circuit controller terminates.

17. In a telephone system, a group of lines, including a calling line and a called line, a group of primary circuit controllers, individual to said lines, sets of contacts in each of said primary circuit controllers, each line terminating in contacts of a set in each circuit controller, a group of secondary circuit controllers, the said primary circuit controllers and said secondary circuit controllers being electrically connected to form a plurality of series of circuit controllers, a link, means operative incident to the initiation of a call on one of said lines for connecting the calling line to said link, an impulse device, a controlling mechanism, means responsive to the operation of said impulse device in accordance with part of the number of the called line for setting said controlling mechanism to designate the said group of primary circuit controllers, means effective incident thereto for automatically selecting a said series which contains an idle primary circuit controller and also an idle secondary circuit controller, means for thereupon establishing connection from said link to the said primary circuit controller in the selected series and means responsive to a further operation of said impulse device for causing the said primary circuit controller in the selected series to complete connection to the called line.

18. In a telephone system, groups of lines, including a calling line and a called line, groups of primary circuit controllers, respectively individual to said groups of lines, sets of contacts in each of said primary circuit controllers, each line terminating in contacts of a set in each circuit controller of its group, a group of secondary circuit controllers, the said primary circuit controllers and said secondary circuit controllers being electrically connected to form a plurality of series of circuit controllers, controlling mechanism, a link, means operative incident to the initiation of a call on one of said lines for connecting the calling line to said link, an impulse device, means responsive to the operation of said impulse device in accordance with part of the number of the called line for setting said controlling mechanism to designate the group of primary circuit controllers in contacts of which the wanted line terminates, means effective incident thereto for automatically selecting a said series which contains an idle primary circuit controller in contacts of which the called line terminates and also an idle secondary circuit controller of said group of secondary circuit controllers, means for thereupon establishing connection from said link to the primary circuit controller in the selected series through contacts of the secondary circuit controller in said series and means responsive to a further operation of said impulse device for causing the said primary circuit controller in the selected series to close a single set of contacts to complete connection to the called line.

19. In a telephone system, a group of lines, including a calling line and a called line, a group of primary cricuit controllers, individual to said lines, sets of contacts in each of said primary circuit controllers, each line terminating in contacts of a set in each primary circuit controller, a group of secondary circuit controllers, a link, means in said link for extending a connection from said link to any one of said secondary circuit controllers, the said primary circuit controllers and said secondary circuit controllers being electrically connected to form a plurality of series of circuit controllers, controlling mechanism for each group of circuit controllers, means operative incident to the initiation of a call on one of said lines for connecting the calling line to said link, an impulse device, means responsive to the operation of said impulse device in accordance with part of the number of the called line for setting the controlling mechanism of said secondary circuit controllers to designate the said group of primary circuit controllers, means effective incident thereto for automatically selecting a said series which contains an idle primary circuit controller and also an idle secondary circuit controller, means for thereupon establishing connection from said link to the primary circuit controller in the selected series through contacts of the secondary circuit controller in said selected series and means responsive to a further operation of said impulse device for causing the said primary circuit controller in the selected series to complete connection to the called line.

20. In a telephone system, groups of lines, including a calling line and a called line, groups of primary circuit controllers, respectively individual to said groups of lines, sets of contacts in each of said primary circuit controllers, each line terminating in contacts of a set in each circuit controller of its group, a group of secondary circuit controllers, a link, means in said link for extending a connection from said link to any one of said secondary circuit controllers, the said primary circuit controllers and said secondary circuit controllers being electrically connected to form a plurality of series of circuit controllers, controlling mechanism for each group of circuit controllers, means operative incident to the initiation of a call on one of said lines for connecting the calling line to said link, an impulse device, means responsive to the operation of said impulse device in accordance with part of the number of the called line for setting the controlling mechanism of said secondary circuit controllers, to designate the group of primary circuit controllers in contacts of which the wanted line terminates, means effective incident thereto for automatically selecting a said series containing an idle primary circuit controller in contacts of which the called line terminates and also an idle secondary circuit controller, means for thereupon establishing connection from said link to the primary circuit controller in the selected series through contacts of the secondary circuit controller in said selected series and means responsive to a further operation of said impulse device for causing the said selected primary circuit controller to complete connection to the called line.

21. In a telephone system, groups of lines, including a calling line and a called line, groups of primary circuit controllers, respectively individual to said groups of lines, sets of contacts in each of said primary circuit controllers, each line terminating in contacts of a set in each circuit controller of its group, a first group of secondary circuit controllers, a link, means for extending a connection from said link to any one of said secondary circuit controllers in said first group, a second group of secondary circuit controllers, the said primary circuit controllers and said secondary circuit controllers being electrically connected to form a plurality of series of circuit controllers, controlling mechanism for each group of circuit controllers, means operative incident to the initiation of a call on one of said lines for conecting the calling line to said link through contacts of a primary circuit controller in contacts of which the calling line terminates and a secondary circuit controller of the said second group, an impulse device, means responsive to the operation of said impulse device in accordance with part of the number of the called line for setting the controlling mechanism of said first group of secondary circuit controllers to designate the group of primary circuit controllers in contacts of which the wanted line terminates, means effective incident thereto for automatically selecting a said series which contains an idle primary circuit controller in contacts of which the called line terminates and also an idle secondary circuit controller of the said first group, means for thereupon establishing connection from said link to the primary circuit controller in the selected series through contacts of the secondary circuit controller in said series and means responsive to a further operation of said impulse device for causing the said primary circuit controller in the selected series to complete connection to the called line.

22. In a telephone system, groups of lines, including a calling line and a called line, groups of primary circuit controllers, respectively individual to said groups of lines, sets of contacts in each of said primary circuit controllers, each line terminating in contacts of a set in each circuit controller of its group, a group of secondary circuit controllers, the said primary circuit controllers and said secondary circuit controllers being electrically connected to form a plurality of series of circuit controllers, controlling mechanism, a link, means operative incident to the initiation of a call on one of said lines for connecting the calling line to said link, an impulse device, means responsive to the operation of said impulse device in accordance with part of the number of the called line for setting said controlling mechanism to designate the group of primary circuit controllers in contacts of which the wanted line terminates, means effective incident thereto for automatically seelcting a said series which contains an idle primary circuit controller in contacts of which the called line terminates and also an idle secondary circuit controller, means thereby rendered effective to operate a single set of contacts of the secondary circuit controller in said series to establish a connection from said link to the primary circuit controller in the selected series and means responsive to a further operation of said impulse device for closing the single set of contacts of the said primary circuit controller in the selected series in which the called line terminates.

23. In a telephone system, a group of telephone lines, a group of circuit controllers, contacts in each of said circuit controllers in which said lines terminate and means to effect the operation of said circuit controllers to establish connection to either a calling line or a called line substantially as described.

24. In a switching system, lines divided into groups, groups of primary switching devices assigned respectively to said groups of lines, each primary switching device having access to all the lines of the group to which it is assigned, groups of secondary switching devices, the switching devices in each primary group corresponding respectively to said secondary groups, the devices in each secondary group having access to a corresponding primary device in each of the primary groups, means for recording the designation of the line group containing a desired called line and the designation of such line in the called group; means controlled in accordance with the recorded designation of the line group for closing a circuit path through a device in any secondary group to the corresponding primary device in the called group, dependent upon the concerned secondary device and the corresponding primary device in the called group both being idle; and means controlled in accordance with the recorded designation of the called line in the called group for operating the last-named primary device to make connection with the called line.

25. In a switching system, lines divided into groups, groups of primary switching devices assigned respectively to said groups of lines, each primary switching device having access to all the lines of the group to which it is assigned, groups of secondary switching devices, the switching devices in each primary group corresponding respectively to said secondary groups, the devices in each secondary group having access to a corresponding primary device in each of the primary groups, means controlled over a calling line for recording the designation of the line group containing a desired called line and the designation of such line in the called group; means controlled in accordance with the recorded designation of the line group for closing a circuit path through a device in any secondary group to the corresponding primary device in the called group, dependent upon the concerned secondary device and the corresponding primary device in the called group both being idle; means controlled in accordance with the recorded designation of the called line in the called group for operating the last-named primary device to make connection with the called line, and distributing means for connecting said calling line with the secondary device through which said circuit path is closed to the last-named primary device.

26. In a switching system, lines divided into groups, groups of line switching devices assigned respectively to said groups of lines, each line switching device having access to all the lines of the group to which it is assigned, intermediate switching devices, links; means responsive to the origination of a call on any of said lines for extending a connection automatically from the calling line, through any idle one of the line switching devices in the concerned group, and thence through an idle intermediate switching device, to an idle one of said links; means thereafter directively controlled over the calling line in accordance with the designation of the one of said groups which contains the desired called line for setting up a connection from the link in use to any idle one of the line switching devices in the group having access to the desired called line, said connection including a further one of said intermediate switching devices, and means directively controlled over the calling line in accordance with the designation of the desired called line in the called group for operating the last-named line switching device to complete connection to the desired called line.

27. In a switching system, a group of lines having identifying numbers assigned respectively thereto, any such identifying number including one of a number of subgroup digits and one of a number of line digits immediately following the subgroup digit; said lines being divided into subgroups indexed respectively by said subgroup digits, the lines in any subgroup being indexed respectively by said line digits; a group of line links serving said lines; a group of primary switching devices for interconnecting said lines with said line links, both as calling lines and as called lines, said primary switching devices and line links being divided into subgroups corresponding respectively to said subgroups of lines; a group of secondary switching devices divided into subgroups, primary links in any subgroup thereof extending respectively to secondary subgroups; a group of originating links and a group of terminating links assigned to said group of lines, said originating links and said terminating links being each divided into subgroups extending respectively to said secondary subgroups, the secondary switches of any subgroup being effective to interconnect the line links thereat with said originating links and said terminating links thereat as required; means responsive to the origination of a call on any one of said lines for operating a primary switching device in the concerned subgroup of lines to interconnect the calling line with an idle associated line link and for operating a switching device in the concerned secondary subgroup to interconnect the said idle line link with an idle originating link thereat; means responsive to the calling of any one of said identifying numbers over said calling line for testing the line links in the subgroup indexed by the called subgroup digit; means dependent upon the result of said testing operation for thereupon associating the calling line with an idle terminating link extending to a secondary subgroup having access to an idle line link extending to the indexed primary subgroup, and for operating a switching device of the last-named secondary subgroup to interconnect the last-named terminating link with the last-named line link; and means for operating a primary switching device in the indexed subgroup to interconect the last-named line link with one of the lines in the corresponding subgroup of lines, the line interconnected being the one indexed by the line digit of the called number, whereby a connection is completed between the calling line and the identified called line.

28. In a switching system, a group of lines having identifying numbers assigned respectively thereto, any such identifying number including one of a number of subgroup digits and one of a number of line digits immediately following the subgroup digit; said lines being divided into subgroups indexed respectively by said subgroup digits, the lines in any subgroup being indexed respectively by said line digits; a group of line links serving said lines; a group of primary switching devices for interconnecting said lines with said line links, said primary switching devices and line links being divided into subgroups corresponding respectively to said subgroups of lines;

a group of secondary switching devices divided into subgroups, primary links in any subgroup thereof extending respectively to secondary subgroups; a group of terminating links assigned to said group of lines, said terminating links being divided into subgroups extending respectively to said secondary subgroups, the secondary switches of any subgroup being effective to interconnect the line links thereat with said terminating links thereat as required; means responsive to the calling of any one of said identifying numbers over a calling line for testing the line links in the subgroup indexed by the called subgroup digit; means dependent upon the result of said testing operation for thereupon associating the calling line with an idle terminating link extending to a secondary subgroup having access to an idle line link extending to the indexed primary subgroup, and for operating a switching device of the last-named secondary subgroup to interconnect the last-named terminating link with the last-named line link; and means for operating a primary switching device in the indexed subgroup to interconnect the last-named line link with one of the lines in the corresponding subgroup of lines, the line interconnected being the one indexed by the line digit of the called number, whereby a connection is completed between the calling line and the identified called line.

29. In a telephone system as set forth in the immediately preceding claim; the specified operations of testing the line links in the indexed subgroup, associating the calling line with an idle terminating link, and interconnecting such terminating link with an idle line link in the indexed subgroup, all occurring between the calling of the subgroup digit and the calling of the line digit of the number of the desired called line.

GEORGE R. EATON.